(12) United States Patent
Atherton et al.

(10) Patent No.: US 11,745,354 B2
(45) Date of Patent: Sep. 5, 2023

(54) SUPPLEMENTARY METROLOGY POSITION COORDINATES DETERMINATION SYSTEM INCLUDING AN ALIGNMENT SENSOR FOR USE WITH A ROBOT

(71) Applicant: Mitutoyo Corporation, Kanagawa-ken (JP)

(72) Inventors: Kim Atherton, Kirkland, WA (US); Casey Edward Emtman, Kirkland, WA (US); Michael Nahum, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 395 days.

(21) Appl. No.: 17/176,850

(22) Filed: Feb. 16, 2021

(65) Prior Publication Data

US 2021/0162601 A1    Jun. 3, 2021

Related U.S. Application Data

(63) Continuation of application No. PCT/US2019/046702, filed on Aug. 15, 2019, which
(Continued)

(51) Int. Cl.
*B25J 13/08* (2006.01)
*B25J 9/16* (2006.01)
(Continued)

(52) U.S. Cl.
CPC .............. *B25J 9/1697* (2013.01); *B25J 9/023* (2013.01); *B25J 9/1653* (2013.01); *B25J 9/1664* (2013.01);
(Continued)

(58) Field of Classification Search
CPC ...... B25J 9/1697; B25J 9/1664; B25J 9/1674; B25J 9/023; B25J 9/1653; B25J 13/089; B25J 15/0019
(Continued)

(56) References Cited

U.S. PATENT DOCUMENTS 4,453,085 A    6/1984  Pryor
4,613,943 A    9/1986  Miyake et al.
(Continued)

FOREIGN PATENT DOCUMENTS

CN    102501252 A    6/2012
JP    7-248209 A    9/1995
(Continued)

OTHER PUBLICATIONS

Chinese Office Action, dated Jun. 1, 2022, for Chinese Application No. 201910757240.9, 15 pages. (with English translation).
(Continued)

*Primary Examiner* — Dalena Tran
(74) *Attorney, Agent, or Firm* — Seed IP Law Group LLP

(57) ABSTRACT

A supplementary metrology position coordinates determination (SMPD) system is used with a robot. "Robot accuracy" (e.g., for controlling and sensing an end tool position of an end tool that is mounted proximate to a distal end of its movable arm configuration) is based on robot position sensors included in the robot. The SMPD system includes an imaging configuration and an XY scale and an alignment sensor for sensing alignment/misalignment therebetween, and an image triggering portion and processing portion. One of the XY scale or imaging configuration is coupled to the movable arm configuration and the other is coupled to a stationary element (e.g., a frame above the robot). The imaging configuration acquires an image of the XY scale with known alignment/misalignment, which is utilized to
(Continued)

determine metrology position coordinates that are indicative of the end tool position, with an accuracy level that is better than the robot accuracy.

23 Claims, 16 Drawing Sheets

Related U.S. Application Data is a continuation-in-part of application No. 16/146,640, filed on Sep. 28, 2018, now Pat. No. 10,871,366, which is a continuation-in-part of application No. 16/104,033, filed on Aug. 16, 2018, now Pat. No. 10,751,883.

(60) Provisional application No. 62/785,129, filed on Dec. 26, 2018.

(51) Int. Cl.
*B25J 9/02* (2006.01)
*B25J 15/00* (2006.01)

(52) U.S. Cl.
CPC ........... *B25J 9/1674* (2013.01); *B25J 13/089* (2013.01); *B25J 15/0019* (2013.01)

(58) Field of Classification Search
USPC ..... 700/254, 259, 258; 702/150, 153; 901/2, 901/14, 16
See application file for complete search history.

(56) References Cited

U.S. PATENT DOCUMENTS

| | | | |
|---|---|---|---|
| 4,725,965 A | 2/1988 | Keenan | |
| 4,831,549 A | 5/1989 | Red et al. | |
| 5,086,401 A | 2/1992 | Glassman et al. | |
| 5,105,368 A | 4/1992 | Alexandersen et al. | |
| 5,297,238 A | 3/1994 | Wang et al. | |
| 5,583,691 A | 12/1996 | Yamane et al. | |
| 5,617,335 A | 4/1997 | Hashima et al. | |
| 5,768,759 A | 6/1998 | Hudson | |
| 5,798,947 A | 8/1998 | Ye et al. | |
| 5,876,325 A | 3/1999 | Mizuno et al. | |
| 6,101,455 A * | 8/2000 | Davis | B25J 9/1697 |
| | | | 700/254 |
| 6,222,940 B1 | 4/2001 | Wenzel et al. | |
| 6,529,852 B2 * | 3/2003 | Knoll | B25J 9/1692 |
| | | | 702/150 |
| 6,640,008 B1 | 10/2003 | Lee et al. | |
| 6,681,151 B1 | 1/2004 | Weinzimmer et al. | |
| 6,781,694 B2 | 8/2004 | Nahum et al. | |
| 6,937,349 B2 | 8/2005 | Jones et al. | |
| 7,088,441 B2 | 8/2006 | Nahum et al. | |
| 7,105,753 B1 | 9/2006 | Lapstun et al. | |
| 7,532,949 B2 | 5/2009 | Ban et al. | |
| 7,577,076 B2 | 8/2009 | Ogata et al. | |
| 7,845,560 B2 | 12/2010 | Emanuel et al. | |
| 8,792,963 B2 | 7/2014 | Zhao et al. | |
| 8,981,324 B2 | 3/2015 | Rigney et al. | |
| 8,989,898 B2 | 3/2015 | DeVlieg | |
| 9,050,728 B2 | 6/2015 | Ban et al. | |
| 9,323,025 B2 | 4/2016 | Heidemann et al. | |
| 9,572,549 B2 | 2/2017 | Belevich et al. | |
| 9,797,706 B2 | 10/2017 | Jordil et al. | |
| 10,058,996 B2 | 8/2018 | Hosek et al. | |
| 10,099,380 B2 | 10/2018 | Ishige et al. | |
| 10,625,427 B2 | 4/2020 | Troy et al. | |
| 10,753,738 B2 * | 8/2020 | Wakabayashi | B25J 9/1697 |
| 2003/0144765 A1 | 7/2003 | Habibi et al. | |
| 2005/0225278 A1 | 10/2005 | Ban et al. | |
| 2006/0017022 A1 | 1/2006 | Rigney et al. | |
| 2007/0008550 A1 | 1/2007 | Tobiason et al. | |
| 2007/0296366 A1 | 12/2007 | Quaid et al. | |
| 2008/0004750 A1 | 1/2008 | Ban et al. | |
| 2009/0157226 A1 * | 6/2009 | de Smet | G01B 11/002 |
| | | | 901/50 |
| 2009/0180667 A1 | 7/2009 | Mahan et al. | |
| 2009/0234502 A1 | 9/2009 | Ueyama et al. | |
| 2010/0153058 A1 | 6/2010 | Crothers et al. | |
| 2010/0331855 A1 | 12/2010 | Zhao et al. | |
| 2011/0029131 A1 | 2/2011 | Ban et al. | |
| 2013/0035791 A1 | 2/2013 | Chiu et al. | |
| 2013/0090554 A1 | 4/2013 | Zvuloni et al. | |
| 2013/0123982 A1 | 5/2013 | Chiu et al. | |
| 2013/0158947 A1 | 6/2013 | Suzuki | |
| 2014/0157610 A1 | 6/2014 | Garvey et al. | |
| 2014/0301632 A1 | 10/2014 | Ikeda et al. | |
| 2014/0343727 A1 | 11/2014 | Calkins et al. | |
| 2015/0025683 A1 | 1/2015 | Amano | |
| 2015/0158181 A1 | 6/2015 | Kawamura et al. | |
| 2016/0008988 A1 | 1/2016 | Kennedy et al. | |
| 2016/0039096 A1 | 2/2016 | Wallack et al. | |
| 2016/0136812 A1 | 5/2016 | Hosek et al. | |
| 2016/0151915 A1 | 6/2016 | Nishi et al. | |
| 2016/0223316 A1 | 8/2016 | Jordil et al. | |
| 2016/0291160 A1 | 10/2016 | Zweigle et al. | |
| 2016/0332297 A1 * | 11/2016 | Sugaya | B25J 9/161 |
| 2017/0140521 A1 | 5/2017 | Sakaguchi et al. | |
| 2017/0148154 A1 | 5/2017 | Nakao | |
| 2017/0151671 A1 | 6/2017 | Ishige et al. | |
| 2017/0182665 A1 | 6/2017 | Okuyama et al. | |
| 2018/0004188 A1 | 1/2018 | Yamaguchi et al. | |
| 2018/0018778 A1 | 1/2018 | Haverkamp et al. | |
| 2018/0153437 A1 | 6/2018 | Schwartz et al. | |
| 2018/0272490 A1 | 9/2018 | Brenner et al. | |
| 2018/0279993 A1 | 10/2018 | Crawford et al. | |
| 2018/0304467 A1 * | 10/2018 | Matsuura | B25J 9/1697 |
| 2018/0361571 A1 | 12/2018 | Georgeson et al. | |
| 2018/0361595 A1 | 12/2018 | Troy et al. | |
| 2018/0373158 A1 | 12/2018 | Baier et al. | |
| 2019/0005600 A1 | 1/2019 | Hazeyama | |
| 2019/0015980 A1 | 1/2019 | Kojima et al. | |
| 2019/0056218 A1 | 2/2019 | Ulmer et al. | |
| 2019/0099887 A1 | 4/2019 | Huang et al. | |
| 2019/0195607 A1 | 6/2019 | Nahum | |
| 2019/0256300 A1 | 8/2019 | Shimamura et al. | |
| 2019/0291277 A1 | 9/2019 | Oleynik | |
| 2020/0055191 A1 | 2/2020 | Nahum | |
| 2020/0056878 A1 | 2/2020 | Nahum | |

FOREIGN PATENT DOCUMENTS

| | | |
|---|---|---|
| JP | 2008-012604 A | 1/2008 |
| JP | 2015-042437 A | 3/2015 |
| WO | 2013/091596 A1 | 6/2013 |

OTHER PUBLICATIONS

Chinese Office Action, dated Jun. 1, 2022, for Chinese Application No. 201910757369.X, 15 pages. (with English translation).
Artese et al., "POIS, a Low Cost Tilt and Position Sensor: Design and First Tests," ISSN 1424-8220, Sensors 2015, 15, 10806-10824. (19 pages).
Krajník et al., "External Localization System for Mobile Robotics," 16th International Conference on Advanced Robotics (ICAR), Nov. 25-29, 2013, Montevideo, Uruguay.(6 Pages).
Pérez et al., "Robot Guidance Using Machine Vision Techniques in Industrial Environments: A Comparative Review," Sensors 16(3):335, 2016. (26 pages).
Scara, URL=https://en.wikipedia.org/w/index.php?title=SCARA &oldid=838861482, Archive Date Apr. 29, 2018. (2 pages).

\* cited by examiner

SUPPLEMENTARY METROLOGY POSITION COORDINATES DETERMINATION SYSTEM INCLUDING AN ALIGNMENT SENSOR FOR USE WITH A ROBOT

CROSS-REFERENCE TO RELATED APPLICATION(S)

This application is a continuation of International application No. PCT/US2019/046702, filed Aug. 15, 2019, which claims the benefit of U.S. provisional application No. 62/785,129, filed Dec. 26, 2018, and which is a continuation-in-part of U.S. patent application Ser. No. 16/146,640, filed Sep. 28, 2018, which is a continuation-in-part of U.S. patent application Ser. No. 16/104,033, filed on Aug. 16, 2018, the disclosures of which are hereby incorporated herein by reference in their entireties.

BACKGROUND

Technical Field

This disclosure relates to robot systems, and more particularly to systems for determining coordinates of an end tool position of a robot.

Description of the Related Art

Robotic systems are increasingly utilized for manufacturing and other processes. Various types of robots that may be utilized include articulated robots, selective compliance articulated robot arm (SCARA) robots, cartesian robots, cylindrical robots, spherical robots, etc. As one example of components that may be included in a robot, a SCARA robot system (e.g., which may be a type of articulated robot system) may typically have a base, with a first arm portion rotationally coupled to the base, and a second arm portion rotationally coupled to an end of the first arm portion. In various configurations, an end tool may be coupled to an end of the second arm portion (e.g., for performing certain work and/or inspection operations). Such systems may include position sensors (e.g., rotary encoders) utilized for determining/controlling the positioning of the arm portions and correspondingly the positioning of the end tool. In various implementations, such systems may have a positioning accuracy of approximately 100 microns, as limited by certain factors (e.g., the rotary encoder performance in combination with the mechanical stability of the robot system, etc.)

U.S. Pat. No. 4,725,965, which is hereby incorporated herein by reference in its entirety, discloses certain calibration techniques for improving the accuracy of a SCARA system. As described in the '965 patent, a technique is provided for calibrating a SCARA type robot comprising a first rotatable arm portion and a second rotatable arm portion which carries an end tool. The calibration technique is in relation to the fact that the SCARA robot may be controlled using a kinematic model, which, when accurate, allows the arm portions to be placed in both a first and second angular configuration at which the end tool carried by the second arm portion remains at the same position. To calibrate the kinematic model, the arm portions are placed in a first configuration to locate the end tool above a fixed datum point. Then, the arm portions are placed in a second angular configuration to nominally locate the end tool again in registration with the datum point. The error in the kinematic model is computed from the shift in the position of the end tool from the datum point when the arm portions are switched from the first to the second angular configuration. The kinematic model is then compensated in accordance with the computed error. The steps are repeated until the error reaches zero, at which time the kinematic model of the SCARA robot is considered to be calibrated.

As further described in the '965 patent, the calibration technique may include the use of certain cameras. For example, in one implementation, the datum point may be the center of the viewing area of a stationary television camera (i.e., located on the ground below the end tool), and the output signal of the camera may be processed to determine the shift in the position of the end tool from the center of the viewing area of the camera when the links are switched from the first to the second configuration. In another implementation, the second arm portion may carry a camera, and the technique may begin by placing the arm portions in a first angular configuration, at which a second predetermined interior angle is measured between the arm portions, to center the camera carried by the second arm portion directly above a fixed datum point. The arm portions are then placed in a second angular configuration, at which an interior angle, equal to the second predetermined interior angle, is measured between the arm portions, to nominally center the camera again above the datum point. The output signal of the camera is then processed to determine the shift in the position of the datum point, as seen by the camera, upon switching the arm portions from the first to the second angular configuration. The error in the known position of the camera is then determined in accordance with the shift in the position of the datum point as seen by the camera. The steps are then repeated as part of the calibration process until the error approaches zero.

While techniques such as those described in the '965 patent may be utilized for calibrating a robot system, in certain applications it may be less desirable to utilize such techniques (e.g., which may require significant time and/or may not provide a desired level of accuracy for all possible orientations of a robot during certain operations, etc.) A robot system that can provide improvements with regard to such issues (e.g., for increasing the reliability, repeatability, speed, etc. of the position determination during workpiece measurements and other processes) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A supplementary metrology position coordinates determination system is provided for use in conjunction with a robot as part of a robot system. The robot (e.g., an articulated robot, a SCARA robot, a cartesian robot, a cylindrical robot, a spherical robot, etc.) includes a movable arm configuration and a motion control system. The movable arm configuration includes an end tool mounting configuration that is located proximate to a distal end of the movable arm configuration. The robot is configured to move the movable arm configuration so as to move at least a portion of an end tool that is mounted to the end tool mounting configuration along at least two dimensions in an end tool working volume. The motion control system is configured to control an end tool position or a measuring point position of the end tool with a level of accuracy defined as a robot accuracy, based at least in part on sensing and controlling the position of the movable arm configuration using at least one position sensor (e.g., a rotary encoder, a linear encoder, etc.) included in the robot.

The supplementary metrology position coordinates determination system includes a first imaging configuration, an XY scale, an operational alignment subsystem comprising at least an alignment sensor, an image triggering portion and a metrology position coordinate processing portion. The first imaging configuration includes a first camera and has an optical axis. In various implementations the operational alignment subsystem may further comprise an operational alignment actuator configuration as described in greater detail below. The XY scale includes a nominally planar substrate and a plurality of respective imagable features distributed on the substrate, wherein the respective imagable features are located at respective known XY scale coordinates on the XY scale. A scale plane may be defined to nominally coincide with the planar substrate of the XY scale, and a direction normal to the scale plane may be defined as a scale imaging axis direction. The alignment sensor is located proximate to the first camera and is mounted in a rigid configuration relative to the first camera, and the alignment sensor is configured to provide an alignment signal indicative of the scale imaging axis direction. The image triggering portion is configured to input at least one input signal that is related to the end tool position or a measuring point position of the end tool and determine the timing of a first imaging trigger signal based on the at least one input signal and to output the first imaging trigger signal to the first imaging configuration. The first imaging configuration is configured to acquire a digital image of the XY scale at an image acquisition time in response to receiving the first imaging trigger signal. The metrology position coordinate processing portion is configured to input the acquired image and identify at least one respective imagable feature included in the acquired image of the XY scale and the related respective known XY scale coordinate location. In various implementations, the XY scale may be an incremental scale or an absolute scale.

In various implementations wherein the operational alignment subsystem comprises an operational alignment actuator configuration, the supplementary metrology position coordinates determination system is configured with a movable one of the XY scale or the first imaging configuration coupled to the operational alignment actuator configuration which is coupled to, or part of, the movable arm configuration. The other one of the XY scale or the first imaging configuration is coupled to a stationary element proximate to the robot. The stationary one of the XY scale or the first imaging configuration defines a first reference position.

In such implementations, the robot system is configured to operate the operational alignment subsystem and the operational alignment actuator configuration to adjust an alignment of the moveable one of the XY scale or the first imaging configuration based on the alignment signal provided by the alignment sensor to provide an operational configuration of the supplementary metrology position coordinates determination system wherein the XY scale and the first imaging configuration are arranged with the optical axis of the first imaging configuration parallel to the direction of the scale imaging axis direction as indicated by the alignment signal, and the scale plane is located within the range of focus of the first imaging configuration along the scale imaging axis direction.

In such implementations, the supplementary metrology position coordinates determination system is configured such that when the moveable one of the XY scale or the first imaging configuration and the stationary one of the XY scale or the first imaging configuration are arranged in the operational configuration, and the movable arm configuration is positioned with the XY scale in a field of view of the first imaging configuration, then the metrology position coordinate processing portion is operable to determine metrology position coordinates that indicate a relative position between the movable one of the XY scale or the first imaging configuration and the first reference position with an accuracy level that is better than the robot accuracy, based on determining an image position of the identified at least one respective imagable feature in the acquired image. The determined metrology position coordinates are indicative of the end tool position or a measuring point position of the end tool at the image acquisition time, with an accuracy level that is better than the robot accuracy, at least for a vector component of the metrology position coordinates that is at least one of transverse or perpendicular to the scale imaging axis direction.

In such implementations, the operational alignment actuator configuration may comprise at least a first rotating element that rotates about a first rotation axis that is nominally parallel to the scale plane if the XY scale is the moveable one, and nominally orthogonal to the optical axis if the first imaging configuration is the moveable one. The operational alignment actuator configuration may further comprise at least a second rotating element that rotates about a second rotation axis that is nominally orthogonal to the first rotation axis. According to a convention used herein, two axes oriented such that the dot product of their direction vectors is zero will be understood to be orthogonal, regardless of whether or not they intersect. In some such implementations, the first and second rotating elements may be included in the movable arm configuration. In other such implementations, the first and second rotating elements may be included in a discrete operational alignment actuator configuration that is located proximate to a distal end of the movable arm configuration.

In various implementations wherein the operational alignment subsystem does not comprise an operational alignment actuator configuration, the supplementary metrology position coordinates determination system is configured with a movable one of the XY scale or the first imaging configuration coupled to the movable arm configuration. The other one of the XY scale or the first imaging configuration is coupled to a stationary element proximate to the robot. The stationary one of the XY scale or the first imaging configuration defines a first reference position.

In such implementations, the robot system is configured to provide at least a nominal operational configuration of the supplementary metrology position coordinates determination system wherein in the nominal operational configuration at least one of the XY scale or the first imaging configuration are arranged with the optical axis of the first imaging configuration nominally parallel to the direction of the scale imaging axis direction (e.g. as based on the robot accuracy) and with the scale plane located within the range of focus of the first imaging configuration along the scale imaging axis direction. The robot system is further configured to operate the operational alignment subsystem to determine a residual misalignment between the optical axis and the scale imaging axis as indicated by the alignment signal provided by the alignment sensor (e.g. with an accuracy that is better than the robot accuracy.)

In such implementations, the supplementary metrology position coordinates determination system may be configured such that when the moveable one of the XY scale or the first imaging configuration and the stationary one of the XY scale or the first imaging configuration are arranged in the nominal operational configuration, and the movable arm configuration is positioned with the XY scale in a field of view of the first imaging configuration, then the metrology position coordinate processing portion is operable to acquire the digital image of the XY scale at an image acquisition time, and determine a corresponding residual misalignment. The supplementary metrology position coordinates determination system may then determine a first set of metrology position coordinates that indicate a relative position between the movable one of the XY scale or the first imaging configuration and the first reference position with an accuracy level that is better than the robot accuracy, at least for a vector component of the first set of metrology position coordinates that is at least one of transverse or perpendicular to the scale imaging axis direction, based on an image position of the identified at least one respective imagable feature in the acquired image and the corresponding residual misalignment. The metrology position coordinate processing portion may be further configured to determine a second set of metrology position coordinates that are indicative of the end tool position or a measuring point position of the end tool at the image acquisition time based on the first set of metrology position coordinates and the corresponding residual misalignment, with an accuracy level that is better than the robot accuracy, at least for a vector component of the second set of metrology position coordinates that is at least one of transverse or perpendicular to the scale imaging axis direction.

In various implementations the alignment sensor may be configured to output an alignment beam to the XY scale, and receive a reflected alignment beam therefrom on a position sensitive detector of the alignment sensor, and provide the alignment signal based on at least one output from the position sensitive detector.

In various implementations, the movable one of the XY scale or the first imaging configuration is configured in a rigid relationship to at least one of the end tool mounting configuration, and/or an end tool that is mounted to the end tool mounting configuration In various implementations, the supplementary metrology position coordinates determination system is configured to determine the metrology position coordinates of the end tool position or a measuring point position of the end tool at the image acquisition time, based on the determined metrology position coordinates that are indicative of the relative position of the movable one of the XY scale or the first imaging configuration and a known coordinate position offset between the end tool position or a measuring point position of the end tool and the movable one of the XY scale or the first imaging configuration.

In various implementations, the robot is configured to move the end tool and the movable one of the XY scale or the first imaging configuration in a plane parallel to the scale plane, while the supplementary metrology position coordinates determination system is in the operational configuration.

In various implementations, the robot system may be operated in either a robot position coordinates mode or a supplementary metrology position coordinates mode. The robot position coordinates mode may correspond to an independent and/or standard mode of operation for the robot (e.g., a mode in which the robot is operated independently, such as when a supplementary metrology position coordinates determination system is not active or is otherwise not provided). In the robot position coordinates mode, the robot movements and corresponding end tool position or a measuring point position of the end tool are controlled and determined with the level of accuracy defined as the robot accuracy (i.e., utilizing the position sensors included in the robot). Conversely, in the supplementary metrology position coordinates mode, metrology position coordinates may be determined that are indicative of the end tool position or a measuring point position of the end tool at an image acquisition time, with an accuracy level that is better than the robot accuracy (e.g., better than the accuracy of the position sensors included in the robot), at least for a vector component of the metrology position coordinates that is at least one of transverse or perpendicular to the scale imaging axis direction. In various implementations, determined position information (e.g., the determined metrology position coordinates that are indicative of the relative position, the determined metrology position coordinates of the end tool position or a measuring point position of the end tool and/or other related determined position information) may then be utilized for performing a designated function (e.g., as part of workpiece measurements, positioning control of the robot, etc.)

DETAILED DESCRIPTION

Figure 1:
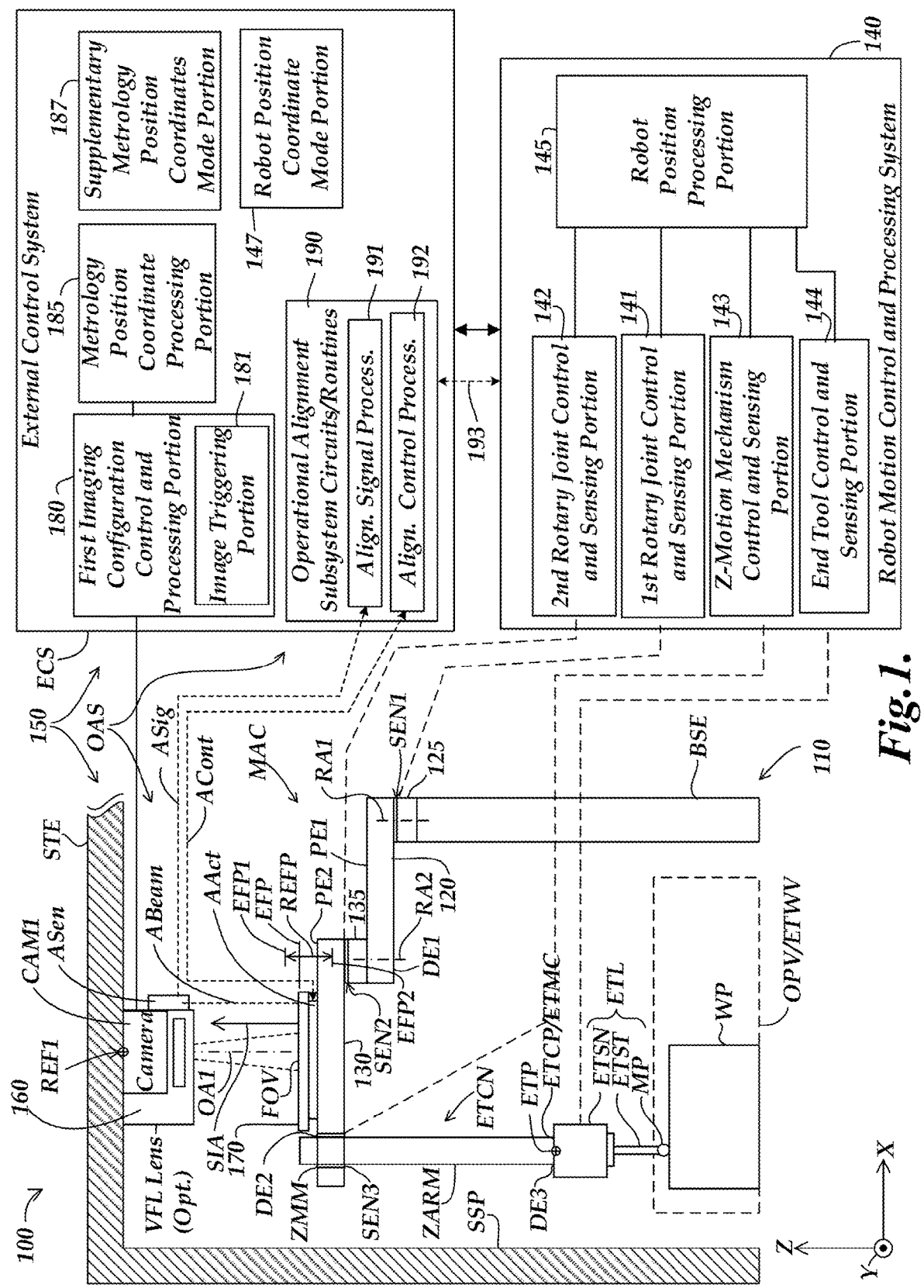
FIG. 1 is a block diagram of a first exemplary implementation of a robot system including an articulated robot and a supplementary metrology position coordinates determination system including a first exemplary implementation of an operational alignment subsystem according to principles disclosed herein.

FIG. 1 is a block diagram of a first exemplary implementation of a robot system 100 including an articulated robot 110 and a supplementary metrology position coordinates determination system 150. The supplementary metrology position coordinates determination system 150 is shown to include a first exemplary implementation of an operational alignment subsystem OAS comprising at least an alignment sensor ASen connected to operational alignment subsystem processing circuits/routines 190, as described in greater detail below.

The articulated robot 110 includes first and second arm portions 120 and 130, first and second rotary joints 125 and 135, position sensors SEN1 and SEN2, an end tool configuration ETCN, and a robot motion control and processing system 140. The first arm portion 120 is mounted to the first rotary joint 125 at a proximal end PE1 of the first arm portion 120. The first rotary joint 125 (e.g., located at an upper end of a supporting base portion BSE) has a rotary axis RA1 aligned along a z axis direction such that the first arm portion 120 moves about the first rotary joint 125 in an x-y plane that is perpendicular to the z axis. The second rotary joint 135 is located at a distal end DE1 of the first arm portion 120. The second rotary joint 135 has its rotary axis RA2 nominally aligned along the z axis direction. The second arm portion 130 is mounted to the second rotary joint 135 at a proximal end PE2 of the second arm portion 130, such that the second arm portion 130 moves about the second rotary joint 135 in an x-y plane that is nominally perpendicular to the z axis. In various implementations, the position sensors SEN1 and SEN2 (e.g., rotary encoders) may be utilized for determining the angular positions (i.e., in the x-y plane) of the first and second arm portions 120 and 130 about the first and second rotary joints 125 and 135, respectively.

In various implementations, the end tool configuration ETCN may include a Z-motion mechanism ZMM, a Z-arm portion ZARM, a position sensor SEN3 and an end tool coupling portion ETCP which couples to an end tool ETL. In various implementations, the end tool ETL may include an end tool sensing portion ETSN and an end tool stylus ETST with a measuring point MP (e.g., for contacting a surface of a workpiece WP). The Z-motion mechanism ZMM is located proximate to the distal end DE2 of the second arm portion 130. The Z-motion mechanism ZMM (e.g., a linear actuator) is configured to move the Z-arm portion ZARM up and down in the z axis direction. In some implementations, the Z-arm portion ZARM may also be configured to rotate about an axis parallel to the z axis direction. In any case, the end tool ETL is coupled at the end tool coupling portion ETCP, and has a corresponding end tool position ETP with corresponding coordinates (e.g., x, y and z coordinates). In various implementations, the end tool position ETP may correspond to, or be proximate to, the distal end DE3 of the Z-arm portion ZARM (e.g., at or proximate to the end tool coupling portion ETCP).

The motion control system 140 is configured to control the end tool position ETP of the end tool ETL with a level of accuracy defined as a robot accuracy. More specifically, the motion control system 140 is generally configured to control the x and y coordinates of the end tool position ETP with the robot accuracy based at least in part on sensing and controlling the angular positions (i.e., in the x-y plane) of the first and second arm portions 120 and 130 about the first and second rotary joints 125 and 135, respectively, using the position sensors SEN1 and SEN2. In various implementations, the motion control and processing system 140 may include first and second rotary joint control and sensing portions 141 and 142 that may receive signals from the position sensors SEN1 and SEN2, respectively, for sensing the angular positions of the first and second arm portions 120 and 130, and/or may provide control signals (e.g., to motors, etc.) in the first and second rotary joints 125 and 135 for rotating the first and second arm portions 120 and 130.

In addition, the motion control system 140 is generally configured to control the z coordinate of the end tool position ETP with the robot accuracy based at least in part on sensing and controlling the linear position (i.e., along the z axis) of the Z-arm portion ZARM using the Z-motion mechanism ZMM and the position sensor SEN3. In various implementations, the motion control and processing system 140 may include a Z-motion mechanism control and sensing portion 143 that may receive signals from the position sensor SEN3 for sensing the linear position of the Z-arm portion ZARM, and/or may provide control signals to the Z-motion mechanism ZMM (e.g., a linear actuator) to control the z position of the Z-arm portion ZARM.

The motion control and processing system 140 may also receive signals from the end tool sensing portion ETSN. In various implementations, the end tool sensing portion ETSN may include circuitry and/or configurations related to the operations of the end tool ETL for sensing a workpiece WP. As will be described in more detail below, in various implementations the end tool ETL (e.g., a touch probe, a scanning probe, a camera, etc.) may be utilized for contacting or otherwise sensing surface locations/positions/points on a workpiece WP, for which various corresponding signals may be received, determined and/or processed by the end tool sensing portion ETSN which may provide corresponding signals to the motion control and processing system 140. In various implementations, the motion control and processing system 140 may include an end tool control and sensing portion 144 that may provide control signals to and/or receiving sensing signals from the end tool sensing portion ETSN. In various implementations, the end tool control and sensing portion 144 and the end tool sensing portion ETSN may be merged and/or indistinguishable. In various implementations, the first and second rotary joint control and sensing portions 141 and 142, the Z-motion mechanism control and sensing portion 143, and the end tool control and sensing portion 144 may all provide outputs to and/or receive control signals from a robot position processing portion 145 which may control and/or determine the overall positioning of the articulated robot 110 and corresponding end tool position ETP as part of the robot motion control and processing system 140.

In various implementations, the supplementary metrology position coordinates determination system 150 may be included with or otherwise added to an articulated robot 110 (e.g., as part of a retrofit configuration for being added to an existing articulated robot 110, etc.) In general, the supplementary metrology position coordinates determination system 150 may be utilized to provide an improved level of accuracy for the determination of the end tool position ETP. More specifically, as will be described in more detail below, the supplementary metrology position coordinates determination system 150 may be utilized to determine a relative position that is indicative of the metrology position coordinates of the end tool position ETP, with an accuracy level that is better than the robot accuracy, at least for x and y metrology position coordinates in an x-y plane that is perpendicular to the z axis.

As illustrated in FIG. 1, the supplementary metrology position coordinates determination system 150 includes a first imaging configuration 160, an XY scale 170, an image triggering portion 181, and a metrology position coordinate processing portion 185. The first imaging configuration 160 is coupled to a stationary element STE. In various implementations, the stationary element STE may comprise a frame arranged above at least a portion of an operable work volume OPV of the articulated robot 110, and for which the first imaging configuration 160 is fixed to the frame above a portion of the operable work volume OPV. In various implementations, the stationary element STE may include one or more structural support elements SSP (e.g., extending from a floor, ceiling, etc.) for maintaining the stationary element STE in a fixed location (e.g., with a fixed position and/or orientation) relative to the articulated robot 110.

The first imaging configuration 160 includes a first camera CAM1 and has an optical axis OA1 that is aligned parallel to the z axis (e.g. nominally aligned based on the robot accuracy, or better aligned based on an alignment sensor signal.) The first imaging configuration 160 has an effective focus range REFP along its optical axis OA1. In various implementations, the range REFP may be bound by first and second effective focus positions EFP1 and EFP2, as will be described in more detail below. At a given time, the first imaging configuration 160 has an effective focus position EFP that falls within the range REFP. In an implementation where a variable focal length (VFL) lens is used, the range REFP may correspond to the range of focus of the VFL lens.

In various implementations, a VFL lens that is utilized may be a tunable acoustic gradient index of refraction (TAG) lens. With respect to the general operations of such a TAG lens, in various implementations a lens controller (e.g., as included in the first imaging configuration control and image processing portion 180) may rapidly adjust or modulate the optical power of the TAG lens periodically, to achieve a high-speed TAG lens capable of a periodic modulation (i.e., at a TAG lens resonant frequency) of 250 kHz, or 70 kHz, or 30 kHz, or the like. In such a configuration, the effective focus position EFP of the first imaging configuration 160 may be (rapidly) moved within the range REFP (e.g., an autofocus search range). The effective focus position EFP1 (or EFPmax) may correspond to a maximum optical power of the TAG lens, and the effective focus position EFP2 (or EFPmin) may correspond to a maximum negative optical power of the TAG lens. In various implementations, the middle of the range REFP may be designated as EFPnom, and may correspond to zero optical power of the TAG lens.

In various implementations, such a VFL lens (e.g., a TAG lens) and a corresponding range REFP may be advantageously chosen such that the configuration limits or eliminates the need for macroscopic mechanical adjustments of the first imaging configuration 160 and/or adjustment of distances between components in order to change the effective focus position EFP. For example, in an implementation where an unknown amount of tilt or "sag" at the distal end DE2 of the second arm portion 130 may occur (e.g., due to the weight and/or specific orientations of the first and second arm portions 120 and 130, etc.), the precise focus distance from the first imaging configuration 160 to the XY scale 170 may be unknown and/or may vary with different orientations of the arms, etc. In such a configuration, it may be desirable for a VFL lens to be utilized that can scan or otherwise adjust the effective focus position EFP to determine and accurately focus at the XY scale 170.

Figure 4:
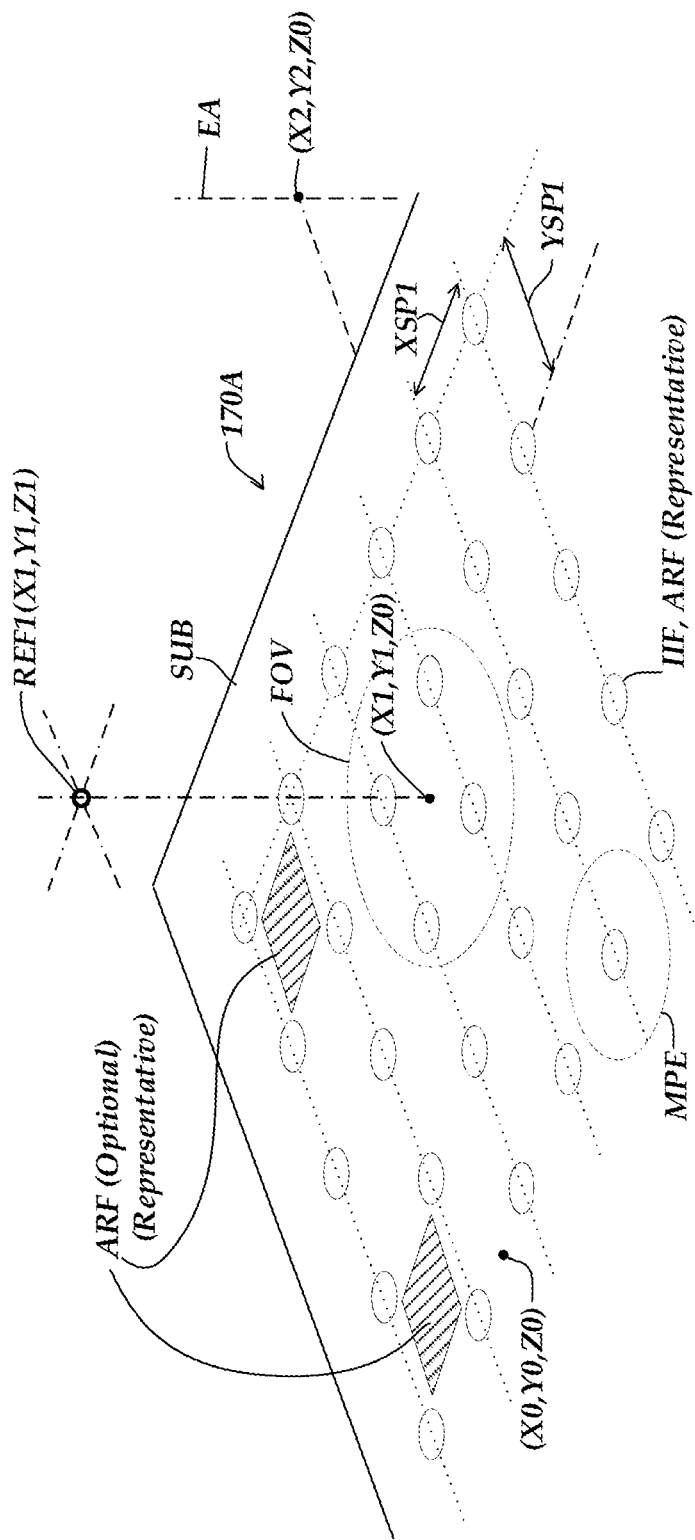
FIG. 4 is an isometric diagram of an exemplary implementation of an incremental XY scale.

In various implementations, the XY scale 170 comprises a nominally planar substrate SUB (shown in FIG. 4). A scale plane may be defined to nominally coincide with the planar substrate SUB, and a direction normal to the scale plane may be defined as a scale imaging axis direction SIA. In the implementation as illustrated, the XY scale 170 is aligned in an operational configuration wherein the scale imaging axis direction SIA is at least nominally aligned with (that is, parallel to) the optical axis OA1 of the first imaging configuration 160.

In some implementations the operational alignment actuator configuration AAct of the operational alignment subsystem OAS may be omitted (or unused) and the scale imaging axis direction SIA is simply nominally aligned with the optical axis OA1 and/or the z axis for one or more poses of the articulated robot 110 (e.g. based on the robot accuracy). It will be appreciated that such alignment is "passive" or open loop and may suffer small alignment errors associated with a small sag/tilt misalignment angle MisAng (e.g. as shown in FIG. 2B), based on or due to the robot accuracy and/or unavoidable robot deformations resulting from gravity for various poses of the articulated robot 110 shown in FIG. 1. According to a convention used herein, such small alignment errors may be considered to fall within the definition of a "nominal" operational configuration and/or the definition of "nominal" alignment in various implementations outlined herein.

However, in other implementations an operational alignment actuator configuration AAct (e.g. the discrete operational alignment actuator configuration AAct shown in FIG. 1) is included and used in the operational alignment subsystem OAS. In such implementations, based on signals from the alignment sensor (which has a known and/or stable alignment relative to the optical axis OA1), the operational alignment actuator configuration AAct may actively align the scale imaging axis direction SIA with the optical axis OA1 for one or more poses of the articulated robot 110, at any desired time(s) during operation of the articulated robot 110. It will be appreciated that such an alignment is active or closed loop and small alignment errors according to the small sag/tilt misalignment angle MisAng outlined above may be actively corrected at any desired time(s) during operation of the articulated robot 110. In the illustrated implementation, the alignment errors may be actively corrected by using alignment control signal(s) ACont generated in the alignment control portion 192 to control the discrete operational alignment actuator configuration AAct to adjust an alignment of the moveable XY scale 170 based on the alignment signal(s) Asig provided by the alignment sensor ASen, to provide an operational configuration of the XY scale 170 and the first imaging configuration 160 wherein the optical axis OA1 and the scale imaging axis direction SIA are arranged to be parallel, as indicated by the alignment signal Asig.

As previously outlined, in the implementation shown in FIG. 1 the operational alignment subsystem OAS comprises the alignment sensor ASen, the discrete operational alignment actuator AAct, and operational alignment subsystem processing circuits/routines 190. The operational alignment subsystem processing circuits/routines 190 include at least an alignment signal processing portion 191, which may provide signal processing that may provide primary signal conditioning and/or correction for the alignment signal(s) Asig of the alignment sensor Asen, and/or analysis that determines a misalignment angle/vector or residual misalignment angle/vector that corresponds to the alignment signal(s) Asig, as described in greater detail below.

In implementations wherein the operational alignment subsystem OAS includes some form of operational alignment actuator AAct, the operational alignment subsystem processing circuits/routines 190 may further include an alignment control portion 192, which is generally configured to adjust an alignment of a moveable one of an XY scale or a first imaging configuration based on the alignment signal(s) Asig provided by the alignment sensor ASen, to provide an operational configuration of the XY scale and the first imaging configuration wherein an optical axis (e.g. OA1) of the first imaging configuration and the scale imaging axis direction SIA are arranged to be parallel, as indicated by the alignment signal Asig (e.g. as outlined above.)

It will be appreciated that the configuration of the operational alignment subsystem processing circuits/routines 190 shown in FIG. 1 and outlined above is exemplary only, and not limiting. In various implementations, the various portions of the alignment subsystem processing circuits/routines 190 may be located outside the external control system ECS (e.g. in the operational alignment sensor ASen) or may be merged with and/or indistinguishable from other portions of the supplementary metrology position coordinates determination system 150 (e.g. the portions 185 and/or 187). In some implementations, the operational alignment subsystem processing circuits/routines 190 may exchange position and/or alignment information and/or control signals with the robot motion and control processing system 140 as indicated by the dashed line 193, in order to implement various operating principles or features disclosed herein. The foregoing and other aspects of various operational alignment subsystems OAS according to principles disclosed herein are described in greater detail with reference to additional figures below.

The XY scale 170 may include a plurality of respective imagable features that are distributed on the substrate SUB. The respective imagable features are located at respective known x and y scale coordinates on the XY scale 170. In various implementations, the XY scale 170 may be an incremental or absolute scale, as described below with respect to FIGS. 4 and 5.

In various implementations, the image triggering portion 181 and/or the metrology position coordinate processing portion 185 may be included as part of an external control system ECS (e.g., as part of an external computer, etc.) The image triggering portion 181 may be included as part of a first imaging configuration control and processing portion 180. In various implementations, the image triggering portion 181 is configured to input at least one input signal that is related to the end tool position ETP and to determine the timing of a first imaging trigger signal based on the at least one input signal, and to output the first imaging trigger signal to the first imaging configuration 160. In various implementations, the first imaging configuration 160 is configured to acquire a digital image of the XY scale 170 at an image acquisition time in response to receiving the first imaging trigger signal. In various implementations, the metrology position coordinate processing portion 185 is configured to input the acquired image and to identify at least one respective imagable feature included in the acquired image of the XY scale 170 and the related respective known XY scale coordinate location. In various implementations, the external control system ECS may also include a standard robot position coordinates mode portion 147 and a supplementary metrology position coordinates mode portion 187, for implementing corresponding modes, as will be described in more detail below.

In various implementations, the first imaging configuration 160 may include a component (e.g., a subcircuit, routine, etc.) that activates an image integration of the camera CAM1 periodically (e.g., at a set timing interval) for which the first imaging trigger signal may activate a strobe light timing or other mechanism to effectively freeze motion and correspondingly determine an exposure within the integration period. In such implementations, if no first imaging trigger signal is received during the integration period, a resulting image may be discarded, wherein if a first imaging trigger signal is received during the integration period, the resulting image may be saved and/or otherwise processed/analyzed to determine a relative position, as will be described in more detail below.

In various implementations, different types of end tools ETL may provide different types of outputs that may be utilized with respect to the image triggering portion 181. For example, in an implementation where the end tool ETL is a touch probe that is used for measuring a workpiece and that outputs a touch signal when it touches the workpiece, the image triggering portion 181 may be configured to input that touch signal, or a signal derived therefrom, as the at least one input signal that the timing of a first imaging trigger signal is determined based on. As another example, in an implementation where the end tool ETL is a scanning probe that is used for measuring a workpiece and that provides respective workpiece measurement sample data corresponding to a respective sample timing signal, the image triggering portion 181 may be configured to input that respective sample timing signal, or a signal derived therefrom, as the at least one input signal. As another example, in an implementation where the end tool ETL is a camera that is used to provide a respective workpiece measurement image corresponding to a respective workpiece image acquisition signal, the image triggering portion 181 may be configured to input that workpiece image acquisition signal, or a signal derived therefrom, as the at least one input signal.

In the example implementation of FIG. 1, the supplementary metrology position coordinates determination system 150 is configured with the XY scale 170 coupled to the second arm portion 130 proximate to the distal end DE2 of the second arm portion 130 and the first imaging configuration 160 coupled to a stationary element STE (e.g., a frame arranged above the articulated robot 110) and defining a first reference position REF1. In an alternative implementation (e.g., as will be described in more detail below with respect to FIG. 3), a supplementary metrology position coordinates determination system may be configured with the first imaging configuration 160 coupled to the second arm portion 130 proximate to the distal end DE2 of the second arm portion 130 and the XY scale 170 coupled to a stationary element STE and defining a first reference position REF1.

In either case, as will be described in more detail below, the location of the XY scale 170 along the z axis is within the range of focus of the first imaging configuration 160 (e.g., for which the focus position may be adjusted by a VFL lens or otherwise), and the supplementary metrology position coordinates determination system 150 is configured such that the metrology position coordinate processing portion 185 is operable to determine a relative position (e.g., including x and y coordinates) between the movable one of the XY scale 170 or the first imaging configuration 160 and the first reference position REF1 with an accuracy level that is better than the robot accuracy, based on determining an image position of the identified at least one respective imagable feature in the acquired image. The determined relative position is indicative of the metrology position coordinates of the end tool position ETP at the image acquisition time, with an accuracy level that is better than the robot accuracy, at least for x and y metrology position coordinates in an x-y plane that is transverse or perpendicular to the z axis. In various implementations, the supplementary metrology position coordinates determination system 150 may be configured to determine the metrology position coordinates of the end tool position ETP at the image acquisition time, based on the determined relative position and a known coordinate position offset (x and y coordinate offset) between the end tool position ETP and the movable one of the XY scale 170 or the first imaging configuration 160. It will be appreciated that such a system may have certain advantages over various alternative systems. For example, in various implementations a system such as that disclosed herein may be smaller and/or less expensive than alternative systems utilizing technologies such as laser trackers or photogrammetry for tracking robot movement/positions, and may also have higher accuracy in some implementations. The disclosed system also does not take up or obscure any part of the operable work volume OPV, such as alternative systems that may include a scale or fiducial on the ground or stage, or otherwise in the same area (e.g., operable work volume) where workpieces may otherwise be worked on and/or inspected, etc.

Figure 2A:
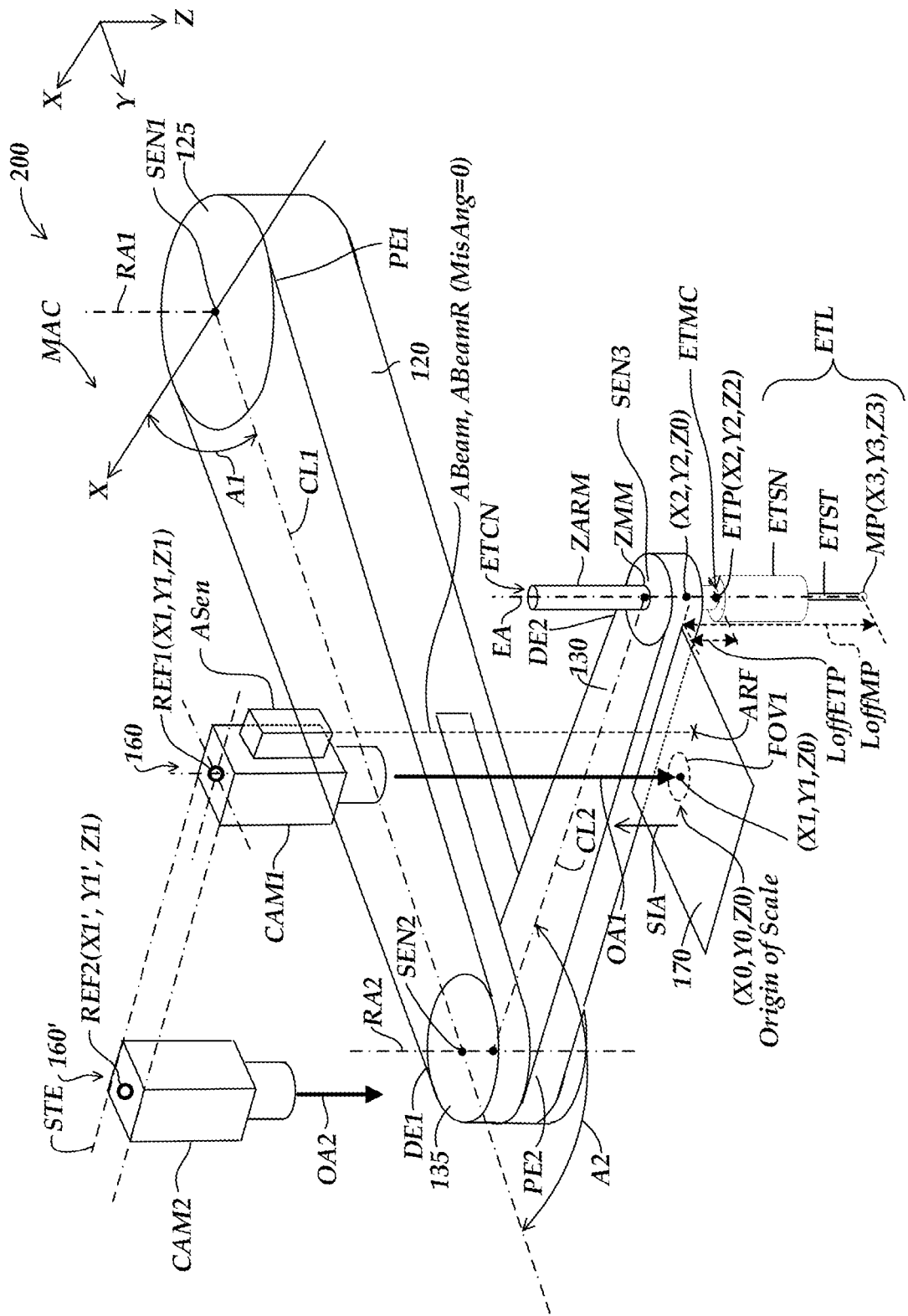
FIG. 2A is an isometric diagram of a second exemplary implementation of a robot system similar to the robot system of FIG. 1, in which a first imaging configuration and an alignment sensor of an operational alignment subsystem are coupled to a stationary element.
Figure 2B:
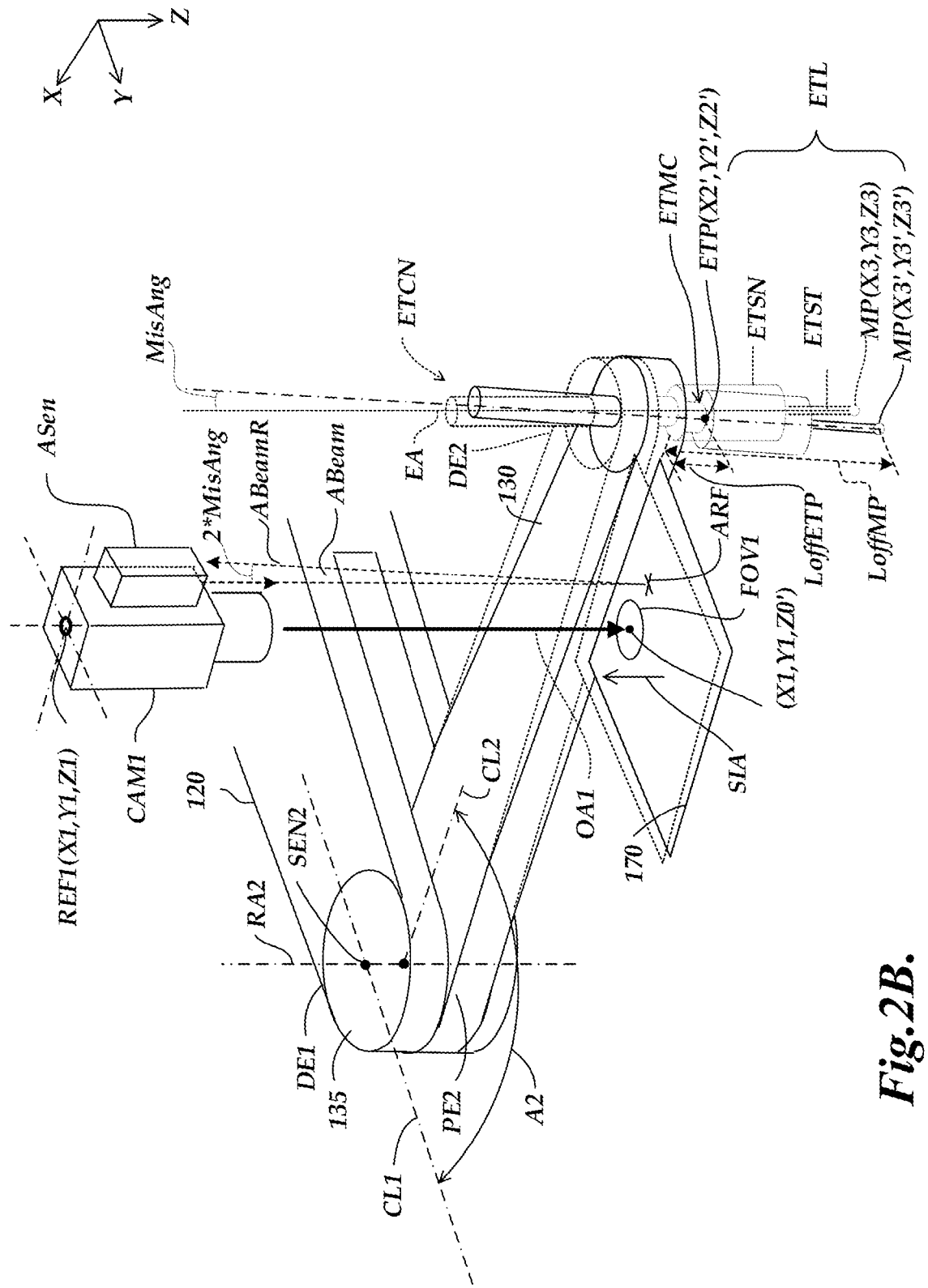
FIG. 2B is an isometric diagram of the robot system of FIG. 2A, illustrating certain errors that may be indicated by the alignment sensor.

FIGS. 2A and 2B are isometric diagrams of a second exemplary implementation of a robot system 200 similar to the robot system 100 of FIG. 1 in which the first imaging configuration 160 and the alignment sensor ASen of an operational alignment subsystem OAS are coupled to a stationary element STE (e.g., the stationary element STE of FIG. 1). FIG. 2B is an isometric diagram of the robot system of FIG. 2A, illustrating certain errors that may be indicated by the alignment sensor ASen.

It will be appreciated that certain numbered components (e.g., 1XX or 2XX) of FIGS. 2A and 2B may correspond to and/or have similar operations as identically or similarly numbered counterpart components (e.g., 1XX) of FIG. 1, and may be understood to be similar or identical thereto and may otherwise be understood by analogy thereto and as otherwise described below. This numbering scheme to indicate elements having analogous and/or identical design and/or function is also applied to various other figures herein which include identically or similarly numbered counterpart components. In some cases, reference numbers for obviously similar or identical elements in later figures are omitted to avoid visual clutter and more clearly show and emphasize new or different elements introduced on those later figures. Such similar or identical elements may be recognized in the various figures and may be understood by analogy to previous description except as otherwise indicated by description or context.

In the configuration of FIGS. 2A and 2B the operational alignment actuator configuration AAct shown in FIG. 1 is omitted and the XY scale 170 is coupled to the second arm portion 130 proximate to the distal end DE2 of the second arm portion 130. In various implementations, as described above with respect to FIG. 1, the stationary element STE that the first imaging configuration 160 is coupled to may comprise a frame arranged above the articulated robot 110. In various implementations, different reference axes and lines may be designated for referencing certain movements, coordinates and angles of the components of the articulated robot 110. For example, the first and second arm portions 120 and 130 may each have designated horizontal center lines CL1 and CL2, respectively, passing down the centers of the respective arm portions. An angle A1 may be designated as occurring between the center line CL1 of the first arm portion 120 and an x-z plane (e.g., in accordance with an amount of rotation of the first rotary joint 125 about the first rotary axis RA1). An angle A2 may be designated as occurring between the horizontal center line CL1 of the first arm portion 120 and the horizontal center line CL2 of the second arm portion 130 (e.g., in accordance with an amount of rotation of the second rotary joint 135 about the second rotary axis RA2).

In various implementations, the end tool configuration ETCN may be coupled to the second arm portion 130 proximate to the distal end DE2 of the second arm portion 130 and may be designated as having an end tool axis EA of the end tool ETL that nominally intersects the center line CL2 of the second arm portion 130, and for which the end tool axis EA may generally be assumed to be parallel to the rotary axis RA2 and the z axis. In various implementations, the end tool axis EA passes through the end tool position ETP, and has a known coordinate position offset (i.e., for x and y coordinates) from the XY scale 170. Correspondingly, there may be a known coordinate position offset between the end tool position ETP and the XY scale 170. For example, the XY scale 170 may have a designated reference point (e.g., at a center or edge of the XY scale 170) which has a known coordinate position offset (e.g., a known distance) in an x-y plane from the end tool axis EA and correspondingly from the end tool position ETP. In various implementations, such a known coordinate position offset may be expressed in terms of a known x offset and a known y offset.

In various implementations, the known coordinate position offset between the end tool position ETP and the XY scale 170 may be utilized as part of the process for determining the metrology position coordinates of the end tool position ETP. More specifically, as noted above, the supplementary metrology position coordinates determination system 150 may be configured such that the metrology position coordinate processing portion 185 operates to determine a relative position between the XY scale 170 and the first reference position REF1 (i.e., as defined by the stationary first imaging configuration 160), based on determining an image position of the identified at least one respective imagable feature (i.e., of the XY scale 170) in the acquired image. The supplementary metrology position coordinates determination system 150 may further be configured to determine the metrology position coordinates of the end tool position ETP, based on the determined relative position and a known coordinate position offset between the end tool position ETP and the movable XY scale 170. In one specific example implementation, the known coordinate position offset (e.g., expressed in terms of a known x offset and a known y offset) may be added to or otherwise combined with the determined relative position in order to determine the metrology position coordinates of the end tool position ETP.

As one specific example position coordinate configuration, the XY scale 170 may be designated as having a reference position (e.g., an origin location) at X0, Y0, Z0 (e.g., which for an origin location may have values of 0,0,0). In such a configuration, the reference location REF1 (i.e., as defined by the stationary first imaging configuration 160) may be at relative coordinates of X1, Y1, Z1, and a center of a corresponding field of view FOV1 (e.g., corresponding to an acquired image) may be at relative coordinates of X1, Y1, Z0. A location of the end tool axis EA in an x-y plane extending from the XY scale 170 may be designated as having relative coordinates of X2, Y2, Z0. The end tool position ETP may be designated as having coordinates of X2, Y2, Z2. In various implementations, the end tool ETL may have a measuring point MP (e.g., at the end of an end tool stylus ETST for contacting a workpiece) which may be designated as having coordinates X3, Y3, Z3. In an implementation where the measuring point MP of the end tool ETL does not vary in the x or y directions relative to the rest of the end tool, the X3 and Y3 coordinates may be equal to the X2 and Y2 coordinates, respectively.

In one specific example implementation, an acquired image may be analyzed by the metrology position coordinate processing portion 185 to determine a relative position (e.g., to determine the X1, Y1 coordinates corresponding to the center of the field of view FOV1 of the stationary first imaging configuration 160). Such a determination may be made in accordance with standard camera/scale image processing techniques (e.g., for determining a location of a camera relative to a scale). Various examples of such techniques are described in U.S. Pat. Nos. 6,781,694; 6,937,349; 5,798,947; 6,222,940; and 6,640,008, each of which is hereby incorporated herein by reference in its entirety. In various implementations, such techniques may be utilized to determine the location of a field of view (e.g., as corresponding to a position of a camera) within a scale range (e.g., within the XY scale 170). In various implementations, such a determination may include identifying at least one respective imagable feature included in the acquired image of the XY scale 170 and the related respective known XY scale coordinate location. Such a determination may correspond to determining a relative position between the XY scale 170 and the first reference position REF1 (i.e., as defined by the stationary first imaging configuration 160). The relative X2, Y2 coordinates (i.e., of the end tool position ETP) may then be determined according to the known coordinate position offset between the end tool position ETP and the XY scale 170 (e.g., adding the x and y position offset values to X1 and Y1 in order to determine X2 and Y2).

As previously outlined, FIGS. 2A and 2B show an implementation wherein the first imaging configuration 160 and the alignment sensor ASen of an operational alignment subsystem OAS are coupled to the stationary element STE, and the XY scale 170 is coupled to the movable second arm portion 130. The alignment sensor ASen is located proximate to the first camera CAM1 and is mounted in a rigid configuration relative to the first camera CAM1 and the first imaging configuration 160, according to known methods. In this rigid configuration it is desirable to have the alignment beam ABeam that is output by the alignment sensor Asen aligned parallel, or nearly parallel, to the optical axis OA1 of the first imaging configuration 160. In such a case, when the alignment beam ABeam is aligned normal to the XY scale, then the scale imaging axis SIA is aligned parallel to the optical axis OA1 as required to establish a desired operational configuration according to principles disclosed and claimed herein. However, if the alignment beam ABeam and the optical axis OA1 are only close to parallel, the practical result is a constant offset error that may be irrelevant, or else compensated, in various applications.

For the sake of explanation, FIG. 2A shows an idealized case of a nominal operational configuration, which according to a convention previously explained herein is a passive or open loop alignment configuration wherein the scale imaging axis SIA, defined to be normal to the XY scale 170, and the optical axis OA1 are set up nominally parallel to one another during a set up procedure, and operated in that configuration thereafter. In the illustrated idealized case the various arm portions of the robot system 200 have no significant sag or twist, and the desired operational configuration (wherein the scale imaging axis SIA, defined to be normal to the XY scale 170, is aligned parallel to the optical axis OA1) is set up once, and the desired operational configuration is maintained at the illustrated position as well as other positions of robot system 200 in the absence of any residual misalignments MisAng due to sag or twist, or the like.

The alignment sensor ASen may be of any type suitable for determining direction normal to the XY scale over a limited range of residual misalignments MisAng (shown in FIG. 2B) relative to a nominal or reference orientation. In the implementation illustrated, the desired operational configuration corresponds to the reflected alignment beam ABeamR being reflected back from an alignment reflective feature ARF on the XY scale 170 to the alignment sensor Asen along the same path as the output alignment beam ABeam, to fall on a detector of the alignment sensor Asen at a null or reference position. This generates a null or reference signal value for the previously outlined alignment signal ASig, which indicates no residual misalignment (MisAng=0). An exemplary configuration usable in the alignment sensor ASen is described further below with reference to FIG. 14. Exemplary configurations usable for the XY scale 170 and the alignment feature ARF are described further below with reference to FIGS. 4 and 5.

It will be appreciated that the movable XY scale is configured in a rigid relationship relative to the end tool mounting configuration ETMC, the end tool ETL (e.g. the end tool position ETP), and the measuring point MP of the end tool ETL. Thus, a coordinate offset between the XY scale 170 and the end tool position ETP, and/or the measuring point MP is constant, and may be calibrated. In addition, it will be appreciated that over a limited range of residual misalignments MisAng which may be quantitatively indicated by the alignment sensor Asen, the residual misalignment (e.g. a misalignment angle or vector) of the end tool ETL may be known and the corresponding misalignment or error of the end tool position ETP and/or the measuring point MP may be determined and at least partially corrected or compensated based on the indicated residual misalignment, as described in greater detail with reference to FIG. 2B.

FIG. 2B shows the same configuration shown in FIG. 2A, except in a non-idealized or actual case in which the various arm portions of the robot system 200 have a significant amount of sag or twist (e.g. on the order or tens or hundreds of microns). According to the previously outlined convention, this configuration may still be described as providing a nominal operational configuration that provides positioning and measurement results within the expected or specified nominal range of robot accuracy, (e.g. as has been expected and/or tolerated in various prior art robot systems.)

In the realistic case shown in FIG. 2B, the various arm portions of the robot system 200 have significant sag and/or twist, which results in the XY scale 170 deflecting to a corresponding residual misalignment MisAng (e.g. a residual misalignment angle). For many practical robot systems, the angle of such residual misalignment MisAng is small and the XY scale 170 may be significantly displaced in Z without being significantly displaced in X and Y due to the residual misalignment MisAng. Thus, in comparison to FIG. 2A, the optical axis OA1 is shown to intersect the XY scale at the same X and Y coordinates (X1,Y1), but at a different Z coordinate (Z0', instead of Z0).

However, it may be observed that the end tool position ETP and the measuring point position MP of the "touch probe" end tool ETL are significantly displaced in Z, as well as being significantly displaced in X and Y due to the angle of the residual misalignment MisAng interacting with their respective offsets LoffEPT and LoffMP relative to the scale plane of the XY scale 170. It may be seen that the offsets LoffEPT and LoffMP are along the direction normal to the scale plane (and/or the nominal Z axis.) The offsets may be known by design or calibration. One of ordinary skill in the art will recognize that the coordinate displacements or errors of the measuring point position MP, (X3'-X3) may be approximated as SIN(MisAngX)*LoffMP, and (Y3'-Y3) may be approximated as SIN(MisAngY)*LoffMP, where MisAngX and MisAngY are the angle components of the residual misalignment MisAng in the XZ and YZ planes, respectively. Similarly, the coordinate displacements or errors of the end tool position ETP, (X2'-X2) may be approximated as SIN(MisAngX)*LoffETP, and (Y2'-Y2) may be approximated as SIN(MisAngY)*LoffETP, respectively. These determined coordinate displacements or errors, which are based on the residual misalignment MisAng, may be used to at least partially correct or compensate a set of metrology position coordinates that are indicative of the end tool position ETP or a measuring point position MP of the end tool when a residual misalignment is present as outlined above, at least for a vector component of that set of metrology position coordinates that is at least one of transverse or perpendicular to the scale imaging axis direction (e.g. the X and Y coordinates). In some implementations, the coordinate displacements or errors associated with (Z2'-Z2) and/or (Z3'-Z3) may be approximated based on the residual misalignment MisAng indicated by the alignment sensor ASen and the known geometry and orientations and mechanical characteristics (e.g. beam properties) of the various arm portions and bearings of the robot system 200. In such implementations, errors that would otherwise be present in the Z coordinate of a set of metrology position coordinates may also be at least partially corrected or compensated based on the residual misalignment indicated by the alignment sensor ASen. In some implementations, the magnitude of the residual misalignment MisAng may be assessed in operations of the operational alignment subsystem OAS, and if the magnitude exceeds a predetermined threshold (e.g. related to an error limit) then operations related to compensating or correcting for a translation or displacement of the XY scale 170 across the field of view FOV1 may be performed. For example, X and Y displacements of the XY scale 170 due to large residual misalignments may be approximated based on the residual misalignment MisAng indicated by the alignment sensor ASen and the known geometry and orientations and mechanical characteristics (e.g. beam properties) of the various arm portions and bearings of the robot system 200. In such implementations, errors that would otherwise be present in the X and Y image position coordinates of imagable features of the XY scale 170, and/or a corresponding set of metrology position coordinates, may be at least partially corrected or compensated based on calculations related to the residual misalignment indicated by the alignment sensor ASen. It will be appreciated that the decision whether or not such X and Y image position corrections are to be included in a set of metrology position coordinates that indicate a relative position between the movable one of the XY scale or the first imaging configuration and the first reference position may be based on the magnitude of the residual misalignment and the accuracy desired in a particular application.

Figure 3A:
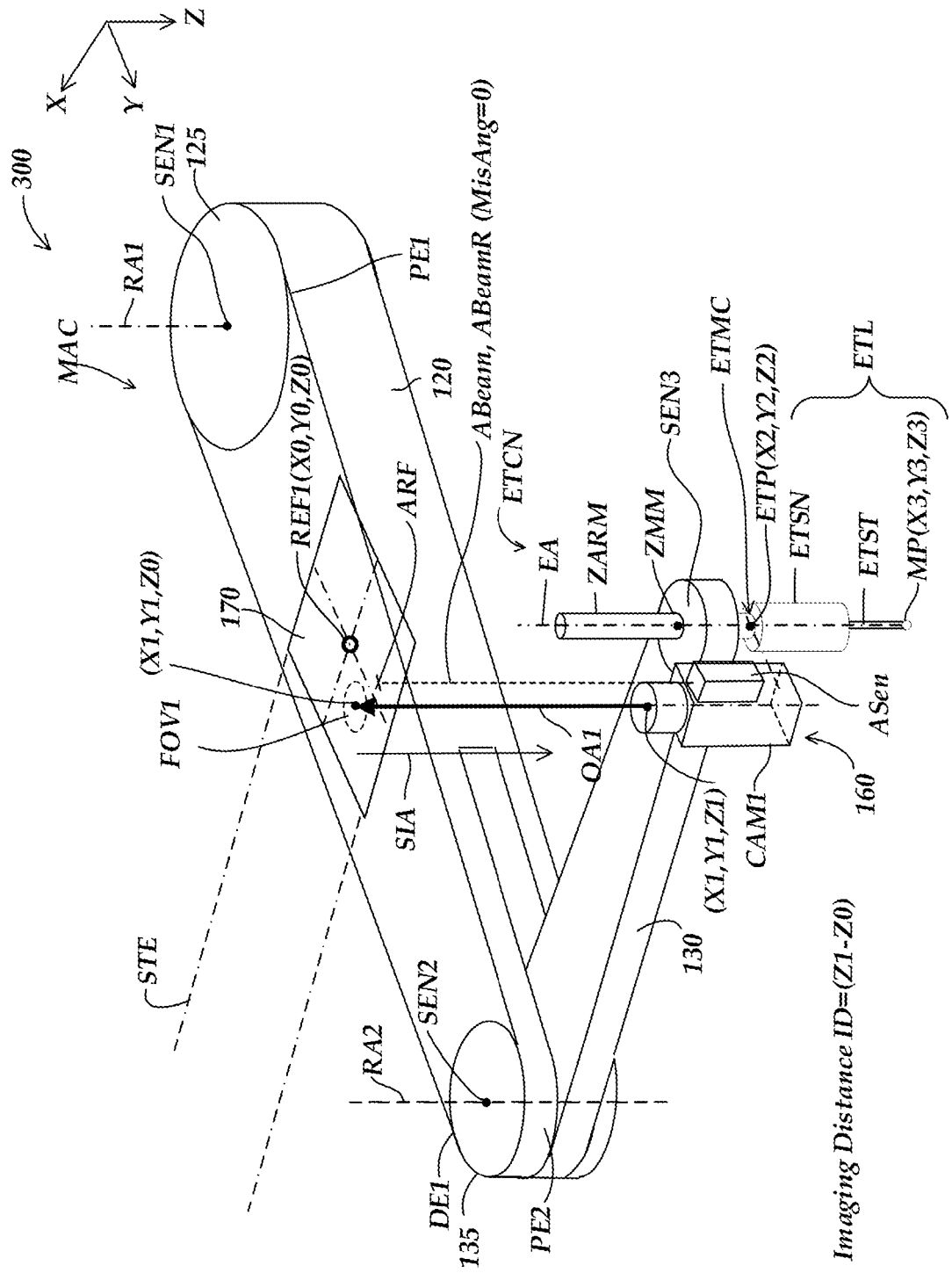
FIG. 3A is an isometric diagram of a third exemplary implementation of a robot system in which an XY scale is coupled to a stationary element and a first imaging configuration and an alignment sensor of an operational alignment subsystem are coupled to a moving element.
Figure 3B:
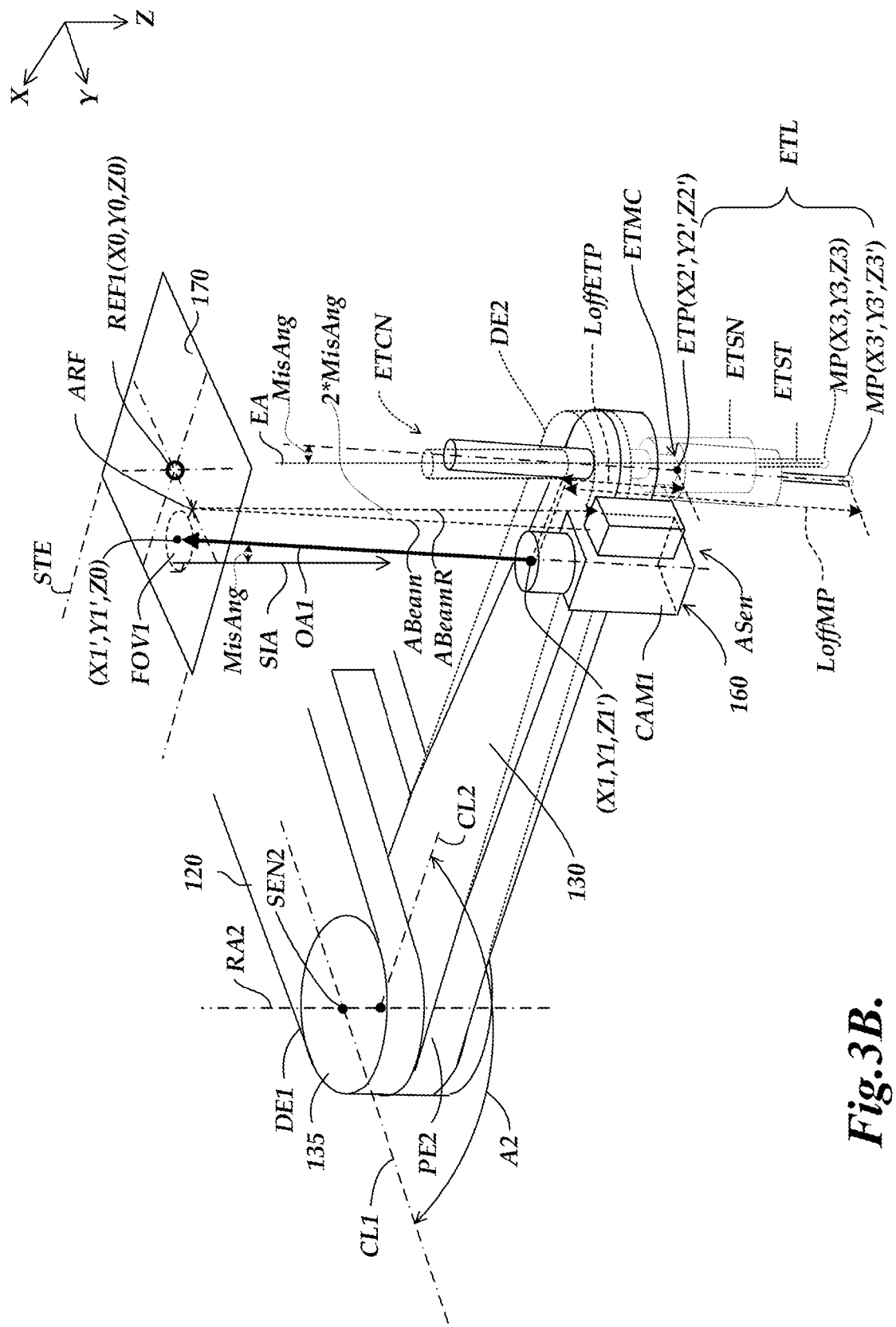
FIG. 3B is an isometric diagram of the robot system of FIG. 3A, illustrating certain errors that may be indicated by the alignment sensor.

FIGS. 3A and 3B are isometric diagrams of a third exemplary implementation of a robot system 300 similar to the robot system 100 of FIG. 1 and the robot system 200 of FIGS. 2A and 2B, except the first imaging configuration 160 and the alignment sensor ASen of an operational alignment subsystem OAS are coupled to a movable second arm portion 130 proximate to the distal end DE2 of the second arm portion 130, and the XY scale 170 is coupled to the stationary element STE and defines the first reference position REF1. In particular, FIG. 3B is an isometric diagram of the robot system of FIG. 3A, illustrating certain errors that may be indicated by the alignment sensor ASen. Similarly to the configuration of FIGS. 2A and 2B the operational alignment actuator configuration AAct shown in FIG. 1 is omitted.

As previously indicated, certain numbered components (e.g., 3XX) of FIGS. 3A and 3B may correspond to identically or similarly numbered counterpart components (e.g., 1XX, 2XX) of FIGS. 1, 2A and 2B and may be similar or identical thereto and may be understood by analogy thereto and as otherwise described below. In some cases, obviously similar or identical elements in later figures may have their reference numbers omitted to avoid visual clutter, but they may be understood as previously outlined.

FIG. 3A may be understood in many respects by analogy with the previous description of FIG. 2A, therefore only significant differences are emphasized below. Regarding FIG. 3A, the first imaging configuration 160 may have a designated reference point (e.g., at a center of an effective lens position of the first imaging configuration 160), which is illustrated as having the coordinates (X1, Y1, Z1).

Similarly to FIG. 2A, for the sake of explanation, FIG. 3A shows an idealized case of a nominal operational configuration, which according to the same convention previously described with reference to FIG. 2A is a passive or open loop alignment configuration wherein the scale imaging axis SIA and the optical axis OA1 are set up nominally parallel to one another and operated in that configuration thereafter. In the illustrated idealized case the various arm portions of the robot system 200 have no significant sag or twist, and the desired nominal operational configuration is maintained. In the implementation illustrated, the desired operational configuration corresponds to the reflected alignment beam ABeamR being reflected back from an alignment reflective feature ARF on the XY scale 170 to the alignment sensor Asen along the same path as the output alignment beam ABeam, to generate a null or reference signal value for the previously outlined alignment signal ASig, which indicates no residual misalignment (MisAng=0), as previously described with reference to FIG. 2A.

It will be appreciated that the movable first imaging configuration 160 and the alignment sensor ASen are configured in a rigid relationship relative to one another and to the end tool mounting configuration ETMC, the end tool ETL (e.g. the end tool position ETP), and the measuring point MP of the end tool ETL. Thus, a coordinate offset between the designated reference point of the first imaging configuration 160 and the end tool position ETP, and/or the measuring point MP is constant, and may be calibrated. In addition, it will be appreciated that over a limited range of residual misalignments MisAng which may be quantitatively indicated by the alignment sensor Asen, the residual misalignment (e.g. a misalignment angle or vector) of the end tool ETL may be known and the corresponding misalignment or error of the end tool position ETP and/or the measuring point MP may be determined and at least partially corrected or compensated based on the indicated residual misalignment, which may be understood by analogy with the similar determination and correction of compensation previously outlined with reference to FIG. 2B.

FIG. 3B shows the same configuration shown in FIG. 3A, except in a non-idealized or actual case in which the various arm portions of the robot system 300 have a significant amount of sag or twist (e.g. on the order of tens or hundreds of microns). According to the previously outlined convention, this configuration may still be described as providing a nominal operational configuration that provides positioning and measurement results within the expected or specified nominal range of robot accuracy, (e.g. as has been expected and/or tolerated in various prior art robot systems.) FIG. 3A may be understood in many respects by analogy with the previous description of FIG. 2B, therefore only significant differences are emphasized below.

Regarding FIG. 3B, an additional error may arise due to the residual misalignment MisAng, which is not present in the configuration shown in FIGS. 2A and 2B. In particular, the field of view FOV1 of the first imaging configuration 160 will translate across the XY scale 170 from its desired or reference alignment position (e.g. as shown in FIG. 3A) depending on the residual misalignment MisAng, leading to an FOV misalignment error. It will be understood that the apparent position of the first imaging configuration 160 relative to the XY scale 170 (at least regarding its X,Y coordinates) is generally inferred based on determining an image position of at least one respective identifiable feature of the XY scale 170 in an acquired image. In the absence of information regarding the residual misalignment MisAng, the FOV misalignment error outlined above is not generally detectable, and manifests as a corresponding error in the determined image position of the at least one respective identifiable feature of the XY scale 170. For example, FIG. 3A shows that when MisAng=0, the scale feature positioned along the optical axis OA1 in an acquired image has the X and Y position coordinates (X1, Y1), the same as the position coordinates (X1, Y1) of the designated reference point of the first imaging configuration 160. In contrast, due to the residual misalignment MisAng shown in FIG. 3B, the scale feature positioned along the optical axis OA1 in an acquired image has the "translated" X and Y position coordinates (X1', Y1'), which are different than the actual position coordinates (X1, Y1) of the designated reference point of the first imaging configuration 160, resulting in a corresponding error (the FOV misalignment error) when estimating or determining the position of the first imaging configuration based on that acquired image.

However, over a limited range of residual misalignments MisAng which may be quantitatively indicated by the alignment sensor Asen, the residual misalignment (e.g. a misalignment angle or vector) may be known and the corresponding FOV misalignment error may be determined and at least partially corrected or compensated based on the indicated residual misalignment MisAng. One of ordinary skill in the art will recognize that the FOV misalignment error (X1'-X1) along the X direction may be approximated as SIN(MisAngX)*ID, and the FOV misalignment error (Y1'-Y1) along the Y direction may be approximated as SIN(MisAngY)*ID, where MisAngX and MisAngY are the angle components of the residual misalignment MisAng in the XZ and YZ planes, respectively. It will be understood that such determined FOV misalignment displacements or errors, which are based on the residual misalignment MisAng, may be used to at least partially correct or compensate an image position error and/or the resulting set of metrology position coordinates, at least for a vector component of that set of metrology position coordinates that is at least one of transverse or perpendicular to the scale imaging axis direction (e.g. the X and Y coordinates).

It will be understood that the image position correction outlined immediately above may be combined with the previously outlined corrections that may arise in relation to the end tool position ETP and/or the measuring point MP due to their respective offsets in combination with residual misalignment errors, to determine a set of metrology position coordinates that are indicative of the end tool position ETP or a measuring point position of the end tool at an image acquisition time, with an accuracy level that is better than the robot accuracy, at least for a vector component of the second set of metrology position coordinates that is at least one of transverse or perpendicular to the scale imaging axis direction. In some implementations, the coordinate displacements or errors associated with (Z2'-Z2) and/or (Z3'-Z3) may be approximated based on the residual misalignment indicated by the alignment sensor ASen and the known geometry and orientations and mechanical characteristics (e.g. beam properties) of the various arm portions and bearings of the robot system 300. In such implementations, errors that would otherwise be present in the Z coordinate of a set of metrology position coordinates may also be at least partially corrected or compensated based on the residual misalignment indicated by the alignment sensor ASen.

The various configurations and operations outlined above with reference to FIGS. 2A, 2B, 3A and 3B, wherein the operational alignment subsystem OAS does not comprise an operational alignment actuator configuration AAct, may be summarized as follows. A robot system 200, 300 comprises a robot comprising a movable arm configuration MAC and a motion control system. The movable arm configuration MAC comprises an end tool mounting configuration ETMC that is located proximate to a distal end of the movable arm configuration MAC, and the robot is configured to move the movable arm configuration MAC so as to move at least a portion of an end tool ETL that is mounted to the end tool mounting configuration ETMC along at least two dimensions in an end tool working volume. The motion control system is configured to control an end tool position ETP or a measuring point position MP of the end tool ETL with a level of accuracy defined as a robot accuracy, based at least in part on sensing and controlling the position of the movable arm configuration MAC using at least one position sensor SEN included in the robot. The robot system further comprises a supplementary metrology position coordinates determination system 150, comprising a first imaging configuration 160, and XY scale 170, an operational alignment subsystem OAS, an image triggering portion 181, and a metrology position coordinate processing portion 185. The first imaging configuration 160 comprises a first camera CAM1, and has an optical axis OA1. As described in greater detail below, the XY scale 170 comprised a nominally planar substrate and a plurality of respective imagable features distributed on the substrate, wherein the respective imagable features are located at respective known XY scale coordinates on the XY scale and a scale plane is defined to nominally coincide with the planar substrate of the XY scale, and a direction normal to the scale plane is defined as a scale imaging axis direction SIA. The operational alignment subsystem OAS comprises at least an alignment sensor ASen, wherein the alignment sensor ASen is located proximate to the first camera CAM1 and is mounted in a rigid configuration relative to the first camera CAM1, and the alignment sensor ASen is configured to provide an alignment signal Asig indicative of the scale imaging axis direction SIA. The image triggering portion is configured to input at least one input signal that is related to the end tool position ETP or a measuring point position MP of the end tool ETL and determine the timing of a first imaging trigger signal based on the at least one input signal and output the first imaging trigger signal to the first imaging configuration 160, wherein the first imaging configuration 160 is configured to acquire a digital image of the XY scale at an image acquisition time in response to receiving the first imaging trigger signal. The metrology position coordinate processing portion is configured to input the acquired image and identify at least one respective imagable feature included in the acquired image of the XY scale, and the related respective known XY scale coordinate location.

In such configurations, the supplementary metrology position coordinates determination system 150 is configured with a movable one of the XY scale 170, or the first imaging configuration 160 and the alignment sensor Asen, coupled to the movable arm configuration MAC, and the other one of the XY scale 170 or the first imaging configuration 160 and the alignment sensor Asen coupled to a stationary element STE proximate to the robot, with the stationary one of the XY scale 170 or the first imaging configuration 160 defining a first reference position. The robot system is configured to provide at least a nominal operational configuration of the supplementary metrology position coordinates determination system 150, wherein in the nominal operational configuration of the supplementary metrology position coordinates determination system 150 the XY scale 170 and the first imaging configuration 160 are arranged with the optical axis OA1 of the first imaging configuration 160 nominally parallel to the direction of the scale imaging axis direction SIA and with the scale plane located within the range of focus of the first imaging configuration 160 along the scale imaging axis direction SIA. The robot system is further configured to operate the operational alignment subsystem OAS to determine a residual misalignment MisAng between the optical axis OA1 and the scale imaging axis SIA as indicated by the alignment signal ASig provided by the alignment sensor ASen. The supplementary metrology position coordinates determination system 150 is further configured such that when the moveable one of the XY scale 170 or the first imaging configuration 160 and the stationary one of the XY scale 170 or the first imaging configuration 160 are arranged in the nominal operational configuration, and the movable arm configuration MAC is positioned with the XY scale 170 in a field of view FOV1 of the first imaging configuration 160, then the metrology position coordinate processing portion 150 is operable to acquire the digital image of the XY scale 170 at an image acquisition time, and determine a corresponding residual misalignment MisAng. The supplementary metrology position coordinates determination system may then determine a first set of metrology position coordinates that indicate a relative position between the movable one of the XY scale 170 or the first imaging configuration 160 and the first reference position with an accuracy level that is better than the robot accuracy at least for a vector component of the first set of metrology position coordinates that is at least one of transverse or perpendicular to the scale imaging axis direction, based on an image position of the identified at least one respective imagable feature in the acquired image and the corresponding residual misalignment MisAng. The metrology position coordinate processing portion 150 may further be operable to determine a second set of metrology position coordinates that are indicative of the end tool position ETP or a measuring point position MP of the end tool ETL at the image acquisition time based on the first set of metrology position coordinates and the corresponding residual misalignment MisAng, with an accuracy level that is better than the robot accuracy, at least for a vector component of the second set of metrology position coordinates that is at least one of transverse or perpendicular to the scale imaging axis direction SIA.

FIG. 4 is an isometric diagram of an exemplary implementation of an incremental XY scale 170A. As illustrated in FIG. 4, the incremental XY scale 170A includes an array of evenly spaced incremental imagable features IIF. In various implementations, the incremental XY scale 170A may have a periodicity that is smaller than 100 microns (e.g., for which periodic spacings XSP1 and YSP1 between the incremental imagable features IIF along the respective x and y axes may each be less than 100 microns). In various implementations, the position information that is determined utilizing the incremental XY scale 170A may have an accuracy of at least 10 microns. In contrast to a robot accuracy that may be approximately 100 microns or more in certain implementations, the accuracy determined utilizing such an XY scale 170A may be approximately 10× better than the robot accuracy. In one specific example implementation, the incremental XY scale 170A may have an even higher periodicity of approximately 10 microns, for which, if the magnification of the first imaging configuration 160 is approximately 1×, and interpolation is performed by a factor of 10×, an approximately 1 micron accuracy may be achieved. Such a configuration would have an approximately 100× improvement in accuracy over a robot accuracy of approximately 100 microns.

In various implementations, a location of a field of view FOV of the first imaging configuration 160 within the incremental XY scale 170A may provide an indication of a relative position between the XY scale 170A and the first reference position REF1. In various implementations, the first imaging configuration 160 may be utilized in combination with the incremental XY scale 170A as part of a camera/scale image processing configuration. For example, the metrology position coordinate processing portion 185 may determine a relative incremental position between the XY scale 170A and the first reference position REF1 based on the location of the field of view FOV within the incremental XY scale 170A, as indicated by the portion of the XY scale 170A in the acquired image, and as is known in the art for camera/scale image processing techniques (e.g., as described in the previously incorporated references). In various implementations, the incremental XY scale 170A may be of various sizes relative to the field of view FOV (e.g., the incremental XY scale 170A may be at least 4×, 10×, 20×, etc. larger than the field of view FOV).

In various implementations, the incremental position indicated by the XY scale 170A may be combined with position information from the articulated robot 110 to determine a relatively precise and/or absolute position. For example, the sensors SEN1 and SEN2 (e.g., rotary encoders) of the articulated robot 110 may indicate the end tool position ETP with the robot accuracy, for which the incremental position indicated by the XY scale 170A may be utilized to further refine the determined end tool position ETP to have an accuracy that is better than the robot accuracy. In one such configuration, the metrology position coordinate processing portion 185 may be configured to identify one or more respective imagable features IIF included in the acquired image of the XY scale 170A based on the image positions of the one or more imagable features IFF in the acquired image and based on articulated robot position data derived from the motion control system 140 corresponding to the image acquisition time.

In such configurations, the respective imagable features IFF of the XY scale 170A may comprise a set of similar imagable features IFF that are distributed on the substrate such that they are spaced apart from one another at regular intervals by a distance that is more than a maximum position error that is allowed within the robot accuracy. As illustrated in FIG. 4, the imagable features IFF are spaced apart (e.g., at spacings XSP1 and YSP1) by more than a maximum position error MPE as represented by a circle surrounding a representative imagable feature IFF. It will be appreciated that in such a configuration, the robot accuracy for the position determination is sufficient to determine the location with an accuracy that is greater than the spacing between the imagable features IFF. More specifically, in various implementations, a single imagable feature IFF on the XY scale 170A (i.e., wherein the imagable features are all at known x and y metrology position coordinates on the XY scale 170A according to the even spacings across the scale) may thus be identified by the articulated robot position data with sufficient accuracy so that no two imagable features IFF may be confused with one another. In such a configuration, the location of single imagable feature IFF in the acquired image may then be utilized to further refine the end tool position ETP to have an accuracy that is better than the robot accuracy, at least for x and y metrology position coordinates of the end tool position ETP in an x-y plane that is perpendicular to the z axis.

As described above with respect to FIG. 2, in one specific example implementation, the XY scale 170A may be designated as having a reference position (e.g., an origin location) at X0, Y0, Z0 (e.g., which for an origin location may have values of 0,0,0). In such a configuration, the reference location REF1 (i.e., as defined by the stationary first imaging configuration 160) may be at relative coordinates of X1, Y1, Z1, and a center of a corresponding field of view FOV (e.g., as captured in an acquired image) may be at relative coordinates of X1, Y1, Z0. A location of the end tool axis EA in an x-y plane extending from the XY scale 170 may be designated as having relative coordinates of X2, Y2, Z0. The end tool position ETP may be designated as having coordinates of X2, Y2, Z2.

In operation, an acquired image may be analyzed by the metrology position coordinate processing portion 185 to determine the X1, Y1 coordinates corresponding to the center of the field of view FOV of the stationary first imaging configuration 160. In various implementations, such a determination may be made in accordance with standard camera/scale image processing techniques, for determining a location of a field of view (e.g., corresponding to a location of a camera) within a scale range (e.g., within the XY scale 170A). It will be appreciated that in accordance with standard camera/scale image processing techniques, the reference position/origin location X0, Y0, Z0 is not required to be in the field of view FOV for such a determination to be made (i.e., the relative position may be determined from the scale information at any location along the XY scale 170A, as provided in part by the scale elements comprising the evenly spaced incremental imagable features IIF). In various implementations, such a determination may include identifying at least one respective imagable feature included in the acquired image of the XY scale 170 and the related respective known XY scale coordinate location. Such a determination may correspond to determining a relative position between the XY scale 170 and the first reference position REF1 (i.e., as defined by the stationary first imaging configuration 160). The relative X2, Y2 coordinates (i.e., of the end tool position ETP) may then be determined according to the known coordinate position offset between the end tool position ETP and the XY scale 170 (e.g., adding the x and y position offset values to X1 and Y1 in order to determine X2 and Y2).

A specific illustrative example of combining the position information from the articulated robot 110 with the incremental position information indicated by the XY scale 170A to determine a relatively precise and/or absolute position is as follows. As illustrated in FIG. 4, the acquired image may indicate that the center of the field of view FOV is in the middle of four incremental imagable features IIF, but may not indicate which specific four incremental imagable features IIF of the XY scale 170 are included in the image. The position information from the articulated robot 110 may be accurate enough to provide such information, for which the specific four incremental imagable features IIF of the XY scale 170A may be identified (e.g., based in part on the principles noted above by which the imagable features IFF are spaced apart by more than a maximum position error as represented by a representative circular area MPE so that each imagable feature IFF may be uniquely identified). The acquired image may then be analyzed by the metrology position coordinate processing portion 185 to determine precisely where the center of the field of view (i.e., at the coordinates X1, Y1, Z0) occurs within that section of the XY scale (i.e., which includes the specific four incremental imagable features IIF). The process may then continue as indicated above (e.g., for correspondingly determining the X2 and Y2 coordinates of the end tool position ETP).

Regarding the use of an XY scale 170A, or the like, with the alignment sensor ASen, as shown in FIGS. 2A-3B the alignment beam ABeam is reflected from an alignment reflective feature ARF on a surface parallel to the scale plane. In various implementations, the reflective features ARF may be the imagable features IFF and the alignment beam ABeam may be positioned to reflect off of such features based on moving the robot to do so (using the robot accuracy is sufficient.) It will be appreciated that the alignment sensor need not operate everywhere on the XY scale 170A, and does not need to operate continuously. The alignment beam ABeam may be operated intermittently to avoid related "noise" in the acquired scale images, for example.

For best performance of the alignment sensor, it may be desirable that the alignment reflective features ARF are larger than the spot size of the alignment beam Abeam. If this conflicts with a desired size of the imagable features IFF, then additional larger features ARF may be provided at various locations on the XY scale, as schematically represented by the optional alignment reflective features ARF show in FIG. 4. It will be appreciated that in other implementations, the alignment beam Abeam may have a wavelength that is invisible to the first imaging configuration 160 (e.g. based on camera sensitivity or wavelength filtering), and the XY scale 170A may include a wavelength specific reflective layer everywhere, which allows the alignment sensor ASen to operate everywhere on the XY scale 170A and/or continuously.

Figure 5:
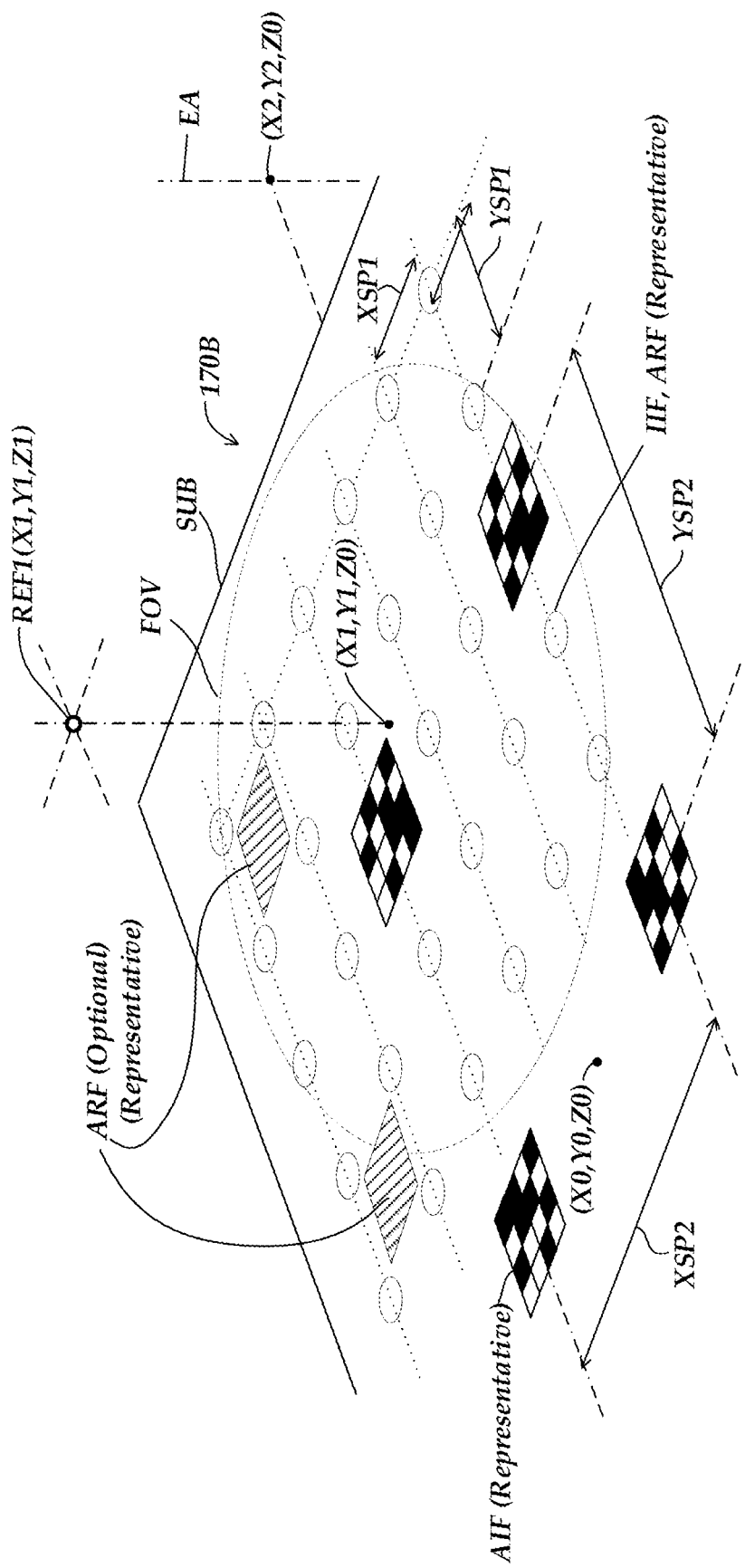
FIG. 5 is an isometric diagram of an exemplary implementation of an absolute XY scale.

FIG. 5 is an isometric diagram of an exemplary implementation of an absolute XY scale 170B. Regarding the use of the XY scale 170B, or the like with the alignment sensor ASen, it will be understood that the considerations are the same as those previously outlined with reference FIG. 4. In the example of FIG. 5, similar to the incremental XY scale 170A, the absolute XY scale 170B includes an array of evenly spaced incremental imagable features IIF, and also includes a set of absolute imagable features AIF having unique identifiable patterns (e.g., a 16-bit pattern). In operation, a location of a field of view FOV of the first imaging configuration 160 within the absolute XY scale 170B (i.e., as included in a captured image) provides an indication of an absolute position between the XY scale 170B and the first reference position REF1. In the implementation of FIG. 5, the set of absolute imagable features AIF are distributed on the substrate SUB such that they are spaced apart (e.g., at spacings XSP2 and YSP2) by less than a distance corresponding to a distance across a field of view FOV of the first imaging configuration 160 (i.e., so that at least one absolute imagable feature AIF will always be included in a field of view). In operation, the metrology position coordinate processing portion 185 is configured to identify at least one respective absolute imagable feature AIF included in the acquired image of the XY scale 170B based on the unique identifiable pattern of the respective absolute imagable feature AIF. It will be appreciated that such implementations are able to independently determine an absolute position that is indicative of the end tool position ETP with an accuracy that is better than the robot accuracy, at least for x and y metrology position coordinates of the end tool position ETP in an x-y plane that is perpendicular to the z axis (e.g., and which, in contrast to the incremental XY scale 170B, may not require combining with position information from the articulated robot 110 to determine the absolute position).

A specific illustrative example of utilizing the absolute imagable features AIF to determine a relatively precise and absolute position is as follows. As illustrated in FIG. 5, the acquired image may indicate that the center of the field of view FOV is in the middle of a number of incremental imagable features IIF. The position information from the included two absolute imagable features AIF indicates which section of the XY scale 1706 the image includes, for which the included incremental imagable features IIF of the XY scale 170 may also be identified. The acquired image may, accordingly, be analyzed by the metrology position coordinate processing portion 185 to determine precisely where the center of the field of view (i.e., at the coordinates X1, Y1, Z0) occurs within that section of the XY scale (i.e., which includes the two absolute imagable features and the incremental imagable features IIF). The process may then continue as indicated above (e.g., for correspondingly determining the X2 and Y2 coordinates of the end tool position ETP).

Figure 6:
FIG. 6 is a flow diagram illustrating a first exemplary implementation of a routine for operating a robot system including a robot and a supplementary metrology position coordinates determination system as disclosed herein.

FIG. 6 is a flow diagram illustrating an exemplary implementation of a routine 600 for operating a robot system including a robot and a supplementary metrology position coordinates determination system that includes an operational alignment subsystem that does not include an operational alignment actuator configuration AAct. As shown in FIG. 6A, at a decision block 610, a determination is made as to whether the robot system is to be operated in a supplementary metrology position coordinates mode. In various implementations, a selection and/or activation of a supplementary metrology position coordinates mode or a standard robot position coordinates mode may be made by a user and/or may be automatically made by the system in response to certain operations and/or instructions. For example, in one implementation a supplementary metrology position coordinates mode may be entered (e.g., automatically or in accordance with a selection by a user) when the articulated robot moves into a particular position (e.g., moves an end tool from a general area where assembly or other operations are performed to a more specific area where workpiece inspection operations are typically performed and where the supplementary metrology position coordinates mode would be utilized). In various implementations, such modes may be implemented by an external control system ECS (e.g., such as the external control system ECS of FIG. 1 utilizing a standard robot position coordinates mode portion 147 and a supplementary metrology position coordinates mode portion 187). In various implementations, a hybrid mode may be operated either independently or as part of a supplementary metrology position coordinates mode and/or may be implemented as a switching between the modes, as will be described in more detail below with respect to FIG. 7.

If at the decision block 610 it is determined that the robot system is not to be operated in a supplementary metrology position coordinates mode, the routine proceeds to a block 615, where the robot system is operated in a standard robot position coordinates mode. As part of the standard robot position coordinates mode, the position sensors (e.g., rotary encoders) of the articulated robot are utilized to control and determine the articulated robot movements and corresponding end tool position with the robot accuracy (e.g., which is based at least in part on the accuracy of the position sensors of the articulated robot). As noted above, the first and second rotary encoders may indicate the positions of the first and second arm portions with a lower degree of accuracy than the position information that is determined utilizing the XY scale. In general, the robot position coordinates mode may correspond to an independent and/or standard mode of operation for the articulated robot (e.g., a mode in which the articulated robot is operated independently, such as when a supplementary metrology position coordinates determination system is not active or is otherwise not provided).

If the robot system is to be operated in a supplementary metrology position coordinates mode, the routine proceeds to a block 620, where the robot and supplementary metrology position coordinates determination system are arranged to provide a "nominal" operational configuration of the supplementary metrology position coordinates determination system. The "nominal" operational configuration has been previously defined according to a convention used herein. A scale plane is defined to nominally coincide with a planar substrate of the XY scale, and a direction normal to the scale plane is defined as a scale imaging axis direction. In the "nominal" operational configuration, at least one of the XY scale or the first imaging configuration is arranged with the optical axis of the first imaging configuration nominally parallel to the scale imaging axis direction, and the scale plane is located in the focus range of the first imaging configuration along the scale imaging axis direction.

At a block 630, at least one input signal is received (i.e., at an image triggering portion) that is related to an end tool position or a measuring point position of the end tool of an articulated robot. A timing is determined of a first imaging trigger signal based on the at least one input signal and the first imaging trigger signal is output to a first imaging configuration. The first imaging configuration acquires a digital image of an XY scale at an image acquisition time in response to receiving the first imaging trigger signal.

At a block 635, the operational alignment subsystem is operated (e.g. by the robot system) to determine a residual misalignment between the optical axis and the scale imaging axis as indicated by the alignment signal provided by the alignment sensor, the residual misalignment corresponding to the acquired digital image. In various implementations, a residual misalignment that corresponds to the acquired digital may depend on the situation. For the best accuracy, it may be desirable that the residual misalignment is established with the movable arm configuration of the robot in the same (or nearly the same) position and/or pose that is to be used during the operations of block 630. However, if the robot arm configuration is sufficiently stiff, and/or the position and/or pose used during the operations of block 635 is close to that used during the operations of block 630, and/or the accuracy requirements in a particular situation are not too stringent, then the operations of block 635 and 630 may be performed at different locations and/or times and the residual misalignment determined at block 635 may sufficiently correspond to the digital image acquired at block 630.

At a block 640, the acquired image is received (e.g., at a metrology position coordinate processing portion), and at least one respective imagable feature included in the acquired image of the XY scale and the related respective known XY scale coordinate location are identified.

At a block 650, a first set of metrology position coordinates are determined that indicate a relative position between the movable one of the XY scale or the first imaging configuration and the first reference position with an accuracy better than the robot accuracy, at least for a vector component of the first set of metrology position coordinates that is at least one of transverse or perpendicular to the scale imaging axis direction. The first set of metrology position coordinates are determined based on an image position of the identified at least one respective imagable feature in the acquired image and the corresponding residual misalignment (e.g. as previously outlined with reference to FIGS. 2A, 2B, 3A and/or 3B).

At an optional block 655, a second set of metrology position coordinates may be determined that are indicative of the end tool position or a measuring point position of the end tool at the image acquisition time, based on the first set of metrology position coordinates and the corresponding residual misalignment, with an accuracy level that is better than the robot accuracy, at least for a vector component of the second set of metrology position coordinates that is at least one of transverse or perpendicular to the scale imaging axis direction. It will be understood that the first set of metrology coordinates determined at block 650 are indictive of a local reference position of the movable one of the XY scale or the first imaging configuration. The operations of this block 655 are related to correcting errors related to the effect of the residual misalignment on a known offset between the end tool position or a measuring point position of the end tool and the reference position of the movable one of the XY scale or the first imaging configuration, for example as emphasized in the description of FIGS. 2A and 2B. After the operations at block 650 (or 655), the routine may end.

Alternatively, after the operations at block 650 (or 655), the routine may be partially or completely repeated. For example, the determined position information (e.g., from the block 655) may correspond to or otherwise be utilized for determining a first surface location on a workpiece, and the routine may be repeated for which a second surface location on the workpiece may then be determined (e.g., as part of a workpiece measurement such as measuring a feature of a workpiece). In repeating the routine, in various implementations the operations at the block 620 need not be repeated. In any case, the first and second determined metrology position coordinates determined by repeating the routine 600 that are indicative of the first and second relative positions and/or related position information may be utilized to determine a dimension of the workpiece that corresponds to a distance between the first and second surface locations on the workpiece that correspond to the respective end tool positions or measuring point positions of the end tool when contacting the respective first and second surface locations on the workpiece, etc. at respective image acquisition times. It will be appreciated that rather than using the position sensors (e.g., rotary encoders, linear encoders, etc.) of the robot to determine the first and second surface locations on the workpiece with the robot accuracy, more accurate position information may be determined utilizing the techniques as described herein. More specifically, the determination of the first and second surface locations (i.e., as corresponding to the first and second determined metrology position coordinates which correspond to respective first and second locations on the XY scale for which a precise distance between such coordinates/locations may be determined utilizing the techniques as described above in accordance with the accuracy of the XY scale) allows the corresponding dimension of the workpiece (e.g., of a workpiece feature) between the first and second surface locations to be determined with a high degree of accuracy.

Figure 7:
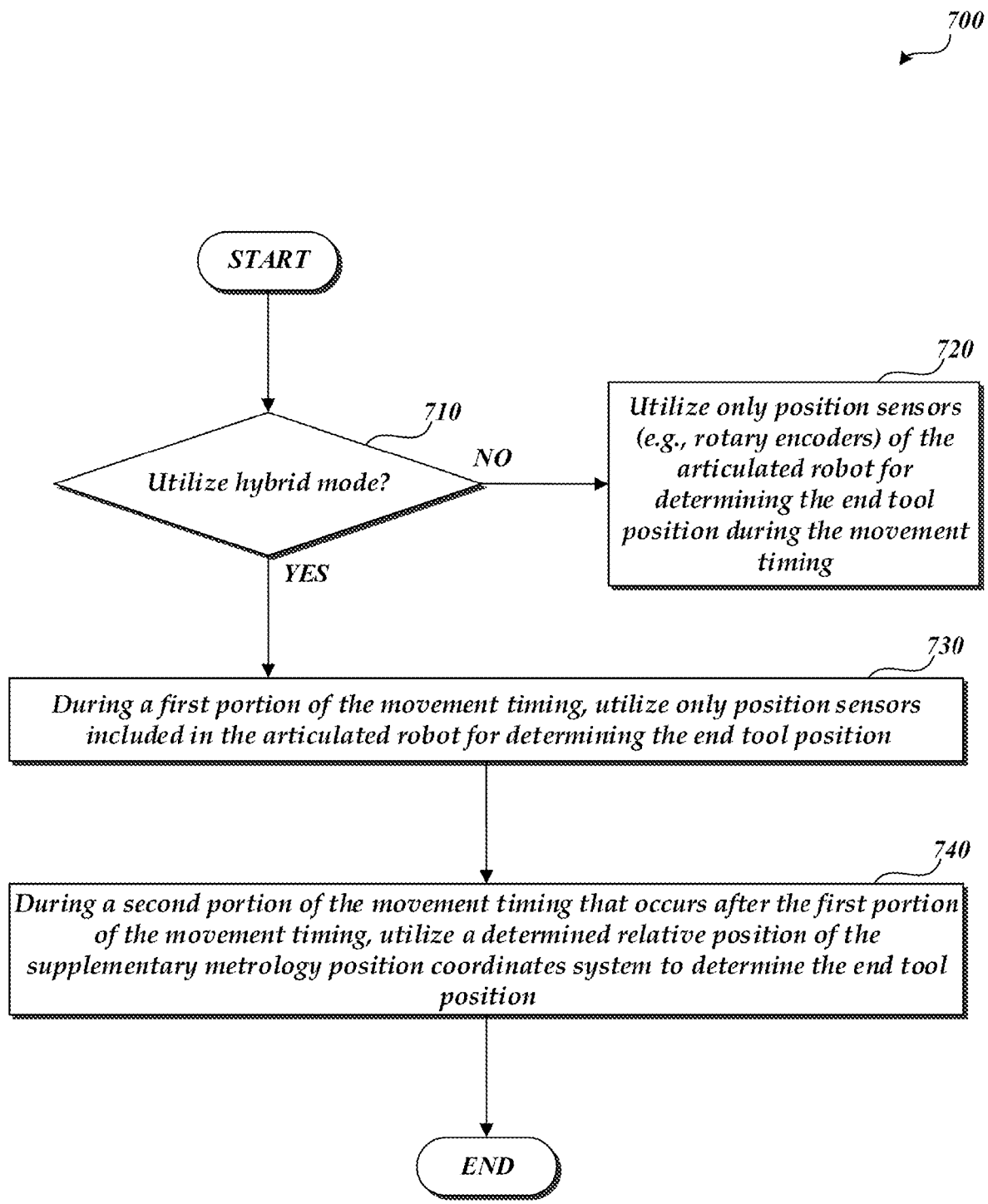
FIG. 7 is a flow diagram illustrating a first exemplary implementation of a routine for determining an end tool position in which robot position sensors may be utilized during a first portion of a movement timing and a determined relative position of a supplementary metrology position coordinates determination system may be utilized during a second portion of a movement timing.

FIG. 7 is a flow diagram illustrating one exemplary implementation of a routine 700 for determining an end tool position in which different techniques may be utilized during different portions of a movement timing. In general, during the movement timing one or more arm portions of the articulated robot are moved from first rotary positions to second rotary positions (e.g., which may include rotating the arm portions around rotary joints from first rotary orientations to second rotary orientations). As shown in FIG. 7, at a decision block 710, a determination is made as to whether a hybrid mode will be utilized for determining the end tool position during the movement timing. In various implementations, a hybrid mode may also be representative of a process which includes switching between the supplementary metrology position coordinates mode and the standard robot position coordinates mode. If the hybrid mode is not to be utilized, the routine continues to a block 720, where the position sensors (e.g., rotary encoders) of the articulated robot are solely utilized for determining the end tool position during the movement timing.

If the hybrid mode is to be utilized, the routine proceeds to a block 730, for which during a first portion of a movement timing, the position sensors included in the articulated robot are utilized for determining the end tool position. During such operations, a relative position of a supplementary metrology position coordinates determination system may not be determined and/or is otherwise not utilized to determine the end tool position. At a block 740, during a second portion of the movement timing that occurs after the first portion of the movement timing, a determined relative position of the supplementary metrology position coordinates determination system is utilized to determine the end tool position. It will be appreciated that such operations enable the system to perform initial/fast/coarse movement of the end tool position during the first portion of the movement timing, and to perform more accurate final/slower/fine movement of the end tool position during the second portion of the movement timing.

Figure 8:
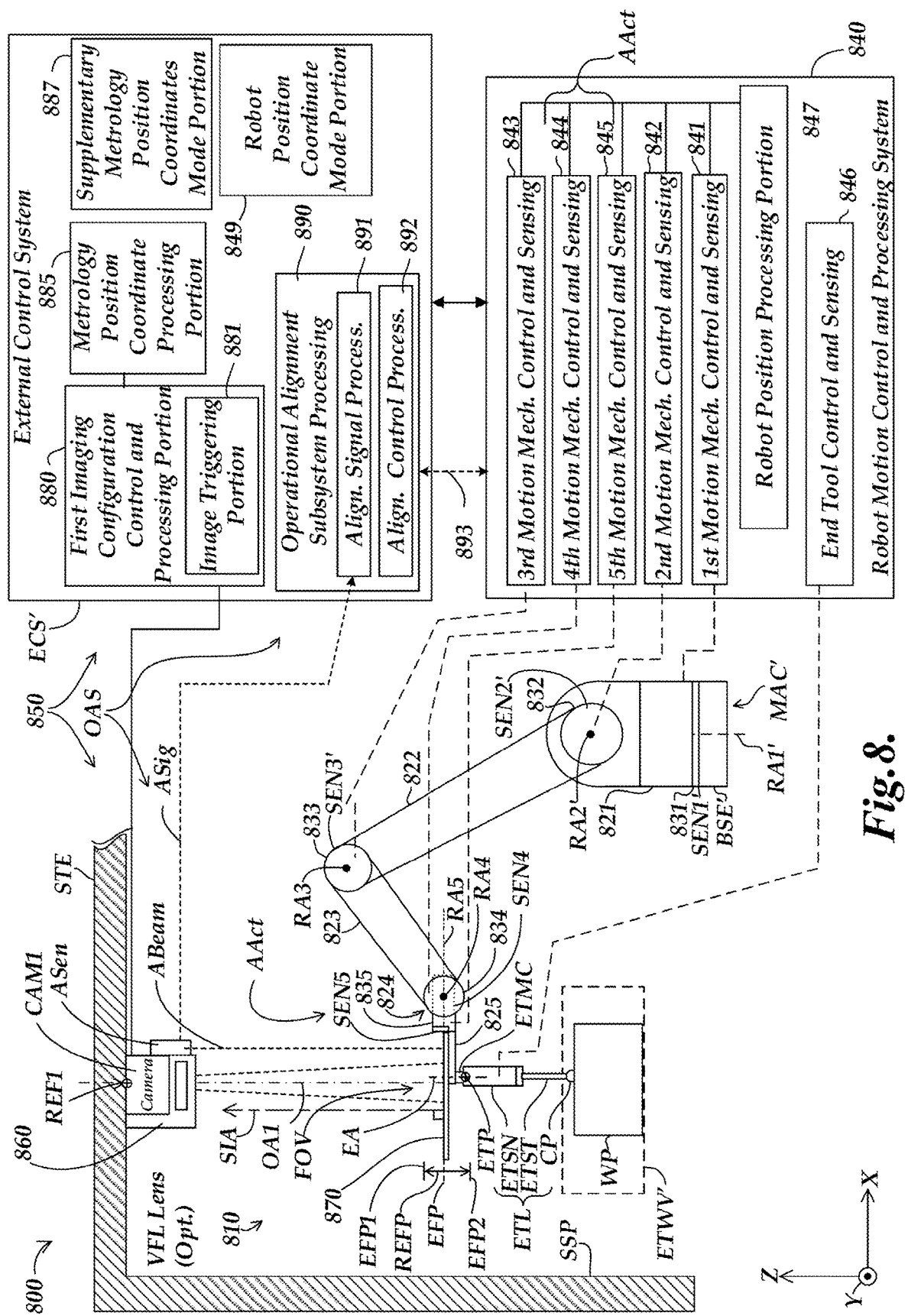
FIG. 8 is a block diagram of a fourth exemplary implementation of a robot system including an articulated robot and a supplementary metrology position coordinates determination system including a second exemplary implementation of an operational alignment subsystem according to principles disclosed herein.

FIG. 8 is a block diagram of a fourth exemplary implementation of a robot system 800 including a robot 810 and a supplementary metrology position coordinates determination system 850. The supplementary metrology position coordinates determination system 850 is shown to include a second exemplary implementation of an operational alignment subsystem OAS comprising an alignment sensor ASen and an operational alignment actuator configuration AAct comprising elements included in a movable arm configuration MAC' and a robot motion control and processing system 840 of the robot system 800, as described in greater detail below. The alignment sensor ASen and the operational alignment actuator configuration AAct are connected to (or otherwise interoperate with) operational alignment subsystem processing circuits/routines 890.

The robot 810 (e.g., an articulated robot) includes a movable arm configuration MAC' and a robot motion control and processing system 840. The supplementary metrology position coordinates determination system 850 includes a first imaging configuration 860, an XY scale 870, an image triggering portion 881 and a metrology position coordinate processing portion 885. In the configuration of FIG. 8, the XY scale 870 is coupled to the movable arm configuration MAC'. As will be described in more detail below, the first imaging configuration 860 has a first optical axis OA1 that may be parallel to a scale imaging axis direction SIA when in an operational configuration.

In the example of FIG. 8, the movable arm configuration MAC' includes a lower base portion BSE', arm portions 821-825, motion mechanisms 831-835, position sensors SEN1'-SEN5', and an end tool mounting configuration ETMC. As will be described in more detail below and as further illustrated in FIG. 9, each of the arm portions 821-825 may have respective proximal ends PE1-PE5 and respective distal ends DE1-DE5. In various implementations, some or all of the arm portions 821-825 may be mounted to respective motion mechanisms 831-835 at respective proximal ends PE1-PE5 of the respective arm portions 821-825. In the example of FIG. 8, some or all of the motion mechanisms 831-835 (e.g., rotary joints and/or linear actuators with corresponding motors, etc.) may enable motion (e.g., rotation, linear motion, etc.) of the respective arm portions 821-825 (e.g., about or along respective rotary axes RA1'-RA5, etc.) In various implementations, the position sensors SEN1'-SEN5' (e.g., rotary encoders, linear encoders, etc.) may be utilized for determining the positions (e.g., angular orientations, linear positions, etc.) of the respective arm portions 821-825.

In various implementations, the movable arm configuration MAC' may have a portion that is designated as a terminal portion (e.g., the fifth arm portion 825). In the example configuration of FIG. 8, the end tool mounting configuration ETMC is located proximate to (e.g., located at) the distal end DE5 of the fifth arm portion 825 (e.g., designated as the terminal portion), which corresponds to a distal end of the movable arm configuration MAC'. In various implementations, the XY scale 870 may be coupled to the movable arm configuration MAC' so as to be proximate to the distal end of the movable arm configuration MAC'. In the implementation of FIG. 8, the XY scale 870 is coupled to the fifth arm portion 825 at a location that is proximate to the distal end of the movable arm configuration MAC'. In some implementations according to principles disclosed herein, the supplementary metrology position coordinates determination system is configured with the movable one of the XY scale (e.g. 870) or the first imaging configuration (e.g. 860) coupled to the operational alignment actuator configuration AAct, which is coupled to, or part of, the movable arm configuration (e.g. MAC'). The implementations shown in FIGS. 8, 9 and 10 correspond to this description, in that the operational alignment actuator configuration AAct comprises a first rotating element 835/825 and a second rotating element 834/824 that are included in the movable arm configuration MAC'.

In various implementations, the end tool mounting configuration ETMC may include various elements for coupling and maintaining the end tool ETL proximate to the distal end of the movable arm configuration MAC'. For example, in various implementations, the end tool mounting configuration ETMC may include an autojoint connection, a magnetic coupling portion and/or other coupling elements as are known in the art for mounting an end tool ETL to a corresponding element. The end tool mounting configuration ETMC may also include electrical connections (e.g., a power connection, one or more signal lines, etc.) for providing power to and/or sending signals to and from at least part of the end tool ETL (e.g., to and from the end tool sensing portion ETSN).

In various implementations, the end tool ETL may include the end tool sensing portion ETSN and the end tool stylus ETST with the measuring point MP of the end tool (e.g., for contacting a surface of a workpiece WP). The fifth motion mechanism 835 is located proximate to the distal end DE4 of the fourth arm portion 824. In various implementations, the fifth motion mechanism 835 (e.g., a rotary joint with a corresponding motor) may be configured to rotate the fifth arm portion 825 about a rotary axis RA5. In any case, the end tool ETL is mounted to (e.g., coupled to) the end tool mounting configuration ETMC, and has a corresponding end tool position ETP with corresponding metrology position coordinates (e.g. x, y and z coordinates). In various implementations, the end tool position ETP may correspond to or be proximate to the position of the end tool mounting configuration ETMC (e.g., at or proximate to the distal end DE5 of the fifth arm portion 825 which may correspond to the distal end of the movable arm configuration MAC').

The motion control system 840 is configured to control the end tool position ETP of the end tool ETL with a level of accuracy defined as a robot accuracy. More specifically, the motion control system 840 is generally configured to control the metrology position coordinates (e.g., x, y and z coordinates) of the end tool position ETP with the robot accuracy based at least in part on utilizing the motion mechanisms 831-835 and position sensors SEN1'-SEN5' for sensing and controlling the positions of the arm portions 821-825. In various implementations, the motion control and processing system 840 may include motion mechanism control and sensing portions 841-845 that may respectively receive signals from the respective position sensors SEN1'-SEN5', for sensing the positions (e.g., angular positions, linear positions, etc.) of the respective arm portions 821-825, and/or may provide control signals to the respective motion mechanisms 831-835 (e.g., including rotary joints, linear actuators, motors, etc.) for moving the respective arm portions 821-825.

The motion control and processing system 840 may also receive signals from the end tool sensing portion ETSN. In various implementations, the end tool sensing portion ETSN may include circuitry and/or configurations related to the operations of the end tool ETL for sensing a workpiece WP. As will be described in more detail below, in various implementations the end tool ETL (e.g., a touch probe, a scanning probe, a camera, etc.) may be utilized for contacting or otherwise sensing surface locations/positions/points on a workpiece WP, for which various corresponding signals may be received, determined and/or processed by the end tool sensing portion ETSN which may provide corresponding signals to the motion control and processing system 840. In various implementations, the motion control and processing system 840 may include an end tool control and sensing portion 846 that may provide control signals to and/or receive sensing signals from the end tool sensing portion ETSN. In various implementations, the end tool control and sensing portion 846 and the end tool sensing portion ETSN may be merged and/or indistinguishable. In various implementations, the motion mechanism control and sensing portions 841-845 and the end tool control and sensing portion 846 may all provide outputs to and/or receive control signals from a robot position processing portion 847 which may control and/or determine the overall positioning of the movable arm configuration MAC' of the robot 810 and corresponding end tool position ETP as part of the robot motion control and processing system 840.

In various implementations, the supplementary metrology position coordinates determination system 850 may be included with or otherwise added to a robot 810 (e.g., as part of a retrofit configuration for being added to an existing robot 810, etc.) In general, the supplementary metrology position coordinates determination system 850 may be utilized to provide an improved level of accuracy for the determination of the end tool position ETP. More specifically, as will be described in more detail below, the supplementary metrology position coordinates determination system 850 may be utilized to determine metrology position coordinates that are indicative of the end tool position ETP, with an accuracy level that is better than the robot accuracy, at least for a vector component of the metrology position coordinates that is at least one of transverse or perpendicular to the scale imaging axis direction SIA. In various implementations (e.g., where the scale imaging axis direction SIA and the end tool stylus ETST are parallel to the z axis), this may correspond to the accuracy level being better than the robot accuracy at least for x and y metrology position coordinates in an x-y plane that is perpendicular to the z axis).

As illustrated in FIG. 8, the first imaging configuration 860 is coupled to the stationary element STE proximate to the robot 810. In various implementations, the stationary element STE may comprise a frame arranged above at least a portion of an end tool working volume ETWV', and for which the first imaging configuration 860 is fixed to the frame above a portion of the end tool working volume ETWV'. In various implementations, the stationary element STE may include one or more structural support elements SSP (e.g., extending from a floor, ceiling, etc.) for maintaining the stationary element STE in a fixed location (e.g., with a fixed position and/or orientation) relative to the robot 810.

In various implementations, the end tool working volume ETWV' consists of a volume in which at least a portion of at least one of the end tool ETL and/or the XY scale 870 may be moved. In the example of FIG. 8, the end tool working volume ETWV' is illustrated as including a volume in which the measuring point MP of the end tool ETL may be moved when inspecting a workpiece. As one alternative example, an end tool working volume may alternatively include a volume in which the XY scale 870 may move when the end tool ETL is moved for inspecting a workpiece. In various implementations, the robot 810 is configured to move the movable arm configuration MAC' so as to move at least a portion of the end tool ETL (e.g., the measuring point MP of the end tool ETL') that is mounted to the end tool mounting configuration ETMC along at least two dimensions (e.g., x and y dimensions) in the end tool working volume ETWV'. In the example of FIG. 8, the portion of the end tool ETL (e.g., the measuring point MP of the end tool ETL') is movable by the robot 810 along three dimensions (e.g., x, y and z dimensions).

The first imaging configuration 860 includes a first camera CAM1 and has an optical axis OA1. In an operational configuration of the supplementary metrology position coordinates determination system 850, the optical axis OA1 of the first imaging configuration 860 is parallel to the direction of the scale imaging axis direction SIA. The first imaging configuration 860 has an effective focus range REFP along its optical axis OA1. In various implementations, the range REFP may be bound by first and second effective focus positions EFP1 and EFP2, as will be described in more detail below. At a given time, the first imaging configuration 860 has an effective focus position EFP that falls within the range REFP. In an implementation where a variable focal length (VFL) lens is used, the range REFP may correspond to the range of focus of the VFL lens.

In various implementations, a VFL lens that is utilized may be a tunable acoustic gradient index of refraction (TAG) lens. With respect to the general operations of such a TAG lens, in various implementations a lens controller (e.g., as included in a first imaging configuration control and processing portion 880) may rapidly adjust or modulate the optical power of the TAG lens periodically, to achieve a high-speed TAG lens capable of a periodic modulation (i.e., at a TAG lens resonant frequency) of 250 kHz, or 70 kHz, or 30 kHz, or the like. In such a configuration, the effective focus position EFP of the first imaging configuration 860 may be (e.g., rapidly) moved within the range REFP (e.g., an autofocus search range). The effective focus position EFP1 (or EFPmax) may correspond to a maximum optical power of the TAG lens, and the effective focus position EFP2 (or EFPmin) may correspond to a maximum negative optical power of the TAG lens. In various implementations, the middle of the range REFP may be designated as EFPnom, and may correspond to zero optical power of the TAG lens.

In various implementations, such a VFL lens (e.g., a TAG lens) and/or a corresponding range REFP may be advantageously chosen such that the configuration limits or eliminates the need for macroscopic mechanical adjustments of the first imaging configuration 860 and/or adjustment of distances between components in order to change the effective focus position EFP. For example, in an implementation where an unknown amount of tilt or "sag" at the distal end DE5 of the fifth arm portion 825 (e.g., corresponding to the distal end of the movable arm configuration MAC') may occur (e.g., due to the weight and/or specific orientations of the arm portions 821-825, etc.), the precise focus distance from the first imaging configuration 860 to the XY scale 870 may be unknown and/or may vary with different orientations of the arm portions, etc. It will also be appreciated that in the example configuration of FIG. 8, the distance between the XY scale 870 and the first imaging configuration 860 may generally change in accordance with the general operations of the movable arm configuration MAC' which may move the end tool position ETP to different locations/distances from the first imaging configuration 860 along the scale imaging axis direction SIA (e.g., as part of the operations for scanning a surface of a workpiece WP, etc.) In such configurations, it may be desirable for a VFL lens to be utilized that can scan or otherwise adjust the effective focus position EFP to determine and accurately focus at the XY scale 870. In various implementations, such techniques utilizing a VFL lens may be utilized in combination with other focus adjusting techniques (e.g., utilized in combination with changeable objective lenses that may also be included in the first imaging configuration 860, etc.)

As previously outlined, in the implementation shown in FIG. 8 the operational alignment subsystem OAS comprises the alignment sensor ASen, the operational alignment actuator AAct which comprises elements of the movable arm configuration MAC', and operational alignment subsystem processing circuits/routines 890. The operational alignment subsystem processing circuits/routines 890 include an alignment signal processing portion 891 which may provide signal processing that may provide primary signal conditioning and/or correction for the alignment signal(s) Asig of the alignment sensor Asen, and/or analysis that determines a misalignment angle/vector or residual misalignment angle/vector that corresponds to the alignment signal(s) Asig, as described in greater detail below. The operational alignment subsystem processing circuits/routines 890 further include an alignment control portion 892, which is generally configured to adjust an alignment of a moveable one of an XY scale or a first imaging configuration based on the alignment signal(s) Asig provided by the alignment sensor ASen, to provide an operational configuration of the XY scale and the first imaging configuration, wherein an optical axis (e.g. OA1) of the first imaging configuration and the scale imaging axis direction SIA are arranged to be parallel, as indicated by the alignment signal Asig, as outlined above.

It will be appreciated that the configuration of the operational alignment subsystem processing circuits/routines 890 shown in FIG. 8 and outlined above is exemplary only, and not limiting. In various implementations, the various portions of the alignment subsystem processing circuits/routines 890 may be located outside the external control system ECS (e.g. in the operational alignment sensor ASen), or may be merged with and/or indistinguishable from other portions of the supplementary metrology position coordinates determination system 850 (e.g. the portions 885 and/or 887). In the illustrated implementation, the operational alignment subsystem processing circuits/routines 890 exchanges position and/or alignment information and/or control signals with the robot motion and control processing system 840 as indicated by the dashed line 893 in order to implement various operating principles or features disclosed herein. The various elements and operations outlined above are described in greater detail below.

In various implementations, the XY scale 870 may be the same as the XY scale 170 described above with respect to FIGS. 4 and 5, or is otherwise configured according to principles disclosed herein. In various implementations, the robot system 800 may be operable to provide an operational configuration of the supplementary metrology position coordinates determination system 850 as described in greater detail below with reference to FIGS. 9 and 10. In the operational configuration of the supplementary metrology position coordinates determination system 850, the movable XY scale 870 is arranged so that the direction of the scale imaging axis direction SIA is parallel to the optical axis OA1 of the first imaging configuration 860 as indicated by the alignment signal Asig of the alignment sensor ASen, and the scale plane is located within the range of focus REFP of the first imaging configuration 860 along the scale imaging axis direction SIA. It will be appreciated that in order to place the supplementary metrology position coordinates determination system 850 in the operational configuration with the above noted characteristics, various adjustments may be made to the positions/orientations of the arm portions 821-825 of the movable arm configuration MAC' based on the alignment signal Asig of the alignment sensor ASen and a set of actuators regarded as operational alignment actuators AAct of the operational alignment subsystem OAS, as described below with reference to FIG. 9. Stated another way, the robot system 800 is configured to operate the operational alignment subsystem OAS and the operational alignment actuator configuration AAct to adjust an alignment of the moveable one of the XY scale 870 or the first imaging configuration 860 based on the alignment signal provided by the alignment sensor ASen to provide an operational configuration of the supplementary metrology position coordinates determination system 850, wherein in the operational configuration of the supplementary metrology position coordinates determination system 850 the XY scale 870 and the first imaging configuration 860 are arranged with the optical axis OA1 of the first imaging configuration 860 parallel to the scale imaging axis direction SIA as indicated by the alignment signal(s) Asig.

In various implementations, the image triggering portion 881 and/or the metrology position coordinate processing portion 885 may be included as part of an external control system ECS' (e.g., as part of an external computer, etc.) The image triggering portion 881 may be included as part of the first imaging configuration control and processing portion 880. In various implementations, the image triggering portion 881 is configured to input at least one input signal that is related to the end tool position ETP and to determine the timing of a first imaging trigger signal based on the at least one input signal, and to output the first imaging trigger signal to the first imaging configuration 860. In various implementations, the first imaging configuration 860 is configured to acquire a digital image of the XY scale 870 at an image acquisition time in response to receiving the first imaging trigger signal. In various implementations, the metrology position coordinate processing portion 885 is configured to input the acquired image and to identify at least one respective imagable feature included in the acquired image of the XY scale 870 and the related respective known XY scale coordinate location. In various implementations, the external control system ECS' may also include a standard robot position coordinates mode portion 849 and a supplementary metrology position coordinates mode portion 887, for implementing corresponding modes, as will be described in more detail below.

In various implementations, the first imaging configuration 860 may include a component (e.g., a subcircuit, routine, etc.) that activates an image integration of the camera CAM1 periodically (e.g., at a set timing interval) for which the first imaging trigger signal from the image triggering portion 881 may activate a strobe light timing or other mechanism to effectively freeze motion and correspondingly determine an exposure within the integration period. In such implementations, if no first imaging trigger signal is received during the integration period, a resulting image may be discarded, wherein if a first imaging trigger signal is received during the integration period, the resulting image may be saved and/or may otherwise be processed/analyzed to determine metrology position coordinates, as will be described in more detail below.

In various implementations, different types of end tools ETL may provide different types of outputs that may be utilized with respect to the image triggering portion 881. For example, in an implementation where the end tool ETL is a touch probe that is used for measuring a workpiece and that outputs a touch signal when it touches the workpiece (e.g., when the measuring point MP contacts the workpiece), the image triggering portion 881 may be configured to input that touch signal or a signal derived therefrom as the at least one input signal that the timing of a first imaging trigger signal is determined based on. In various implementations where the end tool ETL is a touch probe, a central axis of the touch probe may be oriented along the scale imaging axis direction SIA (e.g., with the central axis of the touch probe corresponding to the end tool axis EA). As another example, in an implementation where the end tool ETL is a scanning probe that is used for measuring a workpiece and that provides respective workpiece measurement sample data corresponding to a respective sample timing signal, the image triggering portion 881 may be configured to input that respective sample timing signal or a signal derived therefrom as the at least one input signal. As another example, in an implementation where the end tool ETL is a camera that is used to provide a respective workpiece measurement image corresponding to a respective workpiece image acquisition signal, the image triggering portion 881 may be configured to input that workpiece image acquisition signal or a signal derived therefrom as the at least one input signal.

In the example implementation of FIG. 8, the supplementary metrology position coordinates determination system 850 is configured with the XY scale 870 coupled to the operational alignment actuator configuration AAct, which is coupled to, or part of, the movable arm configuration (e.g. MAC'). The implementations shown in FIGS. 8, 9 and 10 correspond to this description, in that the operational alignment actuator configuration AAct comprises a first rotating element 835/825 and a second rotating element 834/824 that are included in the movable arm configuration MAC'. In addition, the first imaging configuration 860 and the alignment sensor ASen are coupled to a stationary element STE (e.g., a frame arranged above and proximate to the robot 810) and defines a first reference position REF1. In an alternative implementation (e.g., as described below with respect to FIG. 10), a supplementary metrology position coordinates determination system may be configured with the first imaging configuration 860 and the alignment sensor ASen coupled to the operational alignment actuator configuration AAct, which is coupled to, or part of, the movable arm configuration (e.g. MAC') proximate to the distal end of the movable arm configuration MAC', and with the XY scale 870 coupled to a stationary element STE and defining a first reference position REF1.

In either case, as will be described in more detail below, the supplementary metrology position coordinates determination system 850 may be configured such that the moveable one of the XY scale 870 or the first imaging configuration 860 and the stationary one of the XY scale 870 or the first imaging configuration 860 are arranged in the operational configuration as based on (or indicated by) the alignment signal Asig from the alignment sensor ASen, with the XY scale 870 located in a field of view FOV and focus range of the first imaging configuration 860 by the movable arm configuration MAC'. The metrology position coordinate processing portion 885 is then operate to determine metrology position coordinates that indicate a relative position between the movable one of the XY scale 870 or the first imaging configuration 860 and the first reference position REF1 with an accuracy level that is better than the robot accuracy, at least at least for a vector component of the metrology position coordinates that is at least one of transverse or perpendicular to the scale imaging axis direction SIA, based on determining an image position of the identified at least one respective imagable feature in the acquired image. The determined metrology position coordinates are indicative of the end tool position ETP and/or the measuring point position MP of the end tool at the image acquisition time, with an accuracy level that is better than the robot accuracy, at least for a vector component of the metrology position coordinates that is at least one of transverse or perpendicular to the scale imaging axis direction SIA. In various implementations, the supplementary metrology position coordinates determination system 850 may be configured to determine the metrology position coordinates of the end tool position ETP at the image acquisition time and/or the measuring point position MP of the end tool, based on the determined metrology position coordinates that indicate the relative position of the movable one of the XY scale 870 or the first imaging configuration 860 and a known coordinate position offset between the end tool position ETP and/or the measuring point position MP of the end tool and the movable one of the XY scale 870 or the first imaging configuration 860.

It will be appreciated that the robot systems such as those illustrated in FIGS. 1 and 8 may have certain advantages over various alternative systems. For example, in various implementations systems such as those disclosed herein may be smaller and/or less expensive than alternative systems utilizing technologies such as laser trackers or photogrammetry for tracking robot movement/positions, and may also have higher accuracy in some implementations. The disclosed systems also do not take up or obscure any part of the end tool working volume ETWV or ETWV', such as alternative systems that may include a scale or fiducial on the ground or stage, or otherwise in the same area (e.g., in the end tool working volume ETWV or ETWV') where workpieces may otherwise be worked on and/or inspected, etc.

Figure 9:
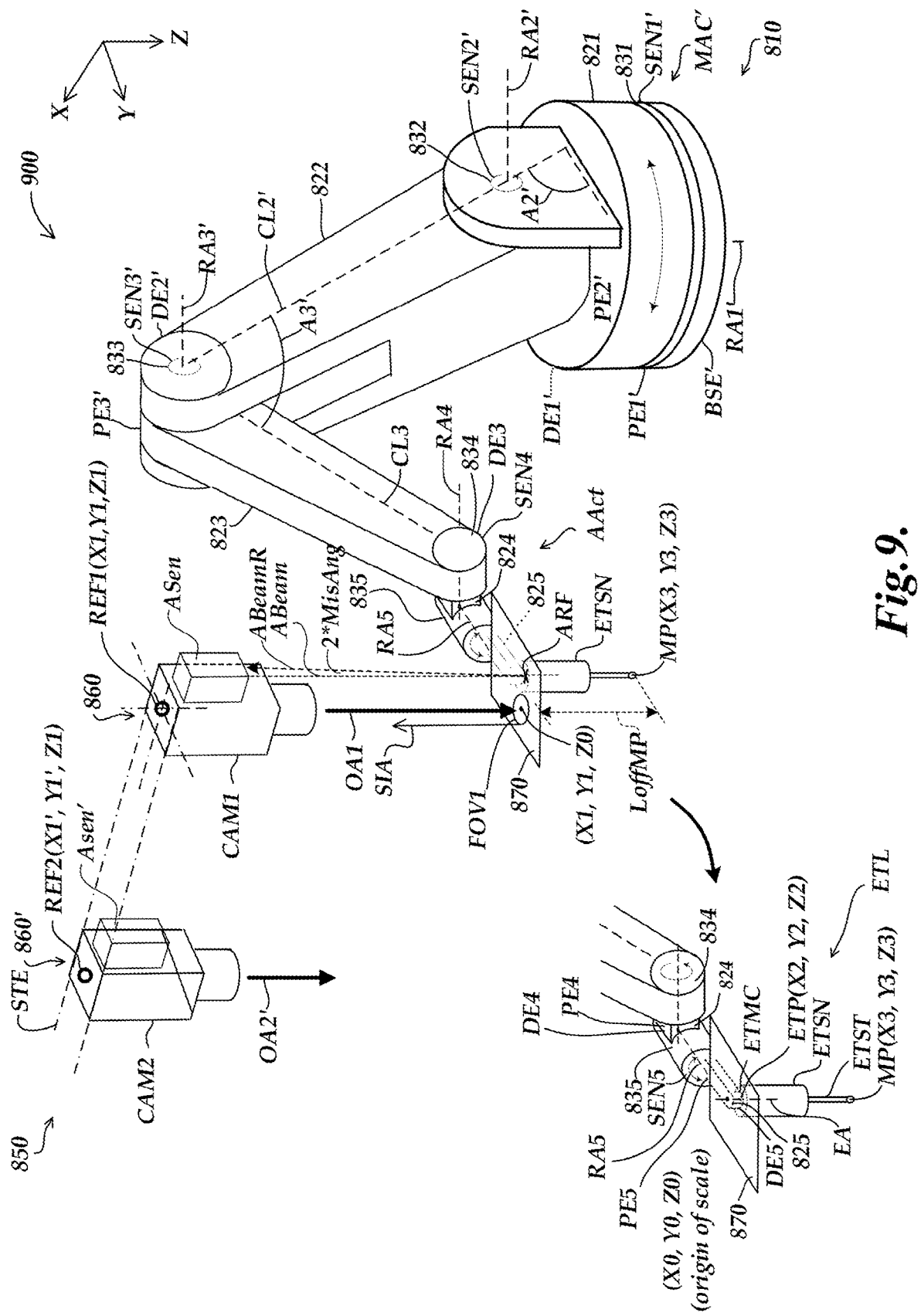
FIG. 9 is an isometric diagram of a portion of a fifth exemplary implementation of a robot system similar to the robot system of FIG. 8 including an articulated robot, in which a first imaging configuration and an alignment sensor of an operational alignment subsystem are coupled to a stationary element, with the alignment sensor governing an operational alignment of an XY scale located on a moving element.
Figure 10:
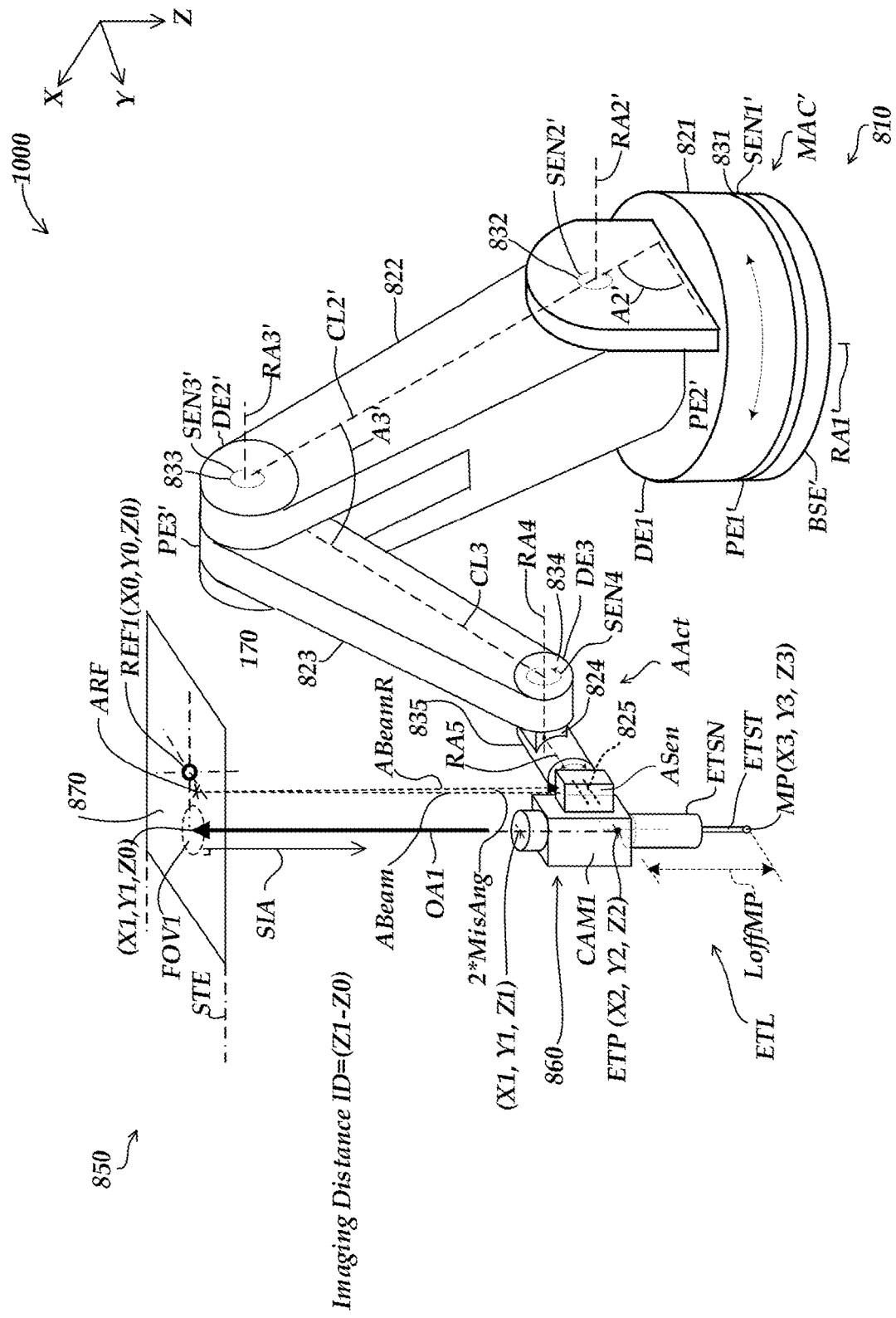
FIG. 10 is isometric diagrams of a portion of a sixth exemplary implementation of a robot system including an articulated robot, in which a first imaging configuration and an alignment sensor of an operational alignment subsystem are coupled to a moving element, with the alignment sensor governing the operational alignment of the first imaging configuration relative to an XY scale located on a stationary element.

FIGS. 9 and 10 are similar in that they both show implementations that use active alignment to remove the X and Y errors previously outlined with reference to FIGS. 2B and 3B. Active alignment substantially eliminates these errors. Active alignment is a "closed loop" alignment procedure based on the signal(s) ASig from the alignment sensor ASen. It will be understood that sag and twist (e.g. similar to that shown in FIGS. 2B and 3B) are present in the movable arm configuration MAC' shown in these figures, but the sag and twist are not illustrated, to avoid visual clutter. It will be understood that the effects of sag and twist may be compensated or negated (at least with respect to the X and Y coordinates) due to active alignment based on the alignment sensor signals in order to achieve the desired operation configuration, according to the principles disclosed herein. The active alignment may be performed manually or automatically at least once at a desired time during operations of the robot system 900 (1000) in order to establish the desired operational configuration, or intermittently at any desired time (e.g. when the robot pose is changed), or frequently or continuously in some implementations.

With respect to Z errors resulting from sag and twist in the movable arm configuration MAC' during the operational configuration, the Z errors may be at least approximately corrected as previously outlined with reference to FIGS. 2B and 3B. For example, it will be appreciated that the magnitude of the adjustments of the operational alignment actuators AAct that is necessary to correct for sag and twist in order to achieve the operational configuration may be known and recorded in the operational alignment subsystem circuits/routines 890 (or 190). Alternatively, the magnitude of the residual misalignment MisAng with the operational alignment actuators AAct in a known or reference state prior to such adjustments may be known and recorded. In either case, the sag/twist misalignment (e.g. a sag/twist misalignment angle or vector) proximate to the alignment sensor ASen, the distal end of the movable arm configuration MAC' and/or the end tool ETL may be at least approximately or known or inferred.

In some implementations, the coordinate displacements or errors associated with the Z2 and/or Z3 coordinates shown in FIGS. 9 and 10 may be approximated based on a sag/twist misalignment determined as outlined above in combinations with known geometry and orientations and mechanical characteristics (e.g. beam properties) of the various arm portions and bearings of the robot system 900 (or 1000). In such implementations, it will be understood that the sag/twist misalignment determination outlined above is ultimately traceable to and based on a residual misalignment indicated by the alignment sensor ASen. Thus, according to one type of description, in such implementations, errors that would otherwise be present in the Z coordinate of a set of metrology position coordinates may be at least partially corrected or compensated based on a sag/twist misalignment determined as outlined above, which is ultimately based on a residual misalignment indicated by the alignment sensor ASen.

In the implementation shown in FIGS. 9 and 10, an operational alignment actuator configuration AAct comprises the motion mechanism 834 and 835, which are included in the movable arm configuration MAC' and used in the operational alignment subsystem OAS. In such implementations the scale imaging axis direction SIA may actively be aligned with the optical axis OA1 for one or more poses of the articulated robot 110, at any desired time(s) during operation of the articulated robot 110. It will be appreciated that such an alignment is active (that is, establish in a "closed loop" manner based on the alignment signal from the alignment sensor ASen) and small alignment errors according to the small sag/tilt misalignment angle MisAng outlined previously herein may be actively corrected at any desired time(s) during operation of the articulated robot 110. In the illustrated implementation, the alignment errors may be actively corrected by using alignment control signal(s) generated in the alignment control portion 892 to control the operational alignment actuator configuration AAct to adjust an alignment of the moveable XY scale 870 based on the alignment signal(s) Asig provided by the alignment sensor ASen, to provide an operational configuration of the XY scale 870 and the first imaging configuration 860 wherein the optical axis OA1 and the scale imaging axis direction SIA are arranged to be parallel, as indicated by the alignment signal Asig. For example, the operational alignment subsystem processing circuits/routines 890 may exchange certain position and/or alignment information and/or control signals with the robot motion and control processing system 840 as indicated by the dashed line 893, in order to implement various operating principles or features disclosed herein. Many aspects and features shown in FIGS. 9 and 10 may generally be understood based on the foregoing explanation and description of analogous aspects and features in various previous figures. Certain other aspects and features are described in greater detail below.

FIG. 9 is an isometric diagram of a portion of a fifth exemplary implementation of a robot system 900 similar to the robot system 800 of FIG. 8, in which the first imaging configuration 860 and an alignment sensor ASen of an operational alignment subsystem OAS are coupled to a stationary element STE. The alignment sensor ASen governs an operational alignment of an XY scale 870 located on a moving element. It will be appreciated that, similar to the numbering schemes described above, certain named or numbered components (e.g., 8XX, 8XX' or 9XX) of FIG. 9 may correspond to and/or have similar operations as identically or similarly named or numbered counterpart components (e.g., 8XX) of FIG. 8, or of other figures, and may be understood to be similar or identical thereto and may otherwise be understood by analogy thereto and as otherwise described below. As noted above, this naming and numbering scheme to indicate elements having analogous and/or identical design and/or function is generally applied to the various figures of this application (e.g., FIGS. 1-5, 8, 9 and 10).

In the configuration of FIG. 9, the stationary element STE that the first imaging configuration 860 is coupled to may comprise a frame arranged above the robot 810. The movable arm configuration MAC' includes the arm portions 821-825. In the implementation shown in FIG. 9, an operational alignment actuator configuration AAct comprises the motion mechanism 834 and 835, which are included in the movable arm configuration MAC' and used in the operational alignment subsystem OAS. The XY scale 870 is coupled to the arm portion or bracket 825, and thereby to the operational alignment actuator configuration AAct, and thereby to the remainder of the movable arm configuration MAC'. In other configurations, other coupling configurations may be utilized for coupling the XY scale 870 to the movable arm configuration MAC'. In various implementations, the position and/or orientation of the XY scale 870 as coupled to the movable arm configuration MAC' may be adjustable, although it may also be temporarily locked or otherwise fixed in a given position/orientation (e.g., for a series of measurements, etc.) In any case, in an operational configuration of the supplementary metrology position coordinates determination system 850, the first imaging configuration 860 may be arranged with the optical axis OA1 of the first imaging configuration 860 parallel to the direction of the scale imaging axis direction SIA and with the scale plane located within the range of focus of the first imaging configuration 860 along the scale imaging axis direction SIA.

The robot 810 is briefly described here, as it is a known type. As illustrated in FIG. 9, the first arm portion 821 (e.g., an upper base portion) is mounted to the first motion mechanism 831 (e.g., a rotary joint) at a proximal end PE1 of the first arm portion 821. The first motion mechanism 831 is located at an upper end of the lower supporting base portion BSE' and has a rotary axis RA1' aligned along the Z axis. It will be appreciated that the optical axis OA1 and scale imaging axis direction SIA may be aligned with the Z axis, such that the first arm portion 821 rotates in a plane that is perpendicular to the optical axis OA1 and scale imaging axis direction SIA when they are arranged in the desired operational configuration. The position sensor SEN1' (e.g., a rotary encoder) may be utilized for determining the angular position (e.g., the angular orientation) of the first arm portion 821. The second motion mechanism 832 is located proximate to a distal end DE1 of the first arm portion 821. The second motion mechanism 832 has a rotary axis RA2' which is nominally perpendicular to the Z axis. The second arm portion 822 is mounted to the second motion mechanism 832 at a proximal end PE2 of the second arm portion 822, such that the second arm portion 822 moves about the rotary axis RA2'. The position sensor SEN2' may be utilized for determining the angular position A2' of the second arm portion 822. The third motion mechanism 833 is located at a distal end DE2 of the second arm portion 822. The third motion mechanism 833 has a rotary axis RA3' which is nominally perpendicular to the Z axis. The third arm portion 823 is mounted to the third motion mechanism 833 at a proximal end PE3 of the third arm portion 823, such that the third arm portion 823 moves about the rotary axis RA3'. The position sensor SEN3' may be utilized for determining the angular position A3' of the third arm portion 823. The fourth motion mechanism 834 is located at a distal end DE3 of the third arm portion 823. The fourth motion mechanism 834 has a rotary axis RA4 which is nominally perpendicular to the Z axis. The fourth arm portion 824 is mounted to the fourth motion mechanism 834 at a proximal end PE4 of the fourth arm portion 824, such that the fourth arm portion 824 rotates about the rotary axis RA4. The position sensor SEN4 may be utilized for determining the angular position (e.g., in a plane that may be parallel to the Z axis) of the fourth arm portion 824. The fifth motion mechanism 835 may be located at a distal end DE4 of the fourth arm portion 824 and has a rotary axis RA5, which may be nominally perpendicular to the rotary axis RA4 in various implementations. The fifth arm portion 825 (e.g. a bracket) is mounted to the fifth motion mechanism 835 at a proximal end PE5 of the fifth arm portion 825, such that the fifth arm portion 825 rotates about the rotary axis RA5. The position sensor SEN5 may be utilized for determining an angular position of the fifth arm portion 825 and/or the XY scale 870, about the rotary axis RA5. In some implementations, it may be desirable to arrange the scale plane of the XY scale 870 parallel to the rotary axis RA5, as described in greater detail below. As illustrated in FIG. 9 the second and third arm portions 822 and 823 may each have designated center lines CL2' and CL3, respectively, passing down the centers of the respective arm portions. An angle A2' (e.g., which may correspond to an amount of rotation of the second motion mechanism 832) may be designated as occurring between the center line CL2' of the second arm portion 822 and plane (e.g., parallel to the scale plane in the operational configuration, which may be in an x-y plane when the optical axis OA1 is parallel to the z axis). An angle A3' may be designated as occurring between the center line CL2' of the second arm portion 822 and the center line CL3 of the third arm portion 823 (e.g., in accordance with an amount of rotation of the third motion mechanism 833 about the third rotary axis RA3'). It will be appreciated that the other arm portions may similarly have corresponding reference lines and/or axes, etc. for referencing certain movements, coordinates and angles of the components of the movable arm configuration MAC'.

In various implementations, the movable XY scale 870 (e.g., as illustrated in FIGS. 8 and 9) may be described as being coupled to a central sub-portion (e.g., including the arm portion 823 and at least some proximal elements thereto) of the movable arm configuration MAC' through a distal sub-portion comprising a rotating element (e.g., arm portion 824 coupled to a motion mechanism 834) that rotates about a rotary axis RA4 and a rotating element (e.g., a bracket or arm portion 825 coupled to a motion mechanism 835) that rotates about a rotary axis RA5. As previously indicated, the motion mechanisms 834 and 835 may be regarded as an operational alignment actuator configuration AAct, and may be used to provide the desired operational alignment outlined above and described in greater detail below. In the exemplary operational alignment actuator configuration AAct shown in FIG. 9, the rotation axis RA5 is nominally parallel to the scale plane of the XY scale 870, and nominally orthogonal to the scale imaging axis SIA. The rotation axis RA4 is nominally orthogonal to the rotation axis RA5. According to a convention used herein, two axes oriented such that the dot product of their direction vectors is zero will be understood to be orthogonal or perpendicular, regardless of whether or not they intersect. It will be understood that this arrangement of rotation axis allows for simple and convenient motion control and sensor processing, but it is exemplary only and not limiting. Although the rotating elements of the operational alignment actuator configuration AAct are included in the movable arm configuration MAC' in this implementation, in other implementations, the rotating elements (typically, first and second rotating elements) may be included in a discrete operational alignment actuator configuration AAct that is located proximate to a distal end of a movable arm configuration MAC (e.g. as described below with reference to FIGS. 12 and 13.

In the implementation shown in FIGS. 9 (and 10), the rotation axis RA4 is parallel to one or more other rotational axes (e.g. RA2, RA3) of the movable arm configuration MAC'. It will be appreciated that in such a case, if the rotation axis RA4 is counter-rotated in a direction opposite and equal to an angular rotation of a parallel rotation axis in the movable arm configuration MAC', that the desired operational configuration of the supplementary metrology position coordinates determination system 850 may be maintained throughout various movements or positionings of the robot 810, if desired. More generally, the XY is either locked, or adjustable/rotatable to different fixed orientations/positions relative to the movable arm configuration MAC', in order to achieve a desired orientation/position for a particular measurement.

In various implementations, the end tool ETL may be mounted (e.g., coupled) to the end tool mounting configuration ETMC proximate to the distal end DE5 of the fifth arm portion 825. The end tool ETL may be designated as having an end tool axis EA (e.g., passing through the middle and/or central axis of the stylus ETST). In the illustrated implementation, the end tool axis EA passes through the end tool position ETP, and has a known coordinate position offset from the XY scale 870 (e.g. as shown for by the offset LoffMP, for the Z coordinate position offset component), and in the operational configuration is parallel to the scale imaging axis direction SIA (e.g., such that the end tool ETL with the stylus ETST is oriented parallel to the scale imaging axis direction SIA). As previously outlined with reference to FIGS. 2A-2B, there may be a known coordinate position offset between the end tool position ETP and the XY scale 870. For example, the XY scale 870 may have a designated reference point (e.g., at a center or edge of the XY scale 870) which has a known coordinate position offset (e.g., a known distance in a plane that is parallel to the scale plane or otherwise) from the end tool axis EA (e.g., and correspondingly from the end tool position ETP). In various implementations, such a known coordinate position offset may be expressed in terms of known offset components.

As previously indicated, the known coordinate position offset between the end tool position ETP and the XY scale 870 may be utilized as part of the process for determining the metrology position coordinates of the end tool position ETP. More specifically, as noted above, the supplementary metrology position coordinates determination system 850 may be configured such that the metrology position coordinate processing portion 885 operates to determine metrology position coordinates that indicate a relative position between the XY scale 870 and the first reference position REF1 (i.e., as defined by the stationary first imaging configuration 860), based on determining an image position of the identified at least one respective imagable feature (i.e., of the XY scale 870) in the acquired image. The supplementary metrology position coordinates determination system 850 may further be configured to determine the metrology position coordinates of the end tool position ETP and/or the measuring point position MP of the end tool, based on the determined metrology position coordinates which indicate the relative position (i.e., between the XY scale 870 and the first reference position REF1), and a known coordinate position offset between the end tool position ETP and/or the measuring point position MP of the end tool and the movable XY scale 870. In one specific example implementation, the known coordinate position offset (e.g., expressed in terms of known offset components, such as a known x offset and a known y offset and a known z offset) may be added to or otherwise combined with the determined metrology position coordinates that indicate the relative position (i.e., between the XY scale 870 and the first reference position REF1) in order to determine the metrology position coordinates of the end tool position ETP and/or the measuring point position MP of the end tool ETL.

As one specific example position coordinate configuration, in an implementation where in the operational configuration the scale imaging axis direction SIA is parallel to the z axis, the XY scale 870 may be designated as having an origin at X0, Y0, Z0 (e.g., for an origin location at the center of the scale, which may have scale coordinate values of 0,0,0). The reference location REF1 (i.e., as defined by the stationary first imaging configuration 860) may have metrology coordinates of X1, Y1, Z1, and a center of a corresponding field of view FOV1 (e.g., corresponding to an acquired image) may be at metrology coordinates of X1, Y1, Z0. A location of the end tool axis EA in an x-y plane extending from the XY scale 870 may be designated as having relative metrology position coordinates of X2, Y2. The end tool position ETP may be designated as having metrology position coordinates of X2, Y2, Z2. In various implementations, the end tool ETL may have a measuring point MP (e.g., at the end of an end tool stylus ETST for contacting a workpiece) which may be designated as having metrology position coordinates X3, Y3, Z3. In an implementation where the measuring point MP of the end tool ETL does not vary in the x or y directions relative to the rest of the end tool and where the end tool axis EA is parallel to the z axis in the operational configuration, the X3 and Y3 coordinates may be equal to the X2 and Y2 coordinates, respectively.

In one specific example implementation, an acquired image may be analyzed by the metrology position coordinate processing portion 885 to determine the scale coordinates that correspond to the metrology position coordinates X1, Y1 corresponding to the center of the field of view FOV1 of the stationary first imaging configuration 860. Such a determination may be made in accordance with standard camera/scale image processing techniques (e.g., for determining a location of camera relative to a scale). Various examples of such techniques are described in U.S. Pat. Nos. 6,781,694; 6,937,349; 5,798,947; 6,222,940 and 6,640,008, each of which is hereby incorporated herein by reference in its entirety. In various implementations, such techniques may be utilized to determine the location of a field of view FOV1 (e.g., as corresponding to a position of a camera) within a scale range (e.g., within the XY scale 870), as described above with respect to FIGS. 4 and 5. In various implementations, such a determination may include identifying at least one respective imagable feature included in the acquired image of the XY scale 870 and the related respective known XY scale coordinate location. Such a determination may correspond to determining metrology position coordinates that indicate a relative position between the XY scale 870 and the first reference position REF1 (i.e., as defined by the stationary first imaging configuration 860). The relative X2, Y2 coordinates (i.e., of the end tool position ETP) may then be determined according to the known coordinate position offset between the end tool position ETP and/or the measuring point position MP of the end tool ETL and the XY scale 870 (e.g., adding known x and y and z position offset values to X1 and Y1 and Z0 in order to determine X2, Y2, Z2 and/or X3, Y3 and Z3.

To summarize the operation of implementation shown in FIG. 9, the residual misalignment MisAng is reduced to zero as based on and indicated by the misalignment sensor ASen, in the desired operational configuration provided as outlined above. Therefore, errors that depend on the residual misalignment MisAng (e.g. previously outlined with reference to FIGS. 2A-3B) are substantially prevented, and need not be corrected or compensated. For example, the various offset amounts and/or misalignment errors between various components may be determined and/or saved as calibration data and used as outlined herein without the need for additional correction or compensation that would otherwise arise due to a non-zero residual misalignment.

FIG. 10 is isometric diagrams of a portion of a sixth exemplary implementation of a robot system 1000 similar to the robot system 900 of FIG. 9, except that the first imaging configuration 860 and the alignment sensor ASen of an operational alignment subsystem OAS are coupled to a moving element of the movable arm configuration MAC', with the alignment sensor ASen governing the operational alignment of the first imaging configuration 860 relative to an XY scale 870 located on a stationary element STE.

In the configuration of FIG. 10, the stationary element STE that the XY scale 870 is coupled to may comprise a frame arranged above the robot 810. In the implementation shown in FIG. 10, the operational alignment actuator configuration AAct comprises the motion mechanisms 834 and 835, which are included in the movable arm configuration MAC' and used in the operational alignment subsystem OAS, as previously outlined with reference to FIG. 9. The first imaging configuration 860 and the alignment sensor ASen are coupled to the arm portion or bracket 825, and thereby to the operational alignment actuator configuration AAct, and thereby to the remainder of the movable arm configuration MAC'. In other configurations, other coupling configurations may be utilized for coupling the first imaging configuration 860 to the movable arm configuration MAC'. In various implementations, the position and/or orientation of the first imaging configuration 860 as coupled to the movable arm configuration MAC' may be adjustable, although may also be temporarily locked or otherwise fixed in a given position/orientation (e.g., for a series of measurements, etc.) In any case, in an operational configuration of the supplementary metrology position coordinates determination system 850, the first imaging configuration 860 may be arranged with the optical axis OA1 of the first imaging configuration 860 parallel to the direction of the scale imaging axis direction SIA and with the scale plane located within the range of focus of the first imaging configuration 860 along the scale imaging axis direction SIA.

The robot 810 may be substantially as previously described with reference to FIG. 9. In various implementations, the movable first imaging configuration 860 (e.g., as illustrated in FIG. 10) may be described as being coupled to a central sub-portion (e.g., including the arm portion 823 and at least some proximal elements thereto) of the movable arm configuration MAC' through a distal sub-portion comprising a rotating element (e.g., arm portion 824 coupled to a motion mechanism 834) that rotates about a rotary axis RA4 and a rotating element (e.g., a bracket or arm portion 825 coupled to a motion mechanism 835) that rotates about a rotary axis RA5. As previously indicated, the motion mechanisms 834 and 835 may be regarded as an operational alignment actuator configuration AAct, and may be used to provide the desired operational alignment outlined above and described in greater detail below. In some implementations, it may be desirable to arrange the optical axis OA1 of the first imaging configuration 860 orthogonal to the rotary axis RA5, e.g. as shown in FIG. 10 and described in greater detail below. The rotation axis RA4 is nominally orthogonal to the rotation axis RA5. According to a convention used herein, two axes oriented such that the dot product of their direction vectors is zero will be understood to be orthogonal or perpendicular, regardless of whether or not they intersect. It will be understood that this arrangement of rotation axis allows for simple and convenient motion control and sensor processing, but it is exemplary only and not limiting. Although the rotating elements of the operational alignment actuator configuration AAct are included in the movable arm configuration MAC' in this implementation, in other implementations, the rotating elements (typically, first and second rotating elements) may be included in a discrete operational alignment actuator configuration that is located proximate to a distal end of a movable arm configuration MAC (e.g. as described below with reference to FIGS. 12 and 13).

In the implementation shown in FIG. 10, the rotation axis RA4 is parallel to one or more other rotational axes (e.g. RA2, RA3) of the movable arm configuration MAC'. It will be appreciated that in such a case, if the rotation axis RA4 is counter-rotated in a direction opposite and equal to an angular rotation of a parallel rotation axis in the movable arm configuration MAC', that the desired operational configuration of the supplementary metrology position coordinates determination system 850 may be maintained throughout various movements or positionings of the robot 810, if desired. More generally, the XY is either locked, or adjustable/rotatable to different fixed orientations/positions relative to the movable arm configuration MAC', in order to achieve a desired orientation/position for a particular measurement.

In various implementations, the end tool ETL may be mounted (e.g., coupled) proximate to the distal end DE5 of the fifth arm portion 825, in a configuration having function characteristics and features substantially as previously described with reference to FIG. 9 (with the exception of various minor differences in various offset dimensions, or the like.) As previously outlined with reference to FIGS. 3A-3B, there may be a known coordinate position offset between the end tool position ETP and the first imaging configuration 860 (e.g. as shown for by the offset LoffMP, for the Z coordinate position offset component). For example, the first imaging configuration 860 may have a designated reference point (e.g., at the center of its lens, at the metrology coordinate location label X1, Y1, Z1) which has a known coordinate position offset from the end tool position ETP. In various implementations, such a known coordinate position offset may be expressed in terms of known offset components.

As previously indicated, the known coordinate position offset between the end tool position ETP and the first imaging configuration 860 may be utilized as part of the process for determining the metrology position coordinates of the end tool position ETP. More specifically, as noted above, the supplementary metrology position coordinates determination system 850 may be configured such that the metrology position coordinate processing portion 885 operates to determine metrology position coordinates that indicate a relative position between the first imaging configuration 860 and the first reference position REF1 (i.e., as defined by the stationary XY scale 870), based on determining an image position of the identified at least one respective imagable feature (i.e., of the XY scale 870) in the acquired image. The supplementary metrology position coordinates determination system 850 may further be configured to determine the metrology position coordinates of the end tool position ETP and/or the measuring point position MP of the end tool, based on the determined metrology position coordinates which indicate the relative position (i.e., between the first imaging configuration 860 and the first reference position REF1), and a known coordinate position offset between the end tool position ETP and/or the measuring point position MP of the end tool and the movable first imaging configuration 860. In one specific example implementation, the known coordinate position offset (e.g., expressed in terms of known offset components, such as a known x offset and a known y offset and a known z offset) may be added to or otherwise combined with the determined metrology position coordinates that indicate the relative position (i.e., between the first imaging configuration 860 and the first reference position REF1) in order to determine the metrology position coordinates of the end tool position ETP and/or the measuring point position MP of the end tool ETL.

As one specific example position coordinate configuration, in an implementation where in the operational configuration the optical axis OA1 is parallel to the scale imaging axis SIA and Z axis, the XY scale 870 may be designated as having an origin at the REF1 position X0, Y0, Z0. The origin location at the center of the scale may have scale coordinate values of 0,0,0, which makes the scale coordinate system and the metrology coordinate systems coincide in this particular implementation. The location at a center of a field of view FOV1 (e.g., corresponding to an acquired image) along the optical axis of the first imaging configuration 860 may be at metrology coordinates of X1, Y1, Z0. The reference point of the first imaging configuration 860 may then be understood to have metrology coordinates of X1, Y1, Z1, in the desired operational configuration. The end tool position ETP may be designated as having metrology position coordinates of X2, Y2, Z2. In various implementations, the end tool ETL may have a measuring point MP (e.g., at the end of an end tool stylus ETST for contacting a workpiece) which may be designated as having metrology position coordinates X3, Y3, Z3. In an implementation where the end tool position ETP and measuring point MP of the end tool ETL do not vary in the x or y directions relative to the reference point of the first imaging configuration 860, the X2, Y2 and X3, Y3 coordinates may be equal to the X1, Y1 coordinates, respectively.

In one specific example implementation, an acquired image may be analyzed by the metrology position coordinate processing portion 885 to determine the scale coordinates that correspond to the metrology position coordinates X1, Y1 corresponding to the center of the field of view FOV1 of the stationary first imaging configuration 860. Such a determination may be made in accordance with standard camera/scale image processing techniques (e.g., for determining a location of camera relative to a scale). Various examples of such techniques are described in U.S. Pat. Nos. 6,781,694; 6,937,349; 5,798,947; 6,222,940 and 6,640,008, each of which is hereby incorporated herein by reference in its entirety. In various implementations, such techniques may be utilized to determine the location of a field of view FOV1 (e.g., as corresponding to a position of a camera) within a scale range (e.g., within the XY scale 870), as described above with respect to FIGS. 4 and 5. In various implementations, such a determination may include identifying at least one respective imagable feature included in the acquired image of the XY scale 870 and the related respective known XY scale coordinate location. Such a determination may correspond to determining metrology position coordinates that indicate a relative position between the first imaging configuration 860 and the first reference position REF1 (i.e., as defined by the stationary XY scale 870). The relative X, Y coordinates (i.e., of the end tool position ETP) and/or the measuring point position MP of the end tool ETL may then be determined according to the known coordinate position offset between the end tool position ETP and/or the measuring point position MP of the end tool ETL and the first imaging configuration 860 (e.g., adding known x and y and z position offset values to X1 and Y1 and Z1 in order to determine X2, Y2, Z2 and/or X3, Y3 and Z3.)

To summarize the operation of implementation shown in FIG. 10, the residual misalignment MisAng is reduced to zero as based on and indicated by the misalignment sensor ASen, in the desired operational configuration provided as outlined above. Therefore, errors that depend on the residual misalignment MisAng (e.g. previously outlined with reference to FIGS. 2A-3B) are substantially prevented, and need not be corrected or compensated. For example, the various offset amounts and/or misalignment errors between various components may be determined and/or saved as calibration data and used as outlined herein without the need for additional correction or compensation that would otherwise arise due to a non-zero residual misalignment.

Figure 12:
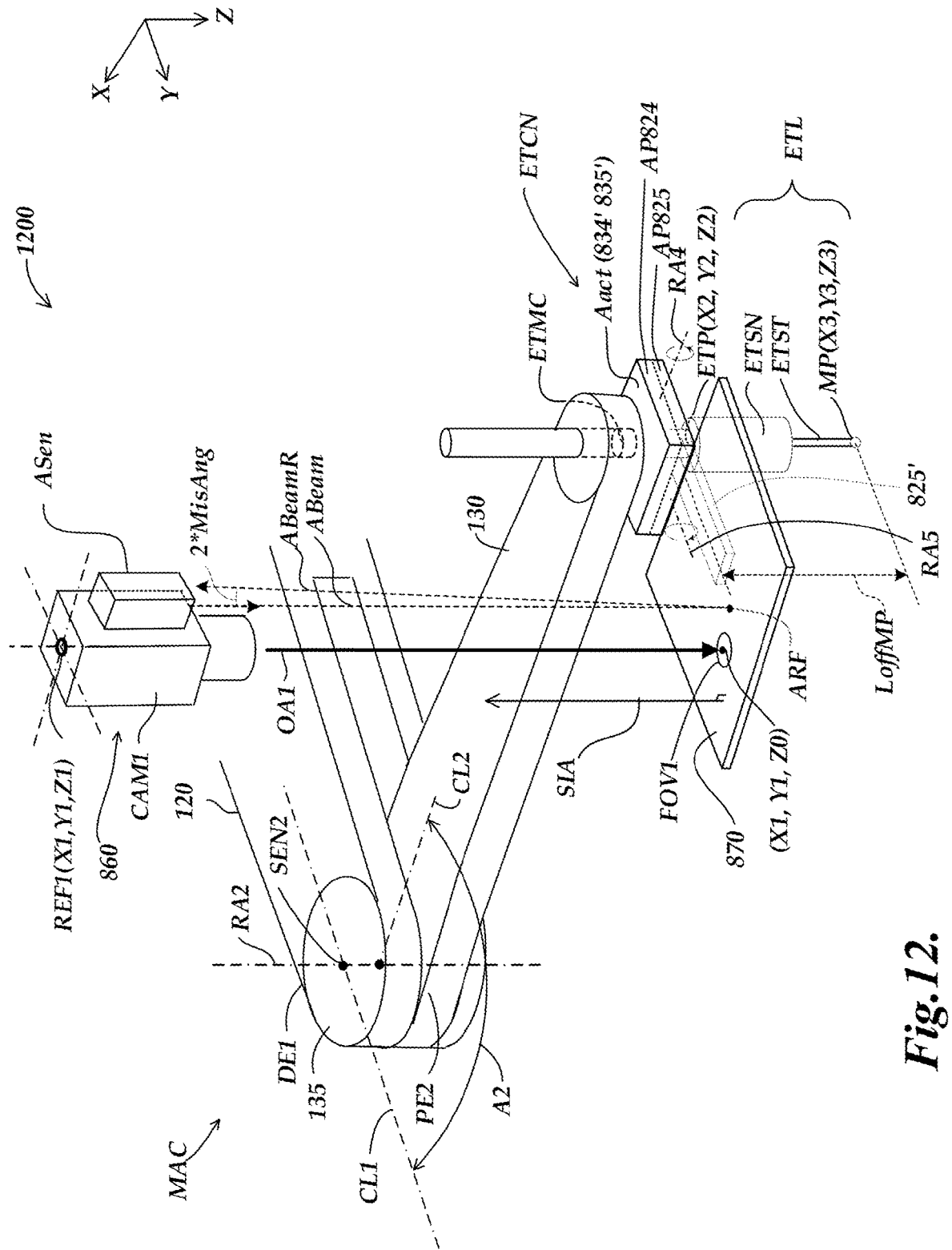
FIG. 12 is an isometric diagram showing a portion of an implementation of a robot system similar to the robot system of FIGS. 2A and 2B, in which an XY scale and an alignment sensor and an alignment actuator configuration of an operational alignment subsystem are coupled to a moving element, and the alignment sensor and alignment actuator are used to govern the operational alignment of the XY scale relative to an imaging configuration located on a stationary element.
Figure 13:
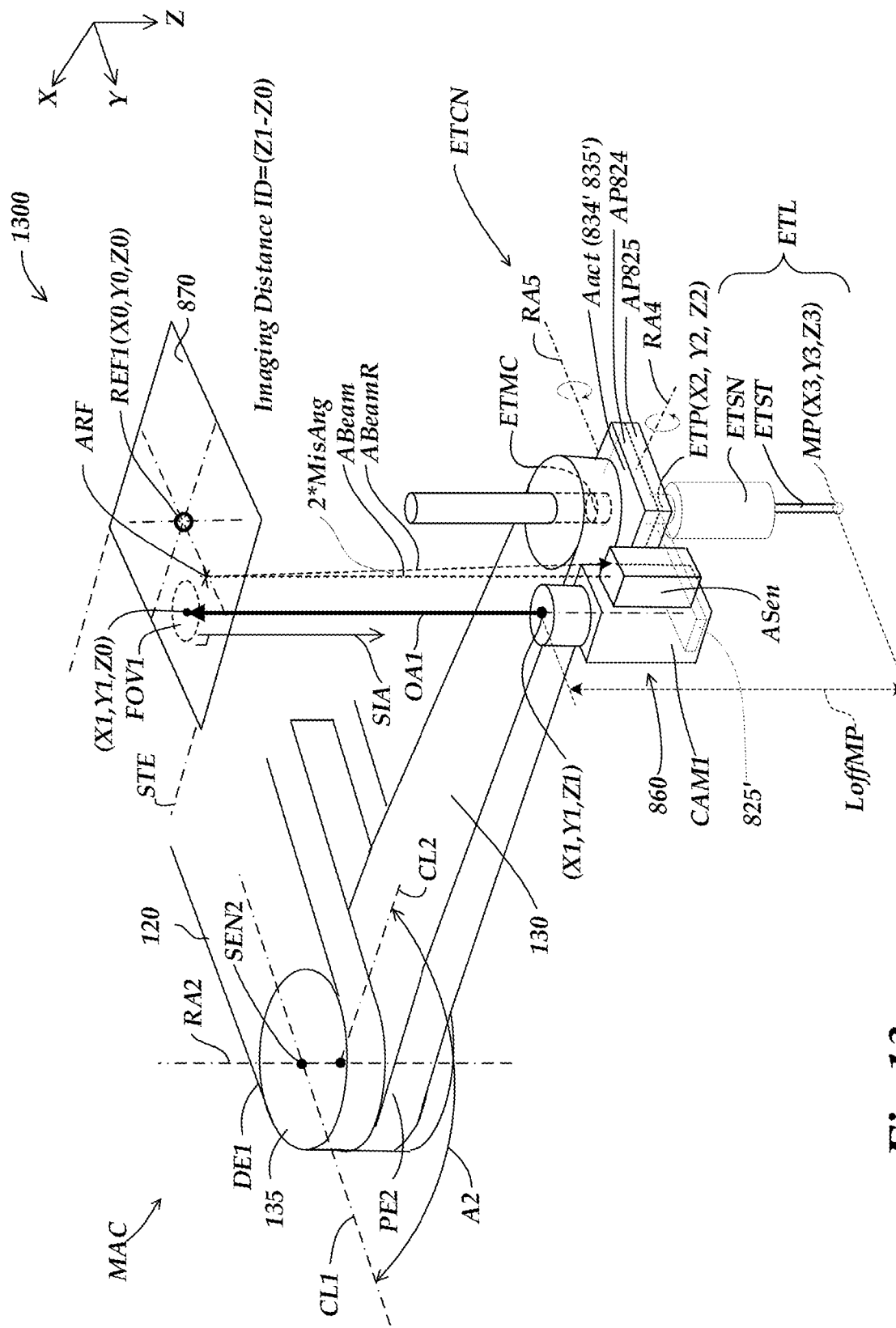
FIG. 13 is an isometric diagram showing a portion of an implementation of a robot system similar to the robot system of FIGS. 2A and 2B, in which an imaging configuration and an alignment sensor and an alignment actuator configuration of an operational alignment subsystem are coupled to a moving element, and the alignment sensor and alignment actuator are used to govern the operational alignment of the imaging configuration relative to an XY scale located on a stationary element.

The implementations described above with reference to FIGS. 9 and 10 use operational alignment actuators AAct that are included in the movable arm configuration MAC. It will be appreciated that an operational alignment subsystem OAS may alternatively provide a discrete set of operation alignment actuators AAct, if desired (e.g. if the associated movable arm configuration does not already include appropriate actuators for use by the operational alignment subsystem OAS.) Such a discrete set of operational alignment actuators AAct may be operated substantially as outlined above with reference to FIGS. 9 and 10, and may provide similar benefits according to the principles disclosed herein. FIGS. 12 and 13 show such implementations.

FIG. 12 is isometric diagram showing a portion of an implementation of a robot system 1200 similar to the robot system of FIGS. 2A and 2B, in which an XY scale 870 and an alignment sensor ASen and an alignment actuator configuration AAct of an operational alignment subsystem OAS are coupled to a moving element, and the alignment sensor ASen and alignment actuator configuration AAct are used to govern the operational alignment of the XY scale 870 relative to an imaging configuration 860 located on a stationary element STE. The features and operations associated with the operational alignment subsystem OAS are analogous to those outlined above with reference to FIG. 9. It will be appreciated that, similar to the numbering schemes described above, certain named or numbered components (e.g., 1XX, 8XX, 8XX') of FIG. 12 may correspond to and/or have similar operations as identically or similarly named or numbered counterpart components (e.g., 1XX, 8XX) of FIGS. 2A, 2B and 9) or of other figures, and may be understood to be similar or identical thereto and may otherwise be understood by analogy thereto and as otherwise described below. As noted above, this naming and numbering scheme to indicate elements having analogous and/or identical design and/or function is generally applied to the various figures of this application (e.g., FIGS. 1-5, 8, 9, 10, 12 and 13).

In the configuration of FIG. 12, the stationary element STE that the first imaging configuration 860 is coupled to may comprise a frame arranged above the robot 810. The movable arm configuration MAC may be the same as that shown in FIG. 2A. In the implementation shown in FIG. 12, an operational alignment actuator configuration AAct comprises the discrete motion mechanisms 834' and 835', which may be part of the operational alignment subsystem OAS. For example, the operational alignment actuator configuration AAct may be coupled to the arm portion or bracket 825 which may be coupled to the XY scale 870 and the end tool ETL in an end tool configuration ETCN that is mechanically and electrically connected to the movable arm configuration MAC at the end tool mounting configuration ETMC. In the illustrated implementation, the discrete motion mechanisms 834' and 835' need only suffice for motion over a relatively small range of angles about the rotational axes RA4' and RA5', respectively. Thus, they may be integrated in a low profile and compact dual axis actuator as schematically shown in FIG. 12. Teachings related to such actuators are disclosed, for example, in U.S. Pat. Nos. 5,583,691 and 9,323,025, which are hereby incorporated herein by reference in their entirety. It will be appreciated that the control and position signals from the discrete motion mechanisms 834' and 835' may be combined with those of the robot system that includes the movable arm configuration MAC as previously disclosed herein, and/or as generally known in the art.

In various implementations, the position and/or orientation of the XY scale 870, as coupled to the operational alignment actuator configuration AAct and thereby to the movable arm configuration MAC, may be adjustable, although it may also be temporarily locked or otherwise fixed in a given position/orientation (e.g., for a series of measurements, etc.) In any case, in an operational configuration of the supplementary metrology position coordinates determination system 850, the first imaging configuration 860 may be arranged with the optical axis OA1 of the first imaging configuration 860 parallel to the direction of the scale imaging axis direction SIA and with the scale plane located within the range of focus of the first imaging configuration 860 along the scale imaging axis direction SIA.

As illustrated in FIG. 12, the motion mechanism 834' has a rotary axis RA4 which may be nominally perpendicular to the Z axis in some implementations (e.g. in the absence of significant sag or twist.) The motion mechanism 834' may include an actuator portion AP824 (e.g. a plate) that is coupled to the motion mechanism 834', such that the actuator portion AP824 rotates about the rotary axis RA4. A position sensor of the motion mechanism 834' may be utilized for determining the angular position (e.g., in a plane that may be parallel to the Z axis) of the actuator portion AP824.

A motion mechanism 835' may be coupled to the actuator portion AP824 and have a rotary axis RA5, which may be nominally perpendicular to the rotary axis RA4 in various implementations. The motion mechanism 835' may include an actuator portion AP825 (e.g. a plate) that is coupled to the motion mechanism 835', such that the actuator portion AP825 rotates about the rotary axis RA5. An arm portion 825' (e.g. a bracket) may be mounted to the actuator portion AP825. A position sensor of the motion mechanism 835' may be utilized for determining an angular position of actuator portion AP825, the arm portion 825' and/or the XY scale 870, about the rotary axis RA5. In some implementations, it may be desirable to arrange the scale plane of the XY scale 870 parallel to the rotary axis RA5.

In various implementations, the movable XY scale 870 may be described as being coupled to a central sub-portion (e.g., including the arm portion 130 and at least some proximal elements thereto) of the movable arm configuration MAC through the discrete operational alignment actuator configuration AAct, which comprises a rotating element (e.g., actuator portion AP824 coupled to the motion mechanism 834') that rotates about a rotary axis RA4 and a rotating element (e.g., the actuator portion AP825 and/or bracket or arm portion 825' coupled to the motion mechanism 835') that rotates about a rotary axis RA5. In the exemplary operational alignment actuator configuration AAct shown in FIG. 12, the rotation axis RA5 is nominally parallel to the scale plane of the XY scale 870, and nominally orthogonal to the scale imaging axis SIA. The rotation axis RA4 is nominally orthogonal to the rotation axis RA5. It will be understood that this arrangement of rotation axes allows for simple and convenient motion control and sensor processing, but it is exemplary only and not limiting.

In the implementation shown in FIG. 12, the movable arm configuration MAC is configured such that once the desired operational configuration of the supplementary metrology position coordinates determination system 850 is established by the use of the alignment sensor ASen and the operational alignment actuator AAct, that desired operational configuration may then be nominally maintained throughout various movements or positionings of the robot 810, if desired. If it is desired to insure the best possible alignment in the operational configuration, then the operational alignment may be adjusted at any desired time by adjusting the position of the operational alignment actuator(s) AAct to provide the desired operational alignment as based on and indicated by the alignment sensor ASen.

As previously indicated, the known coordinate position offset between the end tool position ETP and/or the measuring point position MP of the end tool and the XY scale 870 may be utilized as part of the process for determining the metrology position coordinates of the end tool position ETP. More specifically, as noted above, the supplementary metrology position coordinates determination system 850 may be configured such that the metrology position coordinate processing portion 885 operates to determine metrology position coordinates that indicate a relative position between the XY scale 870 and the first reference position REF1 (i.e., as defined by the stationary first imaging configuration 860), based on determining an image position of the identified at least one respective imagable feature (i.e., of the XY scale 870) in the acquired image. The supplementary metrology position coordinates determination system 850 may further be configured to determine the metrology position coordinates of the end tool position ETP and/or the measuring point position MP of the end tool, based on the determined metrology position coordinates which indicate the relative position (i.e., between the XY scale 870 and the first reference position REF1), and a known coordinate position offset between the end tool position ETP and/or the measuring point position MP of the end tool and the movable XY scale 870. In one specific example implementation, the known coordinate position offset (e.g., expressed in terms of known offset components, such as a known x offset and a known y offset and a known z offset) may be added to or otherwise combined with the determined metrology position coordinates that indicate the relative position (i.e., between the XY scale 870 and the first reference position REF1) in order to determine the metrology position coordinates of the end tool position ETP and/or the measuring point position MP of the end tool ETL.

In one specific example implementation, an acquired image may be analyzed by the metrology position coordinate processing portion 885 to determine the scale coordinates that correspond to the metrology position coordinates X1, Y1 corresponding to the center of the field of view FOV1 of the stationary first imaging configuration 860. Such a determination may be made in accordance with standard camera/scale image processing techniques (e.g., for determining a location of a camera relative to a scale). In various implementations, such techniques may be utilized to determine the location of a field of view FOV1 (e.g., as corresponding to a position of a camera) within a scale range (e.g., within the XY scale 870), as described above with respect to FIGS. 4 and 5. In various implementations, such a determination may include identifying at least one respective imagable feature included in the acquired image of the XY scale 870 and the related respective known XY scale coordinate location. Such a determination may correspond to determining metrology position coordinates that indicate a relative position between the XY scale 870 and the first reference position REF1 (i.e., as defined by the stationary first imaging configuration 860). The relative X2, Y2 coordinates (i.e., of the end tool position ETP) may then be determined according to the known coordinate position offset between the end tool position ETP and/or the measuring point position MP of the end tool ETL and the XY scale 870 (e.g., adding known x and y and z position offset values to X1 and Y1 and Z0 in order to determine X2, Y2, Z2 and/or X3, Y3 and Z3.

To summarize the operation of implementation shown in FIG. 12, the residual misalignment MisAng is reduced to zero as based on and indicated by the misalignment sensor ASen, in the desired operational configuration provided as outlined above. Therefore, errors that depend on the residual misalignment MisAng (e.g. previously outlined with reference to FIGS. 2A-3B) are substantially prevented, and need not be corrected or compensated. For example, the various offset amounts and/or misalignment errors between various components may be determined and/or saved as calibration data and used as outlined herein without the need for additional correction or compensation that would otherwise arise due to a non-zero residual misalignment.

FIG. 13 is an isometric diagram showing a portion of an implementation of a robot system 1300 similar to the robot system of FIGS. 12 and 3A and 3B, in which an imaging configuration 860 and an alignment sensor ASen and an alignment actuator configuration AAct of an operational alignment subsystem OAS are coupled to a moving element, and the alignment sensor ASen and the alignment actuator configuration AAct are used to govern the operational alignment of the imaging configuration 860 relative to an XY scale 870 located on a stationary element STE.

The features and operations associated with the operational alignment subsystem OAS are analogous to those outlined above with reference to FIGS. 10 and 12. It will be appreciated that, similar to the numbering schemes described above, certain named or numbered components (e.g., 1XX, 8XX, 8XX') of FIG. 13 may correspond to and/or have similar operations as identically or similarly named or numbered counterpart components (e.g., 1XX, 8XX) of FIGS. 3A, 3B, 10 and 12 or of other figures, and may be understood to be similar or identical thereto and may otherwise be understood by analogy thereto and as otherwise described below.

In the configuration of FIG. 13, the stationary element STE that the XY scale 870 is coupled to may comprise a frame arranged above the robot 810. The movable arm configuration MAC may be the same as that shown in FIG. 2A or 3B. In the implementation shown in FIG. 13, an operational alignment actuator configuration AAct comprises the discrete motion mechanisms 834' and 835', which may be part of the operational alignment subsystem OAS. For example, the operational alignment actuator configuration AAct may be coupled to the arm portion or bracket 825 which may be coupled to the first imaging configuration 860 and the end tool ETL in an end tool configuration ETCN that is mechanically and electrically connected to the movable arm configuration MAC at the end tool mounting configuration ETMC. In the illustrated implementation, the discrete motion mechanisms 834' and 835' need only suffice for motion over a relatively small range of angles about the rotational axes RA4' and RA5', respectively. Thus, they may be integrated in a low profile and compact dual axis actuator as schematically shown in FIG. 13. Teachings related to such actuators are disclosed, for example, in U.S. Pat. Nos. 5,583,691 and 9,323,025, which are hereby incorporated herein by reference in their entirety. It will be appreciated that the control and position signals from the discrete motion mechanisms 834' and 835' may be combined with those of the robot system that includes the movable arm configuration MAC as previously disclosed herein, and/or as generally known in the art.

In various implementations, the position and/or orientation of the first imaging configuration 860, as coupled to the operational alignment actuator configuration AAct and thereby to the movable arm configuration MAC, may be adjustable, although it may also be temporarily locked or otherwise fixed in a given position/orientation (e.g., for a series of measurements, etc.) In any case, in an operational configuration of the supplementary metrology position coordinates determination system 850, the first imaging configuration 860 may be arranged with the optical axis OA1 of the first imaging configuration 860 parallel to the direction of the scale imaging axis direction SIA and with the scale plane located within the range of focus of the first imaging configuration 860 along the scale imaging axis direction SIA.

As illustrated in FIG. 13, the motion mechanism 834' has a rotary axis RA4 which may be nominally perpendicular to the Z axis in some implementations (e.g. in the absence of significant sag or twist.) The motion mechanism 834' may include an actuator portion AP824 (e.g. a plate) that is coupled to the motion mechanism 834', such that the actuator portion AP824 rotates about the rotary axis RA4. A position sensor of the motion mechanism 834' may be utilized for determining the angular position (e.g., in a plane that may be parallel to the Z axis) of the actuator portion AP824.

A motion mechanism 835' may be coupled to the actuator portion AP824 and have a rotary axis RA5, which may be nominally perpendicular to the rotary axis RA4 in various implementations. The motion mechanism 835' may include an actuator portion AP825 (e.g. a plate) that is coupled to the motion mechanism 835', such that the actuator portion AP825 rotates about the rotary axis RA5. An arm portion 825' (e.g. a bracket) may be mounted to the actuator portion AP825. A position sensor of the motion mechanism 835' may be utilized for determining an angular position of actuator portion AP825, the arm portion 825' and/or the XY scale 870, about the rotary axis RA5. In some implementations, it may be desirable to arrange the optical axis OA1 of the first imaging configuration 860 perpendicular to the rotary axis RA5.

In various implementations, the movable first imaging configuration 860 may be described as being coupled to a central sub-portion (e.g., including the arm portion 130 and at least some proximal elements thereto) of the movable arm configuration MAC through the discrete operational alignment actuator configuration AAct, which comprises a rotating element (e.g., actuator portion AP824 coupled to the motion mechanism 834') that rotates about a rotary axis RA4 and a rotating element (e.g., the actuator portion AP825 and/or bracket or arm portion 825' coupled to the motion mechanism 835') that rotates about a rotary axis RA5. In the exemplary operational alignment actuator configuration AAct shown in FIG. 13, the rotation axis RA5 is nominally perpendicular to and aligned with the optical axis OA1 the first imaging configuration 860. The rotation axis RA4 is nominally orthogonal to the rotation axis RA5. It will be understood that this arrangement of rotation axes allows for simple and convenient motion control and sensor processing, but it is exemplary only and not limiting.

In the implementation shown in FIG. 13, the movable arm configuration MAC is configured such that once the desired operational configuration of the supplementary metrology position coordinates determination system 850 is established by the use of the alignment sensor ASen and the operational alignment actuator AAct, that desired operational configuration may then be nominally maintained throughout various movements or positionings of the robot 810, if desired. If it is desired to insure the best possible alignment in the operational configuration, then the operational alignment may be adjusted at any desired time by adjusting the position of the operational alignment actuator(s) AAct to provide the desired operational alignment as based on and indicated by the alignment sensor ASen.

As previously indicated, the known coordinate position offset between the end tool position ETP and/or the measuring point position MP of the end tool and the first imaging configuration 860 may be utilized as part of the process for determining the metrology position coordinates of the end tool position ETP. More specifically, as noted above, the supplementary metrology position coordinates determination system 850 may be configured such that the metrology position coordinate processing portion 885 operates to determine metrology position coordinates that indicate a relative position between the first imaging configuration 860 and the first reference position REF1 (i.e., as defined by the stationary XY scale 870), based on determining an image position of the identified at least one respective imagable feature (i.e., of the XY scale 870) in the acquired image. The supplementary metrology position coordinates determination system 850 may further be configured to determine the metrology position coordinates of the end tool position ETP and/or the measuring point position MP of the end tool, based on the determined metrology position coordinates which indicate the relative position (i.e., between first imaging configuration 860 and the first reference position REF1), and a known coordinate position offset between the end tool position ETP and/or the measuring point position MP of the end tool and the movable first imaging configuration 860. In one specific example implementation, the known coordinate position offset (e.g., expressed in terms of known offset components, such as a known x offset and a known y offset and a known z offset) may be added to or otherwise combined with the determined metrology position coordinates that indicate the relative position (i.e., between the first imaging configuration 860 and the first reference position REF1) in order to determine the metrology position coordinates of the end tool position ETP and/or the measuring point position MP of the end tool ETL.

In one specific example implementation, an acquired image may be analyzed by the metrology position coordinate processing portion 885 to determine the scale coordinates that correspond to the metrology position coordinates X1, Y1 corresponding to the center of the field of view FOV1 of the stationary first imaging configuration 860. Such a determination may be made in accordance with standard camera/scale image processing techniques (e.g., for determining a location of a camera relative to a scale). In various implementations, such techniques may be utilized to determine the location of a field of view FOV1 (e.g., as corresponding to a position of a camera) within a scale range (e.g., within the XY scale 870), as described above with respect to FIGS. 4 and 5. In various implementations, such a determination may include identifying at least one respective imagable feature included in the acquired image of the XY scale 870 and the related respective known XY scale coordinate location. Such a determination may correspond to determining metrology position coordinates that indicate a relative position between the first imaging configuration 860 and the first reference position REF1 (i.e., as defined by the stationary XY scale 870). The relative X2, Y2 and/or X3 Y3 coordinates may then be determined according to the known coordinate position offset between the end tool position ETP and/or the measuring point position MP of the end tool ETL and the XY scale 870 (e.g., adding known x and y and z position offset values to X1 and Y1 and Z0 in order to determine X2, Y2, Z2 and/or X3, Y3 and Z3.

To summarize the operation of the implementation shown in FIG. 13, the residual misalignment MisAng is reduced to zero as based on and indicated by the misalignment sensor ASen, in the desired operational configuration provided as outlined above. Therefore, errors that depend on the residual misalignment MisAng (e.g. previously outlined with reference to FIGS. 2A-3B) are substantially prevented, and need not be corrected or compensated. For example, the various offset amounts and/or misalignment errors between various components may be determined and/or saved as calibration data and used as outlined herein without the need for additional correction or compensation that would otherwise arise due to a non-zero residual misalignment.

Figure 11:
FIG. 11 is a flow diagram illustrating a second exemplary implementation of a routine for operating a robot system including a robot and a supplementary metrology position coordinates determination system as disclosed herein.

FIG. 11 is a flow diagram illustrating an exemplary implementation of a routine 1100 for operating a robot system including a robot and a supplementary metrology position coordinates determination system that includes an operational alignment subsystem comprising an operational alignment actuator configuration AAct. As shown in FIG. 11, at a decision block 1110, a determination is made as to whether the robot system is to be operated in a supplementary metrology position coordinates mode. In various implementations, a selection and/or activation of a supplementary metrology position coordinates mode or a standard robot position coordinates mode may be made by a user and/or may be automatically made by the system in response to certain operations and/or instructions. For example, in one implementation a supplementary metrology position coordinates mode may be entered (e.g., automatically or in accordance with a selection by a user) when the robot moves into a particular position (e.g., moves an end tool from a general area where assembly or other operations are performed to a more specific area where workpiece inspection operations are typically performed and/or where the supplementary metrology position coordinates mode would otherwise be utilized). In various implementations, such modes may be implemented by an external control system (e.g., such as the external control system ECS of FIG. 1 utilizing a standard robot position coordinates mode portion 147 and a supplementary metrology position coordinates mode portion 187 or the external control system ECS' of FIG. 8 utilizing a standard robot position coordinates mode portion 849 and a supplementary metrology position coordinates mode portion 887). In various implementations, a hybrid mode may be operated either independently or as part of a supplementary metrology position coordinates mode and/or may be implemented as a switching between the modes, as previously outlined with respect to FIG. 7.

If at the decision block 1110 it is determined that the robot system is not to be operated in a supplementary metrology position coordinates mode, the routine proceeds to a block 1115, where the robot system is operated in a standard robot position coordinates mode. As part of the standard robot position coordinates mode, the position sensors (e.g., rotary encoders, linear encoders, etc.) of the robot are utilized to control and determine the robot movements and corresponding end tool position or measuring point position of the end tool with the robot accuracy (e.g., which is based at least in part on the accuracy of the position sensors of the robot). As noted previously herein, the position sensors of the robot may indicate the position of the movable arm configuration MAC or MAC' (e.g., the positions of the arm portions) with a lower degree of accuracy than the position information that is determined utilizing the XY scale. In general, the robot position coordinates mode may correspond to an independent and/or standard mode of operation for the robot (e.g., a mode in which the robot is operated independently, such as when a supplementary metrology position coordinates determination system is not active or is otherwise not provided).

If the robot system is to be operated in a supplementary metrology position coordinates mode, the routine proceeds to a block 1120, where the robot and the supplementary metrology position coordinates determination system are configured to operate the operational alignment subsystem and the operational alignment actuator configuration to adjust an alignment of the moveable one of the XY scale or the first imaging configuration based on the alignment signal provided by the alignment sensor to provide an operational configuration of the supplementary metrology position coordinates determination system. A scale plane is defined to nominally coincide with the planar substrate of the XY scale, and a direction normal to the scale plane is defined as a scale imaging axis direction. In the operational configuration the XY scale and the first imaging configuration are arranged with the optical axis of the first imaging configuration parallel to the direction of the scale imaging axis direction as indicated by the alignment signal, and with the scale plane located within the range of focus of the first imaging configuration along the scale imaging axis direction.

As previously outlined, in various implementations this process for providing the operational configuration may include making various position adjustments using the operational alignment actuators AAct, which may include discrete actuators of the operational alignment subsystem OAS and/or actuators included in the movable arm configuration MAC' or MAC'. As one specific example, in the implementations of FIGS. 8, 9 and 10, the fourth and fifth motion mechanisms 834 and 835 may be operated to rotate the fourth and fifth arm portions 824 and 825 so as to rotate the XY scale 870 to cause the scale imaging axis direction SIA to be parallel to the optical axis OA1 as indicated by the alignment signal of the alignment sensor ASen. In certain implementations, such adjustments may be made automatically or as directed by a user or an inspection program, or the like. In various implementations, various adjustments may be made to the first imaging configuration 860 (e.g., the magnification and/or range of focus may be adjusted, etc.) so as to cause the scale plane to be located within the range of focus of the first imaging configuration 860 along the scale imaging axis direction SIA.

At a block 1130, at least one input signal is received (e.g., at an image triggering portion, such as the image triggering portion 181, or 881, etc.) that is related to an end tool position or a measuring point position of the end tool of the robot. A timing is determined of a first imaging trigger signal based on the at least one input signal and the first imaging trigger signal is output to a first imaging configuration. The first imaging configuration acquires a digital image of an XY scale at an image acquisition time in response to receiving the first imaging trigger signal. In various implementations, different types of end tools may provide different types of outputs that may be utilized with respect to the at least one input signal. For example, in an implementation where the end tool is a touch probe that is used for measuring a workpiece and that outputs a touch signal when it touches the workpiece, that touch signal or a signal derived therefrom may be input as the at least one input signal that the timing of a first imaging trigger signal is determined based on. As another example, in an implementation where the end tool is a scanning probe that is used for measuring a workpiece and that provides respective workpiece measurement sample data corresponding to a respective sample timing signal, that respective sample timing signal or a signal derived therefrom may be input as the at least one input signal. As another example, in an implementation where the end tool is a camera that is used to provide a respective workpiece measurement image corresponding to a respective workpiece image acquisition signal, that workpiece image acquisition signal or a signal derived therefrom may be input as the at least one input signal.

At a block 1140, the acquired image is received (e.g., at a metrology position coordinate processing portion, such as the metrology position coordinate processing portion 185, or 885, etc.), and at least one respective imagable feature included in the acquired image of the XY scale and the related respective known XY scale coordinate location are identified. At a block 1150, metrology position coordinates that indicate a relative position between a movable one of the XY scale or the first imaging configuration and the first reference position are determined with an accuracy level that is better than a robot accuracy, based on determining an image position of the identified at least one respective imagable feature in the acquired image. The determined metrology position coordinates are indicative of the end tool position at the image acquisition time, with an accuracy level that is better than the robot accuracy, at least for a vector component of the metrology position coordinates that is at least one of transverse or perpendicular to the scale imaging axis direction. At a block 1160, determined position information (e.g., the determined metrology position coordinates that are indicative of the relative position, the determined metrology position coordinates of the end tool position or measuring point position of the end tool, and/or other related determined position information) is utilized for a designated function (e.g., for workpiece measurement, positioning control of the movable arm configuration of the robot, etc.) After the operations at block 1160, the routine may end. As part of such operations or otherwise, the routine may then proceed to a point A, where in various implementations the routine may end. Alternatively, after the operations at block 1160, the routine may be partially or completely repeated. For example, the determined position information (e.g., from the block 1160) may correspond to or otherwise be utilized for determining a first surface location on a workpiece, and the routine may be repeated for which a second surface location on the workpiece may then be determined (e.g., as part of a workpiece measurement such as measuring a feature of a workpiece). In repeating the routine, whether or not the operations at the block 1120 are to be repeated may depend on the particular situation. For the best accuracy, it may be desirable that the operational alignment outlined at the block 1120 is established with the movable arm configuration of the robot in the same (or nearly the same) position and/or pose that is to be used during the operations of blocks 1130 and/or 1140 the operation adjust an alignment of the moveable one of the XY scale or the first imaging configuration based on the alignment signal provided by the alignment sensor. However, if the robot arm configuration is sufficiently stiff, and/or the position and/or pose used at a second surface location is close to that used at the first surface location, and/or the accuracy requirements in a particular situation are not too stringent, then repeating the operations at the block 1120 may be omitted in some such situations, if desired.

In any case, the first and second determined metrology position coordinates determined by repeating the routine 1100 that are indicative of the first and second relative positions and/or related position information are utilized to determine a dimension of the workpiece that corresponds to a distance between the first and second surface locations on the workpiece that correspond to the respective end tool positions or measuring point positions of the end tool when contacting the respective first and second surface locations on the workpiece, etc. at respective image acquisition times. It will be appreciated that rather than using the position sensors (e.g., rotary encoders, linear encoders, etc.) of the robot to determine the first and second surface locations on the workpiece with the robot accuracy, more accurate position information may be determined utilizing the techniques as described herein. More specifically, the determination of the first and second surface locations (i.e., as corresponding to the first and second determined metrology position coordinates which correspond to respective first and second locations on the XY scale for which a precise distance between such coordinates/locations may be determined utilizing the techniques as described above in accordance with the accuracy of the XY scale) allows the corresponding dimension of the workpiece (e.g., of a workpiece feature) between the first and second surface locations to be determined with a high degree of accuracy.

The various techniques outlined above are noted to be distinct from techniques utilizing fiducials or other reference marks (e.g., for which the same fiducial or reference mark is required to be in each image, as compared to an XY scale 170 or 870 for which position information may be determined across the entire range of the XY scale 170 or 870 and correspondingly for any portion of the XY scale 170 or 870 that is included in an image corresponding to a field of view FOV or FOV1 of an imaging configuration 160 or 860).

It will be appreciated that either the routine outlined above with reference to FIG. 6 may be used with a corresponding operational alignment subsystem OAS (e.g. as described with reference to FIGS. 1-3B), or the routine outlined above with reference to FIG. 11 may be used with a corresponding operational alignment subsystem OAS (e.g. as described with reference to FIGS. 8-10, and/or FIGS. 12-13 below) to implement the hybrid mode as described above with reference to FIG. 7. In particular, such routines and corresponding operational alignment subsystems OAS may be used in the operations of block 740 of FIG. 7.

Figure 14:
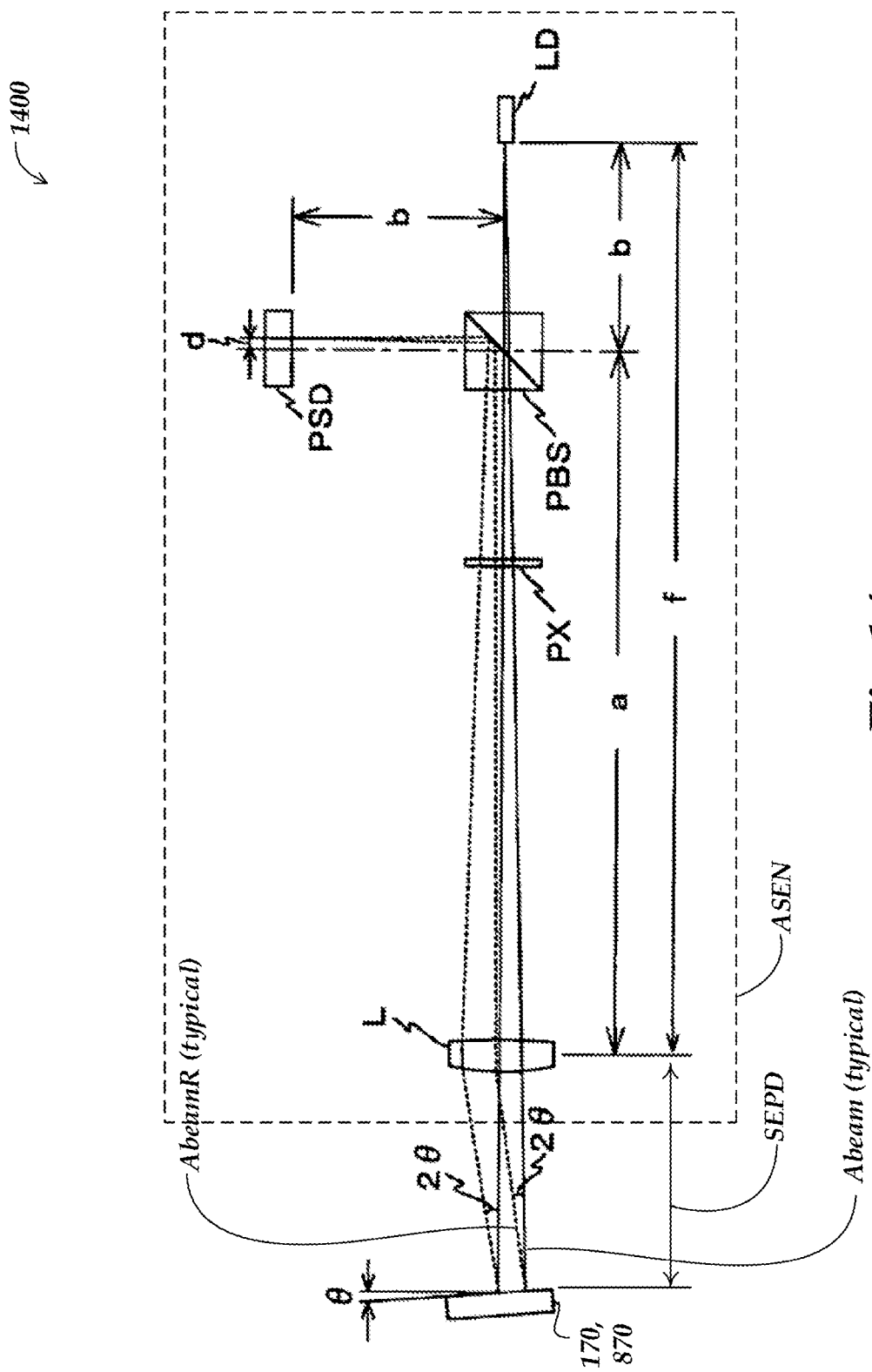
FIG. 14 is a diagram of a first exemplary configuration for an alignment sensor usable in various implementations of an operational alignment subsystem according to principles disclosed herein.

FIG. 14 is a diagram 1400 of a first exemplary configuration for an alignment sensor ASen usable in various implementations of an operational alignment subsystem OAS according to principles disclosed herein. According to one type of description, it may be regarded as a laser auto collimator for detecting the residual misalignment MisAng of the XY scale 170 or 870, or the like, using the alignment beam ABeam. As shown in FIG. 14, alignment sensor ASen may generally include a laser beam light source LD (e.g. a laser diode and lens), a polarization beam splitter PBS, a quarter-wave plate PX corresponding to the wavelength of the laser beam source LD, an object lens L, and a position sensor PSD. The light emitting point of the light source LD is positioned at the focal point of the object lens L. The polarization beam splitter PBS is positioned on the optical path of a light beam emitted by the light source LD, and is distant from the light source LD by a distance "b". The polarization beam splitter PBS polarizes the light in the alignment beam ABeam. The quarter-wave plate PX rotates the polarization of the light in the alignment beam ABeam according to known principles, and the alignment beam ABeam is then output through the object lens L to the XY scale 170 (870), as previously described herein.

The XY scale 170 (870) reflects the alignment beam ABeam as the reflected alignment beam ABeamR, as previously described herein. The reflected alignment beam ABeamR returns through the object lens L and the quarter-wave plate PX, and is reflected from the polarization beam splitter PBS to the position sensor PSD, as shown. The position detector PSD is spaced from the polarization beam splitter PBS by a distance "b".

It will be understood that if the XY scale has a residual misalignment angle θ relative to the alignment beam ABeam, then the reflected alignment beam ABeamR will be reflected at an angle of 2*θ, as illustrated for the residual misalignment 2*MisAng in various figures previously described herein. Therefore, it will be understood that displacement or position "d" of the resulting reflected alignment beam ABeamR focused on the positon detector PSD will follow the relationship $$\theta = d/2F$$

for the illustrated configuration, where f(=a+b) is the focal distance of the object lens L.

It will be understood that although the previous description describes misalignment detection in one plane, the same detector and the same detection principles can be applied in two planes when the position detector PSD has two sensitive axes and corresponding output signals. For example, in various implementations, the position detector PSD may be a known type of quadrant detector, than can provide a known type of differential signals indicative of the displacement or position "d" along respective "X" and "Y" axes, for the reflected alignment beam ABeamR. Such signals may be regarded as the previously outlined alignment signals ASig of the alignment sensor ASen.

It will be understood that although the element name "XY scale" has been used in this disclosure with reference to the elements 170, 170A, 170B, 870, and the like, this element name is exemplary only, and not limiting. It is referred to as an "XY scale" with reference to a cartesian coordinate system, and its description as comprising a nominally planar substrate (e.g., arranged nominally perpendicular to a scale imaging axis direction, which may be parallel to a z axis in certain implementations). However, more generally, the element name XY scale should be understood to refer to any reference scale comprising a plurality of features or markings that correspond to known two dimensional coordinates on that reference scale (e.g. accurate and/or accurately calibrated locations in two dimensions), provided that the scale is able to operate as disclosed herein. For example, such scale features may be expressed and/or marked to be in a cartesian coordinate system on that reference scale, or in a polar coordinate system, or any other convenient coordinate system. Furthermore, such features may comprise features distributed evenly or unevenly throughout an operational scale area, and may comprise graduated or ungraduated scale markings, provided that such features correspond to known two dimensional coordinates on the scale and are able to operate as disclosed herein.

It will be understood that although the robot systems and corresponding movable arm configurations disclosed and illustrated herein are generally shown and described with reference to a certain number of arm portions (e.g., 3 arm portions, 5 arm portions, etc.), such systems are not so limited. In various implementations, provided that it includes arm portions such as those described and/or claimed herein, the robot system may include fewer or more arm portions if desired.

It will be understood that the XY scale or reference scale and a camera that is used to image the scale may undergo rotation relative to one another, depending on the motion and/or position of the robot system. It will be appreciated that methods known in the art (e.g. as disclosed in the incorporated references) may be used to accurately determine any such relative rotation and/or perform any required coordinate transformations, and/or analyze the relative position of the camera and the scale according to principles disclosed herein, despite such relative rotations. It will be understood that the metrology position coordinates referred to herein may in various implementations take into account any such relative rotation. Furthermore, it will be understood that in some implementations the metrology position coordinates referred to herein may comprise a set of coordinates that include a precise determination and/or indication of any such relative rotation, if desired.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A robot system, comprising:
a robot, comprising:
a movable arm configuration, wherein the movable arm configuration comprises an end tool mounting configuration that is located proximate to a distal end of the movable arm configuration, and the robot is configured to move the movable arm configuration so as to move at least a portion of an end tool that is mounted to the end tool mounting configuration along at least two dimensions in an end tool working volume; and
a motion control system configured to control an end tool position or a measuring point position of the end tool with a level of accuracy defined as a robot accuracy, based at least in part on sensing and controlling the position of the movable arm configuration using at least one position sensor included in the robot; and
wherein:
the robot system further comprises a supplementary metrology position coordinates determination system, comprising:
a first imaging configuration comprising a first camera, the first imaging configuration having an optical axis;
an XY scale comprising a nominally planar substrate and a plurality of respective imagable features distributed on the substrate, wherein the respective imagable features are located at respective known XY scale coordinates on the XY scale and a scale plane is defined to nominally coincide with the planar substrate of the XY scale, and a direction normal to the scale plane is defined as a scale imaging axis direction;
an operational alignment subsystem OAS comprising at least an alignment sensor ASen and an operational alignment actuator configuration, wherein the alignment sensor is located proximate to the first camera and is mounted in a rigid configuration relative to the first camera, and the alignment sensor is configured to provide an alignment signal Asig indicative of the scale imaging axis direction;
an image triggering portion configured to input at least one input signal that is related to the end tool position or a measuring point position of the end tool and determine the timing of a first imaging trigger signal based on the at least one input signal and output the first imaging trigger signal to the first imaging configuration, wherein the first imaging configuration is configured to acquire a digital image of the XY scale at an image acquisition time in response to receiving the first imaging trigger signal, and
a metrology position coordinate processing portion configured to input the acquired image and identify at least one respective imagable feature included in the acquired image of the XY scale, and the related respective known XY scale coordinate location, and
wherein:
the supplementary metrology position coordinates determination system is configured with a movable one of the XY scale or the first imaging configuration coupled to the operational alignment actuator configuration which is coupled to, or part of, the movable arm configuration, and the other one of the XY scale or the first imaging configuration coupled to a stationary element proximate to the robot, with the stationary one of the XY scale or the first imaging configuration defining a first reference position;
the robot system is configured to operate the operational alignment subsystem and the operational alignment actuator configuration to adjust an alignment of the moveable one of the XY scale or the first imaging configuration based on the alignment signal provided by the alignment sensor to provide an operational configuration of the supplementary metrology position coordinates determination system, wherein in the operational configuration of the supplementary metrology position coordinates determination system the XY scale and the first imaging configuration are arranged with the optical axis of the first imaging configuration parallel to the direction of the scale imaging axis direction as indicated by the alignment signal, and with the scale plane located within the range of focus of the first imaging configuration along the scale imaging axis direction;
the supplementary metrology position coordinates determination system is configured such that when the moveable one of the XY scale or the first imaging configuration and the stationary one of the XY scale or the first imaging configuration are arranged in the operational configuration, and the movable arm configuration is positioned with the XY scale in a field of view of the first imaging configuration, then the metrology position coordinate processing portion is operable to determine metrology position coordinates that indicate a relative position between the movable one of the XY scale or the first imaging configuration and the first reference position with an accuracy level that is better than the robot accuracy, based on determining an image position of the identified at least one respective imagable feature in the acquired image; and the determined metrology position coordinates are indicative of the end tool position or a measuring point position of the end tool at the image acquisition time, with an accuracy level that is better than the robot accuracy, at least for a vector component of the metrology position coordinates that is at least one of transverse or perpendicular to the scale imaging axis direction.

2. The robot system of claim 1, wherein the operational alignment actuator configuration comprises at least a first rotating element that rotates about a first rotation axis that is nominally parallel to the scale plane if the XY scale is the moveable one, and nominally orthogonal to the optical axis if the first imaging configuration is the moveable one.

3. The robot system of claim 2, wherein the operational alignment actuator configuration comprises at least a second rotating element that rotates about a second rotation axis that is nominally orthogonal to the first rotation axis.

4. The robot system of claim 3, wherein the first and second rotating elements are included in the movable arm configuration.

5. The robot system of claim 3, wherein the first and second rotating elements are included in a discrete operational alignment actuator configuration that is located proximate to a distal end of the movable arm configuration.

6. The robot system of claim 2, wherein the central sub-portion comprises at least a first central sub-portion rotating element that rotates about a rotation axis that is nominally parallel to the first rotation axis.

7. The robot system of claim 2, wherein the distal sub-portion that couples the movable one of the XY scale or the first imaging configuration to the central sub-portion includes no distal sub-portion rotation axis that is nominally orthogonal to the scale plane if the XY scale is the moveable one, and no distal sub-portion rotation axis that is nominally parallel to the optical axis if the first imaging configuration is the moveable one.

8. The robot system of claim 2, wherein the distal sub-portion comprises a bracket that couples the movable one of the XY scale or the first imaging configuration to the first rotating element.

9. The robot system of claim 1, wherein the movable one of the XY scale or the first imaging configuration is configured in a rigid relationship to at least one of the end tool mounting configuration, and an end tool that is mounted to the end tool mounting configuration.

10. The robot system of claim 1, wherein the alignment sensor is configured to output an alignment beam to the XY scale, and receive a reflected alignment beam therefrom on a position sensitive detector of the alignment sensor, and provide the alignment signal based on at least one output from the position sensitive detector.

11. The robot system of claim 1, wherein the robot is configured to move the movable one of the XY scale or the first imaging configuration in a plane parallel to the scale plane, while the supplementary metrology position coordinates determination system is in the operational configuration.

12. The robot system of claim 1, wherein:
when the end tool is a touch probe that is used for measuring a workpiece and that outputs a touch signal when it touches the workpiece, the image triggering portion is configured to input that touch signal or a signal derived therefrom as its at least one input signal; or
when the end tool is a scanning probe that is used for measuring a workpiece and that provides respective workpiece measurement sample data corresponding to a respective sample timing signal, the image triggering portion is configured to input that respective sample timing signal or a signal derived therefrom as its at least one input signal; or
when the end tool is a camera that is used to provide a respective workpiece measurement image corresponding to a respective workpiece image acquisition signal, the image triggering portion is configured to input that workpiece image acquisition signal or a signal derived therefrom as its at least one input signal.

13. The robot system of claim 1, wherein the supplementary metrology position coordinates determination system is configured to determine the metrology position coordinates of the end tool position or a measuring point position of the end tool at the image acquisition time, based on the determined metrology position coordinates that are indicative of the relative position of the movable one of the XY scale or the first imaging configuration and a known coordinate position offset between the end tool position or a measuring point position of the end tool and the movable one of the XY scale or the first imaging configuration.

14. The robot system of claim 1, wherein the first imaging configuration and the alignment sensor are coupled to the movable arm configuration and the XY scale is coupled to the stationary element.

15. The robot system of claim 14, wherein the stationary element comprises a frame arranged above at least a portion of the end tool working volume, and the XY scale is fixed to the frame above a portion of the end tool working volume.

16. The robot system of claim 1, wherein:
the respective imagable features of the XY scale comprise a set of imagable features having unique identifiable patterns, wherein that set of imagable features are distributed on the substrate such that they are spaced apart by less than a distance corresponding to a distance across a field of view of the first imaging configuration; and the metrology position coordinate processing portion is configured to identify at least one respective imagable feature included in the acquired image of the XY scale based on its unique identifiable pattern; or
the metrology position coordinate processing portion is configured to identify at least one respective imagable feature included in the acquired image of the XY scale based on its image position in the acquired image and based on robot position data derived from the motion control system corresponding to the image acquisition time, wherein the respective imagable features of the XY scale comprise a set of similar imagable features that are distributed on the substrate such that they are spaced apart from one another by a distance that is more than a maximum position error that is allowed within the robot accuracy.

17. A method for operating a supplementary metrology position coordinates determination system that is utilized with a robot, the robot comprising:
  a movable arm configuration, wherein the movable arm configuration comprises an end tool mounting configuration that is located proximate to a distal end of the movable arm configuration, and the robot is configured to move the movable arm configuration so as to move at least a portion of an end tool that is mounted to the end tool mounting configuration along at least two dimensions in an end tool working volume; and
  a motion control system configured to control an end tool position or a measuring point position of the end tool with a level of accuracy defined as a robot accuracy, based at least in part on sensing and controlling the position of the movable arm configuration using at least one position sensor included in the robot;

the supplementary metrology position coordinates determination system comprising:
  a first imaging configuration comprising a first camera, the first imaging configuration having an optical axis;
  an XY scale comprising a nominally planar substrate and a plurality of respective imagable features distributed on the substrate, wherein the respective imagable features are located at respective known XY scale coordinates on the XY scale and a scale plane is defined to nominally coincide with the planar substrate of the XY scale, and a direction normal to the scale plane is defined as a scale imaging axis direction;
  an operational alignment subsystem OAS comprising at least an alignment sensor ASen and an operational alignment actuator configuration, wherein the alignment sensor is located proximate to the first camera and is mounted in a rigid configuration relative to the first camera, and the alignment sensor is configured to provide an alignment signal indicative of the scale imaging axis direction;
  an image triggering portion; and
  a metrology position coordinate processing portion, wherein:
    the supplementary metrology position coordinates determination system is configured with a movable one of the XY scale or the first imaging configuration coupled to the operational alignment actuator configuration which is coupled to, or part of the movable arm configuration and the other one of the XY scale or the first imaging configuration coupled to a stationary element proximate to the robot, with the stationary one of the XY scale or the first imaging configuration defining a first reference position;
    the robot system is configured to operate the operational alignment subsystem and the operational alignment actuator configuration to adjust an alignment of the moveable one of the XY scale or the first imaging configuration based on the alignment signal provided by the alignment sensor to provide an operational configuration of the supplementary metrology position coordinates determination system, wherein in the operational configuration of the supplementary metrology position coordinates determination system the XY scale and the first imaging configuration are arranged with the optical axis of the first imaging configuration parallel to the direction of the scale imaging axis direction as indicated by the alignment signal, and with the scale plane located within the range of focus of the first imaging configuration along the scale imaging axis direction;

the method comprising:
  operating the operational alignment subsystem and the operational alignment actuator configuration to provide the operational configuration of the supplementary metrology position coordinates determination system the optical axis of the first imaging configuration parallel to the direction of the scale imaging axis direction as indicated by the alignment signal, and with the scale plane located within the range of focus of the first imaging configuration along the scale imaging axis direction;
  receiving at the image triggering portion at least one input signal that is related to the end tool position or a measuring point position of the end tool and determining the timing of a first imaging trigger signal based on the at least one input signal and outputting the first imaging trigger signal to the first imaging configuration, wherein the first imaging configuration acquires a digital image of the XY scale at an image acquisition time in response to receiving the first imaging trigger signal, and for which the supplementary metrology position coordinates determination system is at least nominally in the operational configuration when the digital image is acquired;
  receiving at the metrology position coordinate processing portion the acquired image and identifying at least one respective imagable feature included in the acquired image of the XY scale, and the related respective known XY scale coordinate location; and
  determining metrology position coordinates that are indicative of a relative position between the movable one of the XY scale or the first imaging configuration and the XY reference position, based on determining an image position of the identified at least one respective imagable feature in the acquired image, wherein the determined metrology position coordinates are indicative of the end tool position or a measuring point position of the end tool at the image acquisition time, with an accuracy level that is better than the robot accuracy, at least for a vector component of the metrology position coordinates that is at least one of transverse or perpendicular to the scale imaging axis direction.

18. The method of claim 17, further comprising utilizing the determined metrology position coordinates that indicate the relative position for measuring a feature of a workpiece.

19. The method of claim 18, wherein the relative position is a first relative position which corresponds to a first surface location on the workpiece, and the method further comprises:
  receiving at the image triggering portion at least one second input signal that is related to the end tool position or a measuring point position of the end tool and determining the timing of a second imaging trigger signal based on the at least one second input signal and outputting the second imaging trigger signal to the first imaging configuration, wherein the first imaging configuration acquires a second digital image of the XY scale at a second image acquisition time in response to receiving the second imaging trigger signal, and for which the supplementary metrology position coordinates determination system is at least nominally in the operational configuration when the second digital image is acquired;

receiving at the metrology position coordinate processing portion the second acquired image and identifying at least one second respective imagable feature included in the second acquired image of the XY scale, and a related respective second known XY scale coordinate location;

determining metrology position coordinates that indicate a second relative position between the movable one of the XY scale or the first imaging configuration and the second reference position, based on determining a second image position of the identified at least one second respective imagable feature in the second acquired image, wherein the determined metrology position coordinates are indicative of the end tool position or a measuring point position of the end tool at the second image acquisition time, with an accuracy level that is better than the robot accuracy, at least for a vector component of the metrology position coordinates that is at least one of transverse or perpendicular to the scale imaging axis direction, and the second relative position is different than the first relative position and corresponds to a second surface location on the workpiece that is different than the first surface location; and utilizing the determined metrology position coordinates that are indicative of the first and second relative positions to determine a dimension of the workpiece that corresponds to a distance between the first and second surface locations on the workpiece.

20. A supplementary metrology position coordinates determination system for use with a robot system comprising:

a movable arm configuration, wherein the movable arm configuration comprises an end tool mounting configuration that is located proximate to a distal end of the movable arm configuration, and the robot is configured to move the movable arm configuration so as to move at least a portion of an end tool that is mounted to the end tool mounting configuration along at least two dimensions in an end tool working volume; and a motion control system configured to control an end tool position or a measuring point position of the end tool with a level of accuracy defined as a robot accuracy, based at least in part on sensing and controlling the position of the movable arm configuration using at least one position sensor included in the robot;

the supplementary metrology position coordinates determination system, comprising:

a first imaging configuration comprising a first camera, the first imaging configuration having an optical axis;

an XY scale comprising a nominally planar substrate and a plurality of respective imagable features distributed on the substrate, wherein the respective imagable features are located at respective known XY scale coordinates on the XY scale and a scale plane is defined to nominally coincide with the planar substrate of the XY scale, and a direction normal to the scale plane is defined as a scale imaging axis direction;

an operational alignment subsystem comprising at least an alignment sensor and an operational alignment actuator configuration, wherein the alignment sensor is located proximate to the first camera and is mounted in a rigid configuration relative to the first camera, and the alignment sensor is configured to provide an alignment signal indicative of the scale imaging axis direction;

an image triggering portion configured to input at least one input signal that is related to the end tool position or a measuring point position of the end tool and determine the timing of a first imaging trigger signal based on the at least one input signal and output the first imaging trigger signal to the first imaging configuration, wherein the first imaging configuration is configured to acquire a digital image of the XY scale at an image acquisition time in response to receiving the first imaging trigger signal, and a metrology position coordinate processing portion configured to input the acquired image and identify at least one respective imagable feature included in the acquired image of the XY scale, and the related respective known XY scale coordinate location, and wherein the supplementary metrology position coordinates determination system is configured such that when it is operably connected to the robot system:

the supplementary metrology position coordinates determination system is configured with a movable one of the XY scale or the first imaging configuration coupled to the operational alignment actuator configuration which is coupled to, or part of, the movable arm configuration, and the other one of the XY scale or the first imaging configuration coupled to a stationary element proximate to the robot, with the stationary one of the XY scale or the first imaging configuration defining a first reference position;

the robot system is configured to operate the operational alignment subsystem and the operational alignment actuator configuration to adjust an alignment of the moveable one of the XY scale or the first imaging configuration based on the alignment signal provided by the alignment sensor to provide an operational configuration of the supplementary metrology position coordinates determination system, wherein in the operational configuration of the supplementary metrology position coordinates determination system the XY scale and the first imaging configuration are arranged with the optical axis of the first imaging configuration parallel to the direction of the scale imaging axis direction as indicated by the alignment signal, and with the scale plane located within the range of focus of the first imaging configuration along the scale imaging axis direction;

the supplementary metrology position coordinates determination system is configured such that when the moveable one of the XY scale or the first imaging configuration and the stationary one of the XY scale or the first imaging configuration are arranged in the operational configuration, and the movable arm configuration is positioned with the XY scale in a field of view of the first imaging configuration, then the metrology position coordinate processing portion is operable to determine metrology position coordinates that indicate a relative position between the movable one of the XY scale or the first imaging configuration and the first reference position with an accuracy level that is better than the robot accuracy, based on determining an image position of the identified at least one respective imagable feature in the acquired image; and the determined metrology position coordinates are indicative of the end tool position or a measuring point position of the end tool at the image acquisition time, with an accuracy level that is better than the robot accuracy, at least for a vector component of the metrology position coordinates that is at least one of transverse or perpendicular to the scale imaging axis direction.

21. A robot system, comprising:

a robot, comprising:

a movable arm configuration, wherein the movable arm configuration comprises an end tool mounting configuration that is located proximate to a distal end of the movable arm configuration, and the robot is configured to move the movable arm configuration so as to move at least a portion of an end tool that is mounted to the end tool mounting configuration along at least two dimensions in an end tool working volume; and a motion control system configured to control an end tool position or a measuring point position of the end tool with a level of accuracy defined as a robot accuracy, based at least in part on sensing and controlling the position of the movable arm configuration using at least one position sensor included in the robot; and wherein:

the robot system further comprises a supplementary metrology position coordinates determination system, comprising:

a first imaging configuration comprising a first camera, the first imaging configuration having an optical axis;

an XY scale comprising a nominally planar substrate and a plurality of respective imagable features distributed on the substrate, wherein the respective imagable features are located at respective known XY scale coordinates on the XY scale and a scale plane is defined to nominally coincide with the planar substrate of the XY scale, and a direction normal to the scale plane is defined as a scale imaging axis direction;

an operational alignment subsystem OAS comprising at least an alignment sensor, wherein the alignment sensor is located proximate to the first camera and is mounted in a rigid configuration relative to the first camera, and the alignment sensor is configured to provide an alignment signal Asig indicative of the scale imaging axis direction;

an image triggering portion configured to input at least one input signal that is related to the end tool position or a measuring point position of the end tool and determine the timing of a first imaging trigger signal based on the at least one input signal and output the first imaging trigger signal to the first imaging configuration, wherein the first imaging configuration is configured to acquire a digital image of the XY scale at an image acquisition time in response to receiving the first imaging trigger signal, and a metrology position coordinate processing portion configured to input the acquired image and identify at least one respective imagable feature included in the acquired image of the XY scale, and the related respective known XY scale coordinate location, and wherein:

the supplementary metrology position coordinates determination system is configured with a movable one of the XY scale or the first imaging configuration coupled to the movable arm configuration, and the other one of the XY scale or the first imaging configuration coupled to a stationary element proximate to the robot, with the stationary one of the XY scale or the first imaging configuration defining a first reference position;

the robot system is configured to provide at least a nominal operational configuration of the supplementary metrology position coordinates determination system, wherein in the nominal operational configuration of the supplementary metrology position coordinates determination system the XY scale and the first imaging configuration are arranged with the optical axis of the first imaging configuration nominally parallel to the direction of the scale imaging axis direction and with the scale plane located within the range of focus of the first imaging configuration along the scale imaging axis direction;

the robot system is configured to operate the operational alignment subsystem to determine a residual misalignment between the optical axis and the scale imaging axis as indicated by the alignment signal provided by the alignment sensor;

the supplementary metrology position coordinates determination system is configured such that when the moveable one of the XY scale or the first imaging configuration and the stationary one of the XY scale or the first imaging configuration are arranged in the nominal operational configuration, and the movable arm configuration is positioned with the XY scale in a field of view of the first imaging configuration, then the metrology position coordinate processing portion is operable to acquire the digital image of the XY scale at an image acquisition time, and determine a corresponding residual misalignment, and determine a first set of metrology position coordinates that indicate a relative position between the movable one of the XY scale or the first imaging configuration and the first reference position with an accuracy level that is better than the robot accuracy at least for a vector component of the first set of metrology position coordinates that is at least one of transverse or perpendicular to the scale imaging axis direction, based on an image position of the identified at least one respective imagable feature in the acquired image and the corresponding residual misalignment.

22. The robot system of claim 21, wherein the metrology position coordinate processing portion is further configured to determine a second set of metrology position coordinates that are indicative of the end tool position or a measuring point position of the end tool at the image acquisition time based on the first set of metrology position coordinates and the corresponding residual misalignment, with an accuracy level that is better than the robot accuracy, at least for a vector component of the second set of metrology position coordinates that is at least one of transverse or perpendicular to the scale imaging axis direction.

23. The robot system of claim 21, wherein the alignment sensor is configured to output an alignment beam to the XY scale, and receive a reflected alignment beam therefrom on a position sensitive detector of the alignment sensor, and provide the alignment signal based on at least one output from the position sensitive detector.

* * * * *